(12) United States Patent
LeBlanc et al.

(10) Patent No.: US 8,788,337 B2
(45) Date of Patent: *Jul. 22, 2014

(54) SYSTEMS AND METHODS TO OPTIMIZE MEDIA PRESENTATIONS

(71) Applicant: Visa International Service Association, San Francisco, CA (US)

(72) Inventors: Diane LeBlanc, Belmont, CA (US); Diane C. Salmon, Lafayette, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,180

(22) Filed: Jun. 10, 2013

(65) Prior Publication Data
US 2013/0275215 A1 Oct. 17, 2013

Related U.S. Application Data

(63) Continuation of application No. 13/171,282, filed on Jun. 28, 2011.

(60) Provisional application No. 61/359,795, filed on Jun. 29, 2010.

(51) Int. Cl.
*G06Q 30/00* (2012.01)

(52) U.S. Cl.
USPC .................. 705/14.41; 705/14.42; 705/14.43; 705/14.52; 705/14.57

(58) Field of Classification Search
USPC ............ 705/14.4, 14.41, 14.43, 14.49, 14.53, 705/14.27, 14.61, 14.66, 14.42, 14.52, 705/14.57, 14
See application file for complete search history.

(56) References Cited

U.S. PATENT DOCUMENTS

| | | | |
|---|---|---|---|
| 5,401,946 | A | 3/1995 | Weinblatt |
| 5,592,560 | A | 1/1997 | Deaton et al. |
| 5,621,812 | A | 4/1997 | Deaton et al. |

(Continued)

FOREIGN PATENT DOCUMENTS

| | | |
|---|---|---|
| JP | 2000357204 | 12/2000 |
| JP | 2001084239 | 3/2001 |

(Continued)

OTHER PUBLICATIONS

U.S. Appl. No. 61/250,484, filed Oct. 9, 2009, entitled "Systems and Methods for Targeted Advertisement Delivery".

(Continued)

*Primary Examiner* — Eric Stamber
*Assistant Examiner* — Luis A Brown
(74) *Attorney, Agent, or Firm* — Loeb & Loeb LLP

(57) ABSTRACT

In one aspect, a computing apparatus is configured to profile the spending distribution of users who have made purchases from a merchant and who have paid for the purchases via a transaction handler (e.g., using credit cards, debit cards, prepaid cards). The spending distribution is determined based on transaction data of the users, where the transaction data records the transactions of the users for purchases from various merchants. The spending distribution is profiled to indicate the preference of the customers of the merchant as a whole and thus can be used to customize the ratio of media content provided to the customers of the merchant, such as the presentation ratio of advertisements from different merchants, or from merchants of different categories.

23 Claims, 7 Drawing Sheets

(56) References Cited

U.S. PATENT DOCUMENTS

| | | | |
|---|---|---|---|
| 5,638,457 A | 6/1997 | Deaton et al. | |
| 5,684,990 A | 11/1997 | Boothby | |
| 5,687,322 A | 11/1997 | Deaton et al. | |
| 5,710,886 A | 1/1998 | Christensen et al. | |
| 5,924,080 A | 7/1999 | Johnson | |
| 5,953,710 A | 9/1999 | Fleming | |
| 5,966,695 A | 10/1999 | Melchione et al. | |
| 5,974,396 A * | 10/1999 | Anderson et al. | 705/7.33 |
| 6,018,723 A | 1/2000 | Siegel et al. | |
| 6,035,280 A | 3/2000 | Christensen | |
| 6,070,147 A | 5/2000 | Harms et al. | |
| 6,119,101 A | 9/2000 | Peckover | |
| 6,119,103 A | 9/2000 | Basch et al. | |
| 6,216,129 B1 | 4/2001 | Eldering | |
| 6,282,522 B1 | 8/2001 | Davis et al. | |
| 6,285,983 B1 | 9/2001 | Jenkins | |
| 6,298,330 B1 | 10/2001 | Gardenswartz et al. | |
| 6,307,958 B1 | 10/2001 | Deaton et al. | |
| 6,321,201 B1 | 11/2001 | Dahl | |
| 6,332,126 B1 | 12/2001 | Pierce et al. | |
| 6,334,110 B1 * | 12/2001 | Walter et al. | 705/14.41 |
| 6,377,935 B1 | 4/2002 | Deaton et al. | |
| 6,422,462 B1 | 7/2002 | Cohen | |
| 6,430,539 B1 | 8/2002 | Lazarus et al. | |
| 6,505,168 B1 | 1/2003 | Rothman et al. | |
| 6,519,571 B1 | 2/2003 | Guheen et al. | |
| 6,571,279 B1 * | 5/2003 | Herz et al. | 709/217 |
| 6,598,030 B1 | 7/2003 | Siegel et al. | |
| 6,658,393 B1 | 12/2003 | Basch et al. | |
| 6,839,682 B1 | 1/2005 | Blume et al. | |
| 6,845,906 B2 | 1/2005 | Royer et al. | |
| 6,856,992 B2 | 2/2005 | Britton et al. | |
| 6,901,406 B2 | 5/2005 | Nabe et al. | |
| 6,922,686 B2 | 7/2005 | Okamoto et al. | |
| 6,938,022 B1 | 8/2005 | Singhal | |
| 6,941,376 B2 | 9/2005 | Mitchell et al. | |
| 6,985,879 B2 | 1/2006 | Walker et al. | |
| 6,996,560 B1 | 2/2006 | Choi et al. | |
| 7,003,476 B1 | 2/2006 | Samra et al. | |
| 7,024,374 B1 | 4/2006 | Day et al. | |
| 7,024,409 B2 | 4/2006 | Iyengar | |
| 7,035,855 B1 | 4/2006 | Kilger et al. | |
| 7,039,599 B2 | 5/2006 | Merriman et al. | |
| 7,062,510 B1 | 6/2006 | Eldering | |
| 7,069,197 B1 | 6/2006 | Saidane | |
| 7,072,847 B2 | 7/2006 | Ulenas et al. | |
| 7,107,249 B2 | 9/2006 | Dively et al. | |
| 7,117,172 B1 | 10/2006 | Black | |
| 7,120,590 B1 | 10/2006 | Eisen et al. | |
| 7,158,943 B2 | 1/2007 | van der Riet | |
| 7,158,955 B2 | 1/2007 | Diveley et al. | |
| 7,165,037 B2 | 1/2007 | Lazarus et al. | |
| 7,177,822 B2 | 2/2007 | Mahmood et al. | |
| 7,181,412 B1 | 2/2007 | Fulgoni et al. | |
| 7,194,422 B1 | 3/2007 | St. John Killick | |
| 7,225,142 B1 | 5/2007 | Apte et al. | |
| 7,227,950 B2 | 6/2007 | Faith et al. | |
| 7,255,267 B2 | 8/2007 | Chao | |
| 7,260,837 B2 | 8/2007 | Abraham et al. | |
| 7,264,152 B2 | 9/2007 | Tsuei et al. | |
| 7,269,578 B2 | 9/2007 | Sweeney | |
| 7,299,194 B1 | 11/2007 | Manganaris et al. | |
| 7,318,049 B2 | 1/2008 | Iannacci | |
| 7,319,986 B2 | 1/2008 | Praisner et al. | |
| 7,328,169 B2 | 2/2008 | Temares et al. | |
| 7,337,127 B1 | 2/2008 | Smith et al. | |
| 7,340,438 B2 | 3/2008 | Nordman et al. | |
| 7,360,251 B2 | 4/2008 | Spalink et al. | |
| 7,373,311 B2 | 5/2008 | Lambert et al. | |
| 7,398,252 B2 | 7/2008 | Neofytides et al. | |
| 7,401,731 B1 | 7/2008 | Pletz et al. | |
| 7,424,439 B1 | 9/2008 | Fayyad et al. | |
| 7,424,441 B2 | 9/2008 | George et al. | |
| 7,444,658 B1 | 10/2008 | Matz et al. | |
| 7,467,096 B2 | 12/2008 | Antonucci et al. | |
| 7,467,106 B1 | 12/2008 | Levine et al. | |
| 7,490,052 B2 | 2/2009 | Kilger et al. | |
| 7,493,655 B2 | 2/2009 | Brown | |
| 7,526,485 B2 | 4/2009 | Hagan et al. | |
| 7,533,038 B2 | 5/2009 | Blume et al. | |
| 7,536,360 B2 | 5/2009 | Stolfo et al. | |
| 7,552,069 B2 | 6/2009 | Kepecs | |
| 7,562,030 B1 | 7/2009 | Shapira et al. | |
| 7,613,628 B2 | 11/2009 | Ariff et al. | |
| 7,636,456 B2 | 12/2009 | Collins et al. | |
| 7,720,782 B2 | 5/2010 | Chaudhury et al. | |
| 7,729,977 B2 | 6/2010 | Xiao et al. | |
| 7,752,107 B1 | 7/2010 | Bent et al. | |
| 7,752,135 B2 | 7/2010 | Brown et al. | |
| 7,761,406 B2 | 7/2010 | Harken | |
| 7,903,099 B2 * | 3/2011 | Baluja | 345/204 |
| 2001/0014868 A1 * | 8/2001 | Herz et al. | 705/14 |
| 2001/0027413 A1 | 10/2001 | Bhutta | |
| 2001/0049620 A1 | 12/2001 | Blasko | |
| 2002/0004733 A1 | 1/2002 | Addante | |
| 2002/0026394 A1 | 2/2002 | Savage et al. | |
| 2002/0042738 A1 | 4/2002 | Srinivasan et al. | |
| 2002/0046187 A1 | 4/2002 | Vargas et al. | |
| 2002/0053076 A1 | 5/2002 | Landesmann | |
| 2002/0059100 A1 | 5/2002 | Shore | |
| 2002/0062249 A1 | 5/2002 | Iannacci | |
| 2002/0065723 A1 | 5/2002 | Anderson et al. | |
| 2002/0069122 A1 | 6/2002 | Yun et al. | |
| 2002/0099649 A1 | 7/2002 | Lee et al. | |
| 2002/0123928 A1 | 9/2002 | Eldering et al. | |
| 2002/0138346 A1 | 9/2002 | Kodaka et al. | |
| 2002/0174013 A1 | 11/2002 | Freeman et al. | |
| 2003/0047602 A1 | 3/2003 | Iida et al. | |
| 2003/0075600 A1 * | 4/2003 | Struthers et al. | 235/381 |
| 2003/0083933 A1 | 5/2003 | McAlear | |
| 2003/0191832 A1 | 10/2003 | Satyavolu et al. | |
| 2004/0019518 A1 | 1/2004 | Abraham et al. | |
| 2004/0054581 A1 | 3/2004 | Redford et al. | |
| 2004/0054591 A1 | 3/2004 | Spaeth et al. | |
| 2004/0122735 A1 | 6/2004 | Meshkin | |
| 2004/0193685 A1 | 9/2004 | Proehl | |
| 2004/0225509 A1 | 11/2004 | Andre | |
| 2004/0225603 A1 | 11/2004 | Allen et al. | |
| 2005/0039206 A1 * | 2/2005 | Opdycke | 725/35 |
| 2005/0055275 A1 * | 3/2005 | Newman et al. | 705/14 |
| 2005/0066240 A1 | 3/2005 | Sykes et al. | |
| 2005/0071225 A1 | 3/2005 | Bortolin et al. | |
| 2005/0071227 A1 | 3/2005 | Hammad et al. | |
| 2005/0149394 A1 * | 7/2005 | Postrel | 705/14 |
| 2005/0159996 A1 | 7/2005 | Lazarus et al. | |
| 2005/0160002 A1 | 7/2005 | Roetter et al. | |
| 2005/0216823 A1 | 9/2005 | Petersen et al. | |
| 2005/0222929 A1 | 10/2005 | Steier et al. | |
| 2006/0053056 A1 | 3/2006 | Alspach-Goss et al. | |
| 2006/0122886 A1 | 6/2006 | McKay | |
| 2006/0143071 A1 | 6/2006 | Hofmann | |
| 2006/0143075 A1 | 6/2006 | Carr et al. | |
| 2006/0161527 A1 | 7/2006 | Dwork et al. | |
| 2006/0167818 A1 | 7/2006 | Wentker et al. | |
| 2006/0178856 A1 | 8/2006 | Roberts et al. | |
| 2006/0178957 A1 | 8/2006 | LeClaire | |
| 2006/0178986 A1 | 8/2006 | Giordano et al. | |
| 2006/0184569 A1 | 8/2006 | Aakolk et al. | |
| 2006/0190337 A1 | 8/2006 | Ayers, Jr. et al. | |
| 2006/0293948 A1 | 12/2006 | Weinblatt | |
| 2007/0038516 A1 | 2/2007 | Apple et al. | |
| 2007/0055597 A1 | 3/2007 | Patel et al. | |
| 2007/0061190 A1 | 3/2007 | Wardell | |
| 2007/0067297 A1 | 3/2007 | Kublickis | |
| 2007/0084917 A1 | 4/2007 | Fajkowski | |
| 2007/0100691 A1 | 5/2007 | Patterson | |
| 2007/0124201 A1 | 5/2007 | Hu et al. | |
| 2007/0156557 A1 | 7/2007 | Shao et al. | |
| 2007/0162337 A1 | 7/2007 | Hawkins et al. | |
| 2007/0162377 A1 | 7/2007 | Williams | |
| 2007/0174295 A1 | 7/2007 | Abraham et al. | |
| 2007/0179846 A1 | 8/2007 | Jain et al. | |
| 2007/0192121 A1 | 8/2007 | Routson | |
| 2007/0192122 A1 | 8/2007 | Routson et al. | |

(56) References Cited

U.S. PATENT DOCUMENTS

| | | |
|---|---|---|
| 2007/0198335 A1 | 8/2007 | Edwards et al. |
| 2007/0219865 A1 | 9/2007 | Leining |
| 2007/0219866 A1 | 9/2007 | Wolf et al. |
| 2007/0221728 A1 | 9/2007 | Ferro et al. |
| 2007/0226056 A1 | 9/2007 | Belanger et al. |
| 2007/0226061 A1 | 9/2007 | Chen et al. |
| 2007/0239532 A1 | 10/2007 | Benson et al. |
| 2007/0244741 A1* | 10/2007 | Blume et al. ............... 705/10 |
| 2007/0260736 A1 | 11/2007 | Miller |
| 2007/0265923 A1 | 11/2007 | Krassner et al. |
| 2007/0282681 A1 | 12/2007 | Shubert et al. |
| 2007/0288312 A1 | 12/2007 | Wang |
| 2008/0004884 A1 | 1/2008 | Flake et al. |
| 2008/0004953 A1 | 1/2008 | Ma et al. |
| 2008/0004984 A1 | 1/2008 | Sendo et al. |
| 2008/0005358 A1 | 1/2008 | Kwon et al. |
| 2008/0052164 A1 | 2/2008 | Abifaker |
| 2008/0059302 A1 | 3/2008 | Fordyce, III et al. |
| 2008/0059303 A1 | 3/2008 | Fordyce |
| 2008/0059306 A1 | 3/2008 | Fordyce et al. |
| 2008/0059307 A1* | 3/2008 | Fordyce, III et al. ......... 705/14 |
| 2008/0071587 A1 | 3/2008 | Granucci et al. |
| 2008/0071680 A1 | 3/2008 | Sheets |
| 2008/0077487 A1 | 3/2008 | Davis et al. |
| 2008/0082393 A1 | 4/2008 | Ozzie et al. |
| 2008/0082418 A1 | 4/2008 | Fordyce et al. |
| 2008/0086365 A1 | 4/2008 | Zollino et al. |
| 2008/0103887 A1 | 5/2008 | Oldham et al. |
| 2008/0120182 A1 | 5/2008 | Arnold et al. |
| 2008/0120218 A1 | 5/2008 | Reid et al. |
| 2008/0134228 A1 | 6/2008 | Dion et al. |
| 2008/0154704 A1 | 6/2008 | Flake et al. |
| 2008/0154727 A1 | 6/2008 | Carlson |
| 2008/0162269 A1 | 7/2008 | Gilbert |
| 2008/0167991 A1 | 7/2008 | Carlson et al. |
| 2008/0167992 A1 | 7/2008 | Kokernak et al. |
| 2008/0177602 A1 | 7/2008 | Sopher et al. |
| 2008/0184117 A1 | 7/2008 | Alsbury et al. |
| 2008/0191006 A1 | 8/2008 | White |
| 2008/0195465 A1 | 8/2008 | Redmond et al. |
| 2008/0195473 A1 | 8/2008 | Laramy et al. |
| 2008/0201226 A1 | 8/2008 | Carlson et al. |
| 2008/0215436 A1 | 9/2008 | Roberts |
| 2008/0217397 A1* | 9/2008 | Degliantoni et al. ......... 235/380 |
| 2008/0221972 A1 | 9/2008 | Megdal et al. |
| 2008/0235243 A1 | 9/2008 | Lee et al. |
| 2008/0275771 A1 | 11/2008 | Levine |
| 2008/0296369 A1 | 12/2008 | Bodington et al. |
| 2008/0300973 A1 | 12/2008 | DeWitt et al. |
| 2008/0318559 A1 | 12/2008 | Porco |
| 2008/0319843 A1 | 12/2008 | Moser et al. |
| 2008/0319847 A1 | 12/2008 | Shepard |
| 2008/0320512 A1 | 12/2008 | Knight |
| 2009/0006203 A1 | 1/2009 | Fordyce, III et al. |
| 2009/0006363 A1 | 1/2009 | Canny et al. |
| 2009/0018895 A1 | 1/2009 | Weinblatt et al. |
| 2009/0030793 A1 | 1/2009 | Fordyce, III |
| 2009/0043593 A1 | 2/2009 | Herbrich et al. |
| 2009/0048884 A1 | 2/2009 | Olives et al. |
| 2009/0063333 A1 | 3/2009 | Nambiar et al. |
| 2009/0070219 A1 | 3/2009 | D'Angelo et al. |
| 2009/0070225 A1 | 3/2009 | Matz et al. |
| 2009/0076896 A1 | 3/2009 | DeWitt et al. |
| 2009/0076925 A1 | 3/2009 | DeWitt et al. |
| 2009/0112703 A1 | 4/2009 | Brown |
| 2009/0112721 A1 | 4/2009 | Hammad et al. |
| 2009/0119160 A1 | 5/2009 | Woda et al. |
| 2009/0119167 A1 | 5/2009 | Kendall et al. |
| 2009/0119170 A1 | 5/2009 | Hammad et al. |
| 2009/0119190 A1 | 5/2009 | Realini |
| 2009/0132347 A1* | 5/2009 | Anderson et al. ............... 705/10 |
| 2009/0132366 A1 | 5/2009 | Lam et al. |
| 2009/0132395 A1 | 5/2009 | Lam et al. |
| 2009/0144147 A1 | 6/2009 | Sheaffer |
| 2009/0144201 A1 | 6/2009 | Gierkink et al. |
| 2009/0157551 A1 | 6/2009 | Bellwood et al. |
| 2009/0172551 A1 | 7/2009 | Kane et al. |
| 2009/0172728 A1 | 7/2009 | Shkedi et al. |
| 2009/0192874 A1 | 7/2009 | Powles et al. |
| 2009/0192875 A1 | 7/2009 | Bene et al. |
| 2009/0192882 A1 | 7/2009 | Narahashi et al. |
| 2009/0192941 A1 | 7/2009 | Fournier et al. |
| 2009/0216579 A1 | 8/2009 | Zen et al. |
| 2009/0216616 A1 | 8/2009 | Wang et al. |
| 2009/0222323 A1 | 9/2009 | Kelly et al. |
| 2009/0234708 A1 | 9/2009 | Heiser, II et al. |
| 2009/0234711 A1 | 9/2009 | Ramer et al. |
| 2009/0234715 A1 | 9/2009 | Heiser, II et al. |
| 2009/0234737 A1 | 9/2009 | Sarelson et al. |
| 2009/0248496 A1 | 10/2009 | Hueter et al. |
| 2009/0248497 A1 | 10/2009 | Hueter |
| 2009/0248511 A1 | 10/2009 | Mehta et al. |
| 2009/0249384 A1 | 10/2009 | Fang et al. |
| 2009/0254414 A1 | 10/2009 | Schwarz et al. |
| 2009/0259518 A1 | 10/2009 | Harvey et al. |
| 2009/0259540 A1* | 10/2009 | Phan ............... 705/14 |
| 2009/0271305 A1 | 10/2009 | Lal et al. |
| 2009/0271327 A1 | 10/2009 | Lal et al. |
| 2009/0299846 A1 | 12/2009 | Brueggemann et al. |
| 2009/0307049 A1 | 12/2009 | Elliott, Jr. et al. |
| 2009/0307060 A1 | 12/2009 | Merz et al. |
| 2009/0307074 A1 | 12/2009 | Sharma |
| 2010/0030644 A1 | 2/2010 | Dhamodharan |
| 2010/0049620 A1 | 2/2010 | Debow |
| 2010/0057549 A1 | 3/2010 | Boal |
| 2010/0106568 A1 | 4/2010 | Grimes |
| 2010/0106569 A1 | 4/2010 | Grimes |
| 2010/0106584 A1 | 4/2010 | Etheredge et al. |
| 2010/0114677 A1 | 5/2010 | Carlson et al. |
| 2010/0114683 A1 | 5/2010 | Wessels et al. |
| 2010/0114686 A1 | 5/2010 | Carlson et al. |
| 2010/0161379 A1* | 6/2010 | Bene et al. ............... 705/10 |
| 2010/0174623 A1 | 7/2010 | McPhie et al. |
| 2010/0211442 A1* | 8/2010 | Venkataraman et al. .... 705/14.5 |
| 2010/0274625 A1 | 10/2010 | Carlson |
| 2010/0274627 A1 | 10/2010 | Carlson |
| 2010/0280880 A1 | 11/2010 | Faith et al. |
| 2010/0280881 A1 | 11/2010 | Faith et al. |
| 2010/0280882 A1 | 11/2010 | Faith et al. |
| 2010/0280927 A1 | 11/2010 | Faith et al. |
| 2010/0280950 A1 | 11/2010 | Faith et al. |
| 2010/0306029 A1 | 12/2010 | Jolley |
| 2010/0306032 A1 | 12/2010 | Jolley |
| 2011/0022424 A1 | 1/2011 | VonDerheide |
| 2011/0029367 A1 | 2/2011 | Olson et al. |
| 2011/0029430 A1 | 2/2011 | Norris et al. |
| 2011/0054981 A1 | 3/2011 | Faith et al. |
| 2011/0087530 A1 | 4/2011 | Fordyce, III et al. |
| 2011/0093327 A1 | 4/2011 | Fordyce, III et al. |
| 2011/0093335 A1 | 4/2011 | Fordyce, III et al. |
| 2011/0125565 A1 | 5/2011 | MacIlwaine et al. |
| 2011/0178855 A1* | 7/2011 | Rane et al. ............... 705/14.13 |
| 2011/0264497 A1 | 10/2011 | Clyne |
| 2011/0264501 A1 | 10/2011 | Clyne |
| 2011/0264567 A1 | 10/2011 | Clyne |
| 2011/0264581 A1 | 10/2011 | Clyne |
| 2012/0022945 A1 | 1/2012 | Falkenborg et al. |
| 2012/0030006 A1* | 2/2012 | Yoder et al. ............... 705/14.41 |
| 2012/0078701 A1 | 3/2012 | Woods |
| 2012/0109749 A1 | 5/2012 | Subramanian et al. |

FOREIGN PATENT DOCUMENTS

| | | |
|---|---|---|
| KR | 20040016771 | 2/2004 |
| KR | 20040107715 | 12/2004 |
| KR | 20050044215 | 5/2005 |
| KR | 20050059838 | 6/2005 |
| KR | 20070030415 | 3/2007 |
| KR | 20080104398 | 12/2008 |
| KR | 20090035503 | 4/2009 |
| WO | WO9922328 | 5/1999 |
| WO | WO9950775 | 10/1999 |
| WO | WO0060435 | 10/2000 |
| WO | WO0062231 | 10/2000 |

(56) References Cited

FOREIGN PATENT DOCUMENTS

| | | |
|---|---|---|
| WO | WO0137183 | 5/2001 |
| WO | WO0139023 | 5/2001 |
| WO | WO0157758 | 8/2001 |
| WO | WO0193161 | 12/2001 |
| WO | WO0205116 | 1/2002 |
| WO | WO0214985 | 2/2002 |
| WO | WO0219229 | 3/2002 |
| WO | WO0242970 | 5/2002 |
| WO | WO02071187 | 9/2002 |
| WO | WO03025695 | 3/2003 |
| WO | WO03081376 | 10/2003 |
| WO | WO2005001631 | 1/2005 |
| WO | WO2005076181 | 8/2005 |
| WO | WO2006028729 | 3/2006 |
| WO | WO2006126205 | 11/2006 |
| WO | WO2007131258 | 11/2007 |
| WO | WO2007136221 | 11/2007 |
| WO | WO2008013945 | 1/2008 |
| WO | WO2008023912 | 2/2008 |
| WO | WO2008055217 | 5/2008 |
| WO | WO2008064343 | 5/2008 |
| WO | WO2008067543 | 6/2008 |
| WO | WO2008144643 | 11/2008 |
| WO | WO2009031823 | 3/2009 |
| WO | WO2010017247 | 2/2010 |

OTHER PUBLICATIONS

U.S. Appl. No. 61/175,381, filed May 4, 2009, entitled "Systems and Methods for Determining Authorization, Risk Scores, and Prediction of Transactions".

U.S. Appl. No. 61/182,806, filed Jun. 1, 2009, entitled "Cardholder Clusters".

U.S. Appl. No. 61/252,119, filed Oct. 15, 2009, entitled "Systems and Methods to Match Identifiers".

U.S. Appl. No. 61/250,482, filed Oct. 9, 2009, entitled "Systems and Methods to Deliver Targeted Advertisements to Audience".

U.S. Appl. No. 61/231,244, filed Aug. 4, 2009, entitled "Systems and Methods for Profile-Based Advertisement Delivery".

U.S. Appl. No. 61/231,251, filed Aug. 4, 2009, entitled "Systems and Methods for Online Seasrch to Offline Purchase Tracking".

U.S. Appl. No. 61/232,114, filed Aug. 7, 2009, entitled "Closed Loop Processing Including Abstracted Data".

U.S. Appl. No. 61/232,354, filed Aug. 7, 2009, entitled "Closed Loop Process Providing Benefit".

U.S. Appl. No. 61/232,375, filed Aug. 7, 2009, entitled "Social Network Validation".

U.S. Appl. No. 61/232,742, filed Aug. 10, 2009, entitled "Cell Marketplace".

U.S. Appl. No. 61/264,236, filed Nov. 24, 2009, entitled "Systems and Methods for Multi-Channel Offer Redemption".

U.S. Appl. No. 61/222,287, filed Jul. 1, 2009, entitled "Benefits Engine Providing Benefits Based on Merchant Preferences".

U.S. Appl. No. 61/250,440, filed Oct. 9, 2009, entitled "Systems and Methods to Provide Loyalty Programs".

U.S. Appl. No. 61/253,034, filed Oct. 19, 2009, entitled "Systems and Methods for Advertising Services Based on an SKU-Level Profile".

U.S. Appl. No. 61/258,403, filed Nov. 5, 2009, entitled "Systems and Methods for Analysis of Transaction Data".

International Searching Authority, "International Search Report and Written Opinion," issued in connection with International Application No. PCT/US2011/033625, mailed on Feb. 8, 2012.

International Searching Authority, "International Search Report and Written Opinion," issued in connection with International Application No. PCT/US2011/059006, mailed on Feb. 7, 2012.

International Searching Authority, "International Search Report and Written Opinion," issued in connection with International Application No. PCT/US2011/046300, mailed on Mar. 20, 2012.

"Statistics Tutorial: Estimating a Proportion (Large Sample)", Apr. 13, 2008, pp. 1-4, http://stattrek.com/lesson4/proportion.aspx.

Ahn et al., "Standard Errors of Mean, Variance, and Standard Deviation Estimators," EECS Department, The University of Michigan, Jul. 24, 2003, pp. 1-2. http://www.eecs.umich.edu/~fessler/paters/files/tr/stderr.pdf.

Hausman et al., "On Non-exclusive Membership in Competing Joint Ventures," RAND Journal of Economics, vol. 34, No. 1, Spring 2003, pp. 43-62, http://www.dklevine.com/archive/refs4506439000000000145.pdf.

Rysman, Marc, "An Empirical Analysis of Payment Card Usage," The Journal of Industrial Economics 55, 2007.

Staten et al., "College Student Credit Card Usage," Credit Research Center Working Paper #65, Georgetown University, Jun. 2002, http://faculty.msb.edu/prog/CRC/pdf/WP65.pdf.

Munoz et al., "Comparison of Statistical Methods Commonly Used in Predictive Modelling," Journal of Vegetation Science, vol. 15, 2004, pp. 285-292. http://www.salford-systems.com/doc/JardinBotanicoUserStory.pdf.

Thomas, "A Survey of Credit and Behavioural Scoring: Forecasting Financial Risk of Lending to Consumers," International Journal of Forecasting, vol. 16, 2000, pp. 149-172. http://www.yaroslavvb.com/papers/thomas-survey.pdf.

Cashmore, "YouTube Ads: YouHate Em," Apr. 5, 2009, http://mashable.com/2009/04/05/youtube-ads-youhate-em/#.

Conservation Tax Credit Transfer, LLC, "Comapny Information," http://www.taxtransfer.net, Last Accessed: Mar. 29, 2010.

Li, "Knowledge Gathering and Matching in Heterogeneous Databases," Working Notes of the AAAI Spring Symposium on Information Gathering, pp. 116-1216, May 27, 2995.

Mielikainen, "Privacy Problems with Anonymized Transaction Databases," 7th International Conference on Discovery Science, pp. 219-229, Oct. 2, 2004.

Punj et al., "Cluster Analysis in Marketing Research: Review and Suggestions for Application," Journal of Marketing Research, vol. 20, pp. 134-148, May 1983.

Van Grove, "Are Your Online Video Ads Driving Actual Offline Purchases?", http://mashable.com/2009/05/18/video-impact/#, May 18, 2009.

Wikimedia Foundation, Inc., "Factor Analysis," Wikipedia Online Encyclopedia, http://en.wikipedia.org/wiki/Factor_Analysis, Apr. 30, 2010.

U.S. Appl. No. 61/175,381, filed May 4, 2009, entitled "Systems and Methods for Determining Authorization, Risk Scores, and Prediction of Transactions."

International Searching Authority, "Search Report and Written Opinion," issued in connection with International Application Serial No. PCT/US09/52766, mailed on Mar. 11, 2010.

International Searching Authority, "Search Report and Written Opinion," issued in connection with International Application Serial No. PCT/US2010/035951, mailed on Dec. 28, 2010.

International Searching Authority, "Search Report and Written Opinion," issued in connection with International Application Serial No. PCT/US2010/043798, mailed on Feb. 28, 2011.

* cited by examiner

SYSTEMS AND METHODS TO OPTIMIZE MEDIA PRESENTATIONS

RELATED APPLICATIONS

The present application is a continuation of U.S. patent application Ser. No. 13/171,282, filed Jun. 28, 2011, and entitled "Systems and Methods to Optimize Media Presentations," which claims priority to the Provisional U.S. Patent Application Ser. No. 61/359,795, filed Jun. 29, 2010, and entitled "Systems and Methods to Optimize Media Presentations," the disclosures of which application is hereby incorporated herein by reference.

FIELD OF THE TECHNOLOGY

At least some embodiments of the present disclosure relate to the processing of transaction data, such as records of payments made via credit cards, debit cards, prepaid cards, etc., and/or providing information based on the processing of the transaction data.

BACKGROUND

Millions of transactions occur daily through the use of payment cards, such as credit cards, debit cards, prepaid cards, etc. Corresponding records of the transactions are recorded in databases for settlement and financial record keeping (e.g., to meet the requirements of government regulations). Such data can be mined and analyzed for trends, statistics, and other analyses. Sometimes such data are mined for specific advertising goals, such as to provide targeted offers to account holders, as described in PCT Pub. No. WO 2008/067543 A2, published on Jun. 5, 2008 and entitled "Techniques for Targeted Offers."

U.S. Pat. App. Pub. No. 2009/0216579, published on Aug. 27, 2009 and entitled "Tracking Online Advertising using Payment Services," discloses a system in which a payment service identifies the activity of a user using a payment card as corresponding with an offer associated with an online advertisement presented to the user.

U.S. Pat. No. 6,298,330, issued on Oct. 2, 2001 and entitled "Communicating with a Computer Based on the Offline Purchase History of a Particular Consumer," discloses a system in which a targeted advertisement is delivered to a computer in response to receiving an identifier, such as cookie, corresponding to the computer.

U.S. Pat. No. 7,035,855, issued on Apr. 25, 2006 and entitled "Process and System for Integrating Information from Disparate Databases for Purposes of Predicting Consumer Behavior," discloses a system in which consumer transactional information is used for predicting consumer behavior.

U.S. Pat. No. 6,505,168, issued on Jan. 7, 2003 and entitled "System and Method for Gathering and Standardizing Customer Purchase Information for Target Marketing," discloses a system in which categories and sub-categories are used to organize purchasing information by credit cards, debit cards, checks and the like. The customer purchase information is used to generate customer preference information for making targeted offers.

U.S. Pat. No. 7,444,658, issued on Oct. 28, 2008 and entitled "Method and System to Perform Content Targeting," discloses a system in which advertisements are selected to be sent to users based on a user classification performed using credit card purchasing data.

U.S. Pat. App. Pub. No. 2005/0055275, published on Mar. 10, 2005 and entitled "System and Method for Analyzing Marketing Efforts," discloses a system that evaluates the cause and effect of advertising and marketing programs using card transaction data.

U.S. Pat. App. Pub. No. 2008/0217397, published on Sep. 11, 2008 and entitled "Real-Time Awards Determinations," discloses a system for facilitating transactions with real-time awards determinations for a cardholder, in which the award may be provided to the cardholder as a credit on the cardholder's statement.

The disclosures of the above discussed patent documents are hereby incorporated herein by reference.

SUMMARY

An apparatus is provided including means for identifying a set of transaction data associated with account identifiers via a transaction handler to one or more issuer processors, the one or more issuer processors to make payments on behalf of the users, the one or more acquirer processors to receive the payments on behalf of respective merchants. The apparatus further provides means for determining a spending distribution configured to schedule presentations of media content of a plurality of categories.

The apparatus may further include means for scheduling a presentation mix of the media content of the plurality of categories according to the spending distribution across the plurality of categories; means for processing the transactions; means for storing the transaction data to record the transactions; means for selecting the plurality of users according to a distribution of customers of the merchant.

In an embodiment where the merchant is a first merchant and the spending distribution is a first spending distribution, the apparatus may further include means for identifying a second merchant associated with a second spending distribution matching the first spending distribution, the second spending distribution computed based on transaction data of users who have used account identifiers to make purchases from the second merchant; means for adjusting the presentations of the media content at a media channel at a location of the first merchant; means for comparing, after the adjusting, changes in the first spending distribution and changes in the second spending distribution to identify an effect of the adjusting; and means for determining based on the effect identified from the adjusting, a presentation ratio of the media content of the plurality of categories.

A method is provided including identifying, by at least one physically configured, a spending distribution determined based on a set of transaction data associated with account identifiers of a plurality of users who have used the account identifiers to make purchases from a merchant, the set of transaction data associated with transactions processed in response to one or more acquirer processors submitting the account identifiers via a transaction handler to one or more issuer processors, the one or more issuer processors to make payments on behalf of the users, the one or more acquirer processors to receive the payments on behalf of respective merchants; and determining, based on the spending distribution and by the at least one physically configured, a presentation ratio of media content of a plurality of categories, the media content to be presented according to the presentation ratio via a media channel located at a facility of the merchant.

A computing apparatus is provided including a data warehouse configured to store transaction data recording transactions processed by a transaction handler, each of the transactions being processed to settle via the transaction handler a payment from an issuer to an acquirer for a purchase made by a user from a merchant, the issuer making the payment on behalf of the user, the acquirer receiving the payment on behalf of the merchant. The computing apparatus further includes at least one processor coupled with the data warehouse to identify a subset of the transaction data associated with account identifiers of a plurality of users who have used the account identifiers to make purchases from a first merchant, wherein the at least one processor is further configured to determine a spending distribution based on the subset of the transaction data to schedule presentations of media content of a plurality of categories.

A method is provided that identifies, by a computing apparatus, a set of transaction data associated with account identifiers of a plurality of users who have made purchases from a first merchant, the set of transaction data associated with transactions processed in response to one or more acquirer processors submitting the account identifiers via a transaction handler to one or more issuer processors, the one or more issuer processors to make payments on behalf of the users, the one or more acquirer processors to receive the payments on behalf of respective merchants. The method further determines, by the computing apparatus using the set of transaction data, a first spending distribution configured to schedule presentations of media content of a plurality of categories, wherein the media content includes advertisements from merchants to customers of the merchant; determines presentation ratios of media content in the plurality of categories based on the first spending distribution; schedules a presentation mix of the media content of the plurality of categories according to the first spending distribution across the plurality of categories; provides the presentation mix of the media content of the plurality of categories to a location of the first merchant for display on a media channel; identifies a second merchant associated with a second spending distribution matching the first spending distribution, the second spending distribution computed based on transaction data of users who have used account identifiers to make purchases from the second merchant; adjusts the presentations of the media content on the media channel at the location of the first merchant; and compares, after the adjusting, changes in the first spending distribution and changes in the second spending distribution to identify an effect of the adjusting.

BRIEF DESCRIPTION OF THE DRAWINGS

The embodiments are illustrated by way of example and not limitation in the figures of the accompanying drawings in which like references indicate similar elements.

DETAILED DESCRIPTION

Introduction

Figure 1:
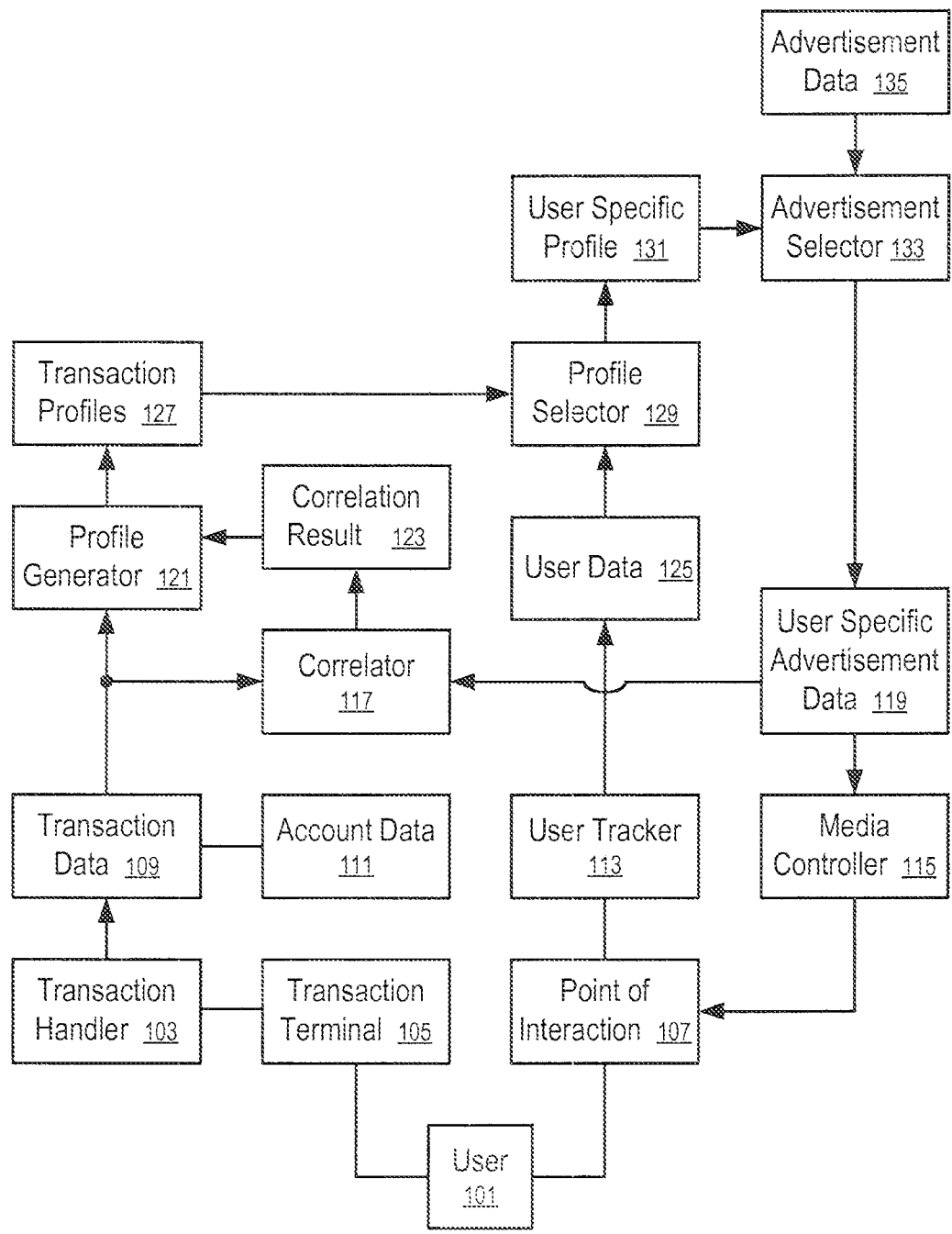
FIG. 1 illustrates a system to provide services based on transaction data according to one embodiment.

In one embodiment, transaction data, such as records of transactions made via credit accounts, debit accounts, prepaid accounts, bank accounts, stored value accounts and the like, is processed to provide information for various services, such as reporting, benchmarking, advertising, content or offer selection, customization, personalization, prioritization, etc.

In one embodiment, an advertising network is provided based on a transaction handler to present personalized or targeted advertisements/offers on behalf of advertisers. A computing apparatus of, or associated with, the transaction handler uses the transaction data and/or other data, such as account data, merchant data, search data, social networking data, web data, etc., to develop intelligence information about individual customers, or certain types or groups of customers. The intelligence information can be used to select, identify, generate, adjust, prioritize, and/or personalize advertisements/offers to the customers.

In one embodiment, the computing apparatus is to profile the spending distribution of users who have made purchases from a merchant and who have paid for the purchases via the transaction handler using accounts, such as credit card accounts, debit card accounts, prepaid card accounts, etc. The spending distribution is determined based on transaction data of the accounts, where the transaction data records the transactions made using accounts for purchases from various merchants. The spending distribution is profiled to indicate the preference of the customers of the merchant as a whole and thus can be used to customize the ratio of media content provided to the customers of the merchant, such as the presentation ratio of advertisements from different merchants, or from merchants of different categories. Details in one embodiment regarding the generation of such a spending profile and the optimization of media presentations based on the profile are provided in the section entitled "MEDIA OPTIMIZATION."

In one embodiment, the computing apparatus correlates transactions with activities that occurred outside the context of the transaction, such as online advertisements presented to the customers that at least in part cause the offline transactions. The correlation data can be used to demonstrate the success of the advertisements, and/or to improve intelligence information about how individual customers and/or various types or groups of customers respond to the advertisements.

In one embodiment, the computing apparatus correlates, or provides information to facilitate the correlation of, transactions with online activities of the customers, such as searching, web browsing, social networking and consuming advertisements, with other activities, such as watching television programs, and/or with events, such as meetings, announcements, natural disasters, accidents, news announcements, etc.

In one embodiment, the correlation results are used in predictive models to predict transactions and/or spending patterns based on activities or events, to predict activities or events based on transactions or spending patterns, to provide alerts or reports, etc.

In one embodiment, a single entity operating the transaction handler performs various operations in the services provided based on the transaction data. For example, in the presentation of the personalized or targeted advertisements, the single entity may perform the operations such as generating the intelligence information, selecting relevant intelligence information for a given audience, selecting, identifying, adjusting, prioritizing, personalizing and/or generating advertisements based on selected relevant intelligence information, and facilitating the delivery of personalized or targeted advertisements, etc. Alternatively, the entity operating the transaction handler cooperates with one or more other entities by providing information to these entities to allow these entities to perform at least some of the operations for presentation of the personalized or targeted advertisements.
System FIG. 1 illustrates a system to provide services based on transaction data according to one embodiment. In FIG. 1, the system includes a transaction terminal (105) to initiate financial transactions for a user (101), a transaction handler (103) to generate transaction data (109) from processing the financial transactions of the user (101) (and the financial transactions of other users), a profile generator (121) to generate transaction profiles (127) based on the transaction data (109) to provide information/intelligence about user preferences and spending patterns, a point of interaction (107) to provide information and/or offers to the user (101), a user tracker (113) to generate user data (125) to identify the user (101) using the point of interaction (107), a profile selector (129) to select a profile (131) specific to the user (101) identified by the user data (125), and an advertisement selector (133) to select, identify, generate, adjust, prioritize and/or personalize advertisements for presentation to the user (101) on the point of interaction (107) via a media controller (115).

In one embodiment, the system further includes a correlator (117) to correlate user specific advertisement data (119) with transactions resulting from the user specific advertisement data (119). The correlation results (123) can be used by the profile generator (121) to improve the transaction profiles (127).

Figure 2:
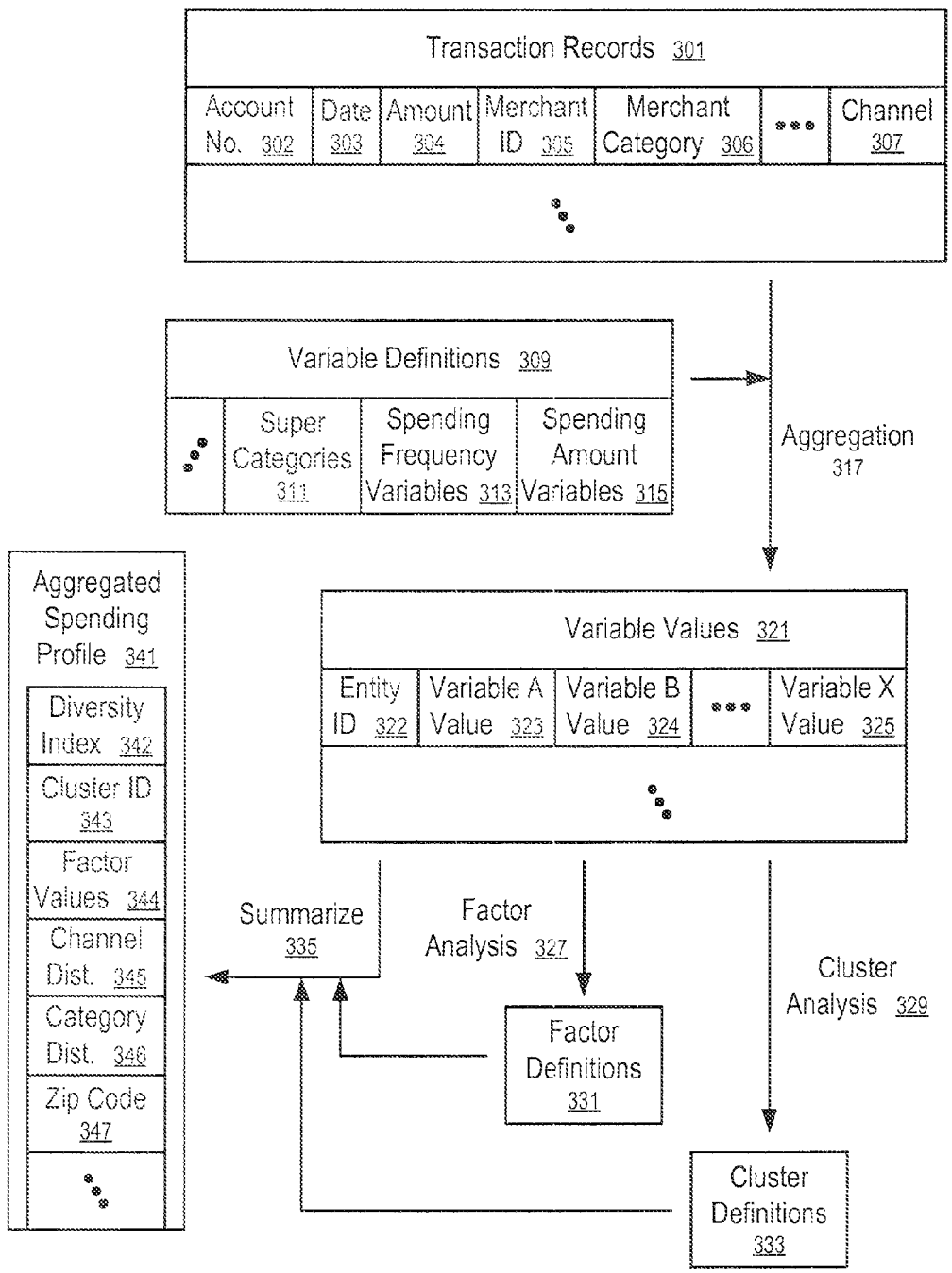
FIG. 2 illustrates the generation of an aggregated spending profile according to one embodiment.
Figure 3:
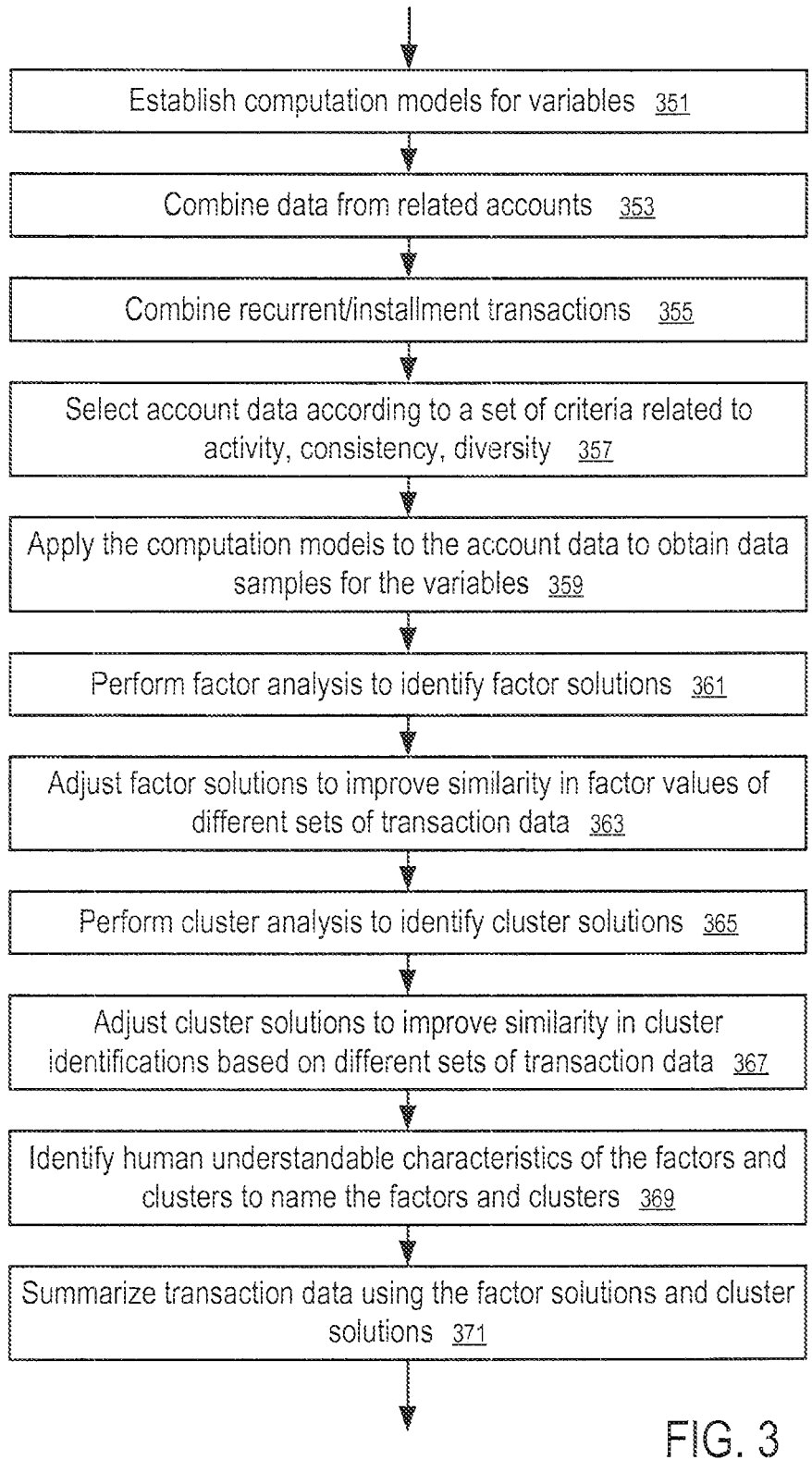
FIG. 3 shows a method to generate an aggregated spending profile according to one embodiment.

In one embodiment, the transaction profiles (127) are generated from the transaction data (109) in a way as illustrated in FIGS. 2 and 3. For example, in FIG. 3, an aggregated spending profile (341) is generated via the factor analysis (327) and cluster analysis (329) to summarize (335) the spending patterns/behaviors reflected in the transaction records (301).

Figure 4:
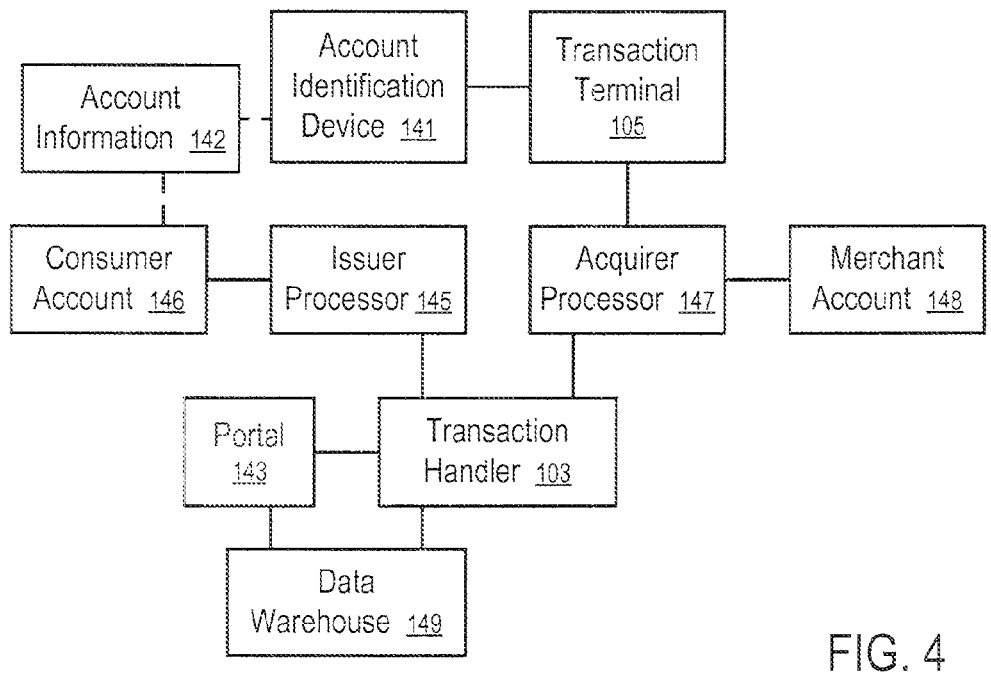
FIG. 4 shows a system to provide information based on transaction data according to one embodiment.

In one embodiment, a data warehouse (149) as illustrated in FIG. 4 is coupled with the transaction handler (103) to store the transaction data (109) and other data, such as account data (111), transaction profiles (127) and correlation results (123). In FIG. 4, a portal (143) is coupled with the data warehouse (149) to provide data or information derived from the transaction data (109), in response to a query request from a third party or as an alert or notification message.

In FIG. 4, the transaction handler (103) is coupled between an issuer processor (145) in control of a consumer account (146) and an acquirer processor (147) in control of a merchant account (148). An account identification device (141) is configured to carry the account information (142) that identifies the consumer account (146) with the issuer processor (145) and provide the account information (142) to the transaction terminal (105) of a merchant to initiate a transaction between the user (101) and the merchant.

Figure 5:
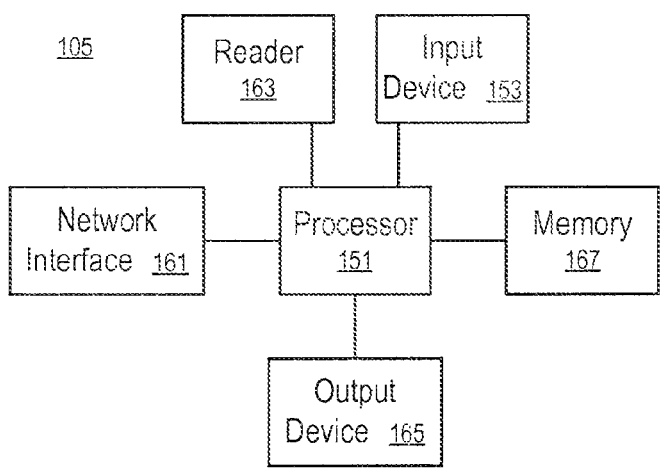
FIG. 5 illustrates a transaction terminal according to one embodiment.
Figure 6:
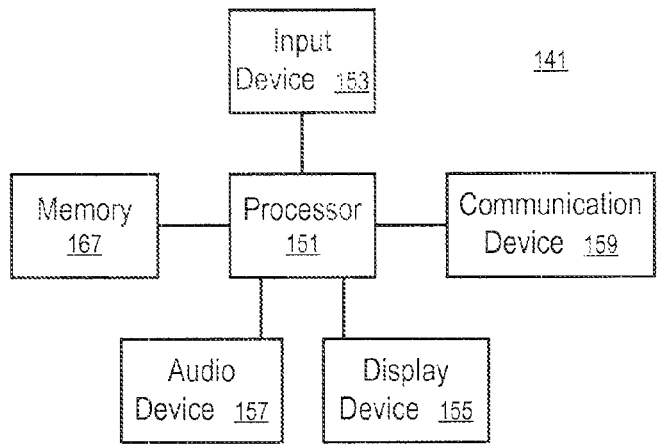
FIG. 6 illustrates an account identifying device according to one embodiment.
Figure 7:
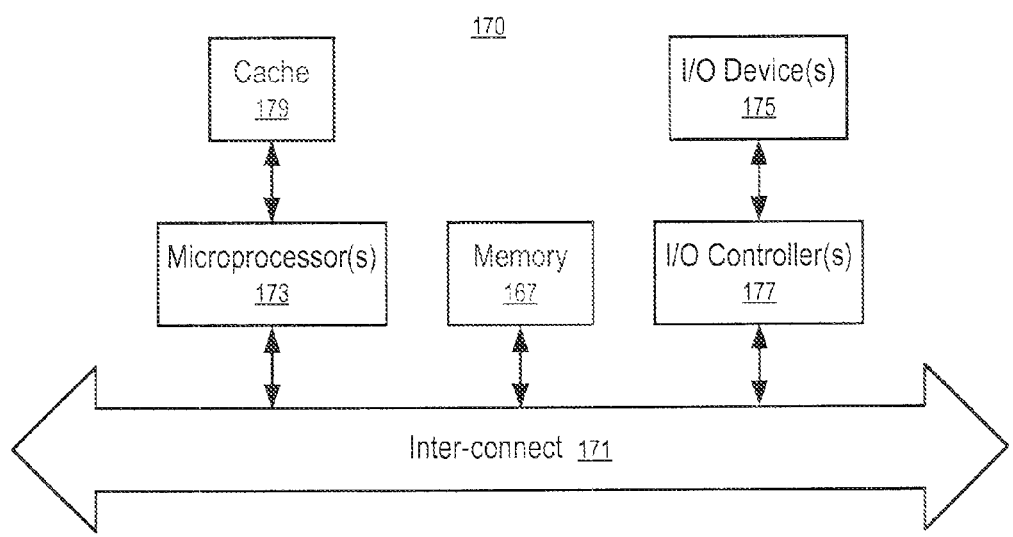
FIG. 7 illustrates a data processing system according to one embodiment.

FIGS. 5 and 6 illustrate examples of transaction terminals (105) and account identification devices (141). FIG. 7 illustrates the structure of a data processing system that can be used to implement, with more or fewer elements, at least some of the components in the system, such as the point of interaction (107), the transaction handler (103), the portal (143), the data warehouse, the account identification device (141), the transaction terminal (105), the user tracker (113), the profile generator (121), the profile selector (129), the advertisement selector (133), the media controller (115), etc. Some embodiments use more or fewer components than those illustrated in FIGS. 1 and 4-7, as further discussed in the section entitled "VARIATIONS."

In one embodiment, the transaction data (109) relates to financial transactions processed by the transaction handler (103); and the account data (111) relates to information about the account holders involved in the transactions. Further data, such as merchant data that relates to the location, business, products and/or services of the merchants that receive payments from account holders for their purchases, can be used in the generation of the transaction profiles (127, 341).

In one embodiment, the financial transactions are made via an account identification device (141), such as financial transaction cards (e.g., credit cards, debit cards, banking cards, etc.); the financial transaction cards may be embodied in various devices, such as plastic cards, chips, radio frequency identification (RFID) devices, mobile phones, personal digital assistants (PDAs), etc.; and the financial transaction cards may be represented by account identifiers (e.g., account numbers or aliases). In one embodiment, the financial transactions are made via directly using the account information (142), without physically presenting the account identification device (141).

Further features, modifications and details are provided in various sections of this description.

Centralized Data Warehouse

In one embodiment, the transaction handler (103) maintains a centralized data warehouse (149) organized around the transaction data (109). For example, the centralized data warehouse (149) may include, and/or support the determination of, spend band distribution, transaction count and amount, merchant categories, merchant by state, cardholder segmentation by velocity scores, and spending within merchant target, competitive set and cross-section.

In one embodiment, the centralized data warehouse (149) provides centralized management but allows decentralized execution. For example, a third party strategic marketing analyst, statistician, marketer, promoter, business leader, etc., may access the centralized data warehouse (149) to analyze customer and shopper data, to provide follow-up analyses of customer contributions, to develop propensity models for increased conversion of marketing campaigns, to develop segmentation models for marketing, etc. The centralized data warehouse (149) can be used to manage advertisement campaigns and analyze response profitability.

In one embodiment, the centralized data warehouse (149) includes merchant data (e.g., data about sellers), customer/business data (e.g., data about buyers), and transaction records (301) between sellers and buyers over time. The centralized data warehouse (149) can be used to support corporate sales forecasting, fraud analysis reporting, sales/customer relationship management (CRM) business intelligence, credit risk prediction and analysis, advanced authorization reporting, merchant benchmarking, business intelligence for small business, rewards, etc.

In one embodiment, the transaction data (109) is combined with external data, such as surveys, benchmarks, search engine statistics, demographics, competition information, emails, etc., to flag key events and data values, to set customer, merchant, data or event triggers, and to drive new transactions and new customer contacts.

Transaction Profile

In FIG. 1, the profile generator (121) generates transaction profiles (127) based on the transaction data (109), the account data (111), and/or other data, such as non-transactional data, wish lists, merchant provided information, address information, information from social network websites, information from credit bureaus, information from search engines, information about insurance claims, information from DNA databanks, and other examples discussed in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the transaction profiles (127) provide intelligence information on the behavior, pattern, preference, propensity, tendency, frequency, trend, and budget of the user (101) in making purchases. In one embodiment, the transaction profiles (127) include information about what the user (101) owns, such as points, miles, or other rewards currency, available credit, and received offers, such as coupons loaded into the accounts of the user (101). In one embodiment, the transaction profiles (127) include information based on past offer/coupon redemption patterns. In one embodiment, the transaction profiles (127) include information on shopping patterns in retail stores as well as online, including frequency of shopping, amount spent in each shopping trip, distance of merchant location (retail) from the address of the account holder(s), etc.

In one embodiment, the transaction handler (103) provides at least part of the intelligence for the prioritization, generation, selection, customization and/or adjustment of the advertisement for delivery within a transaction process involving the transaction handler (103). For example, the advertisement may be presented to a customer in response to the customer making a payment via the transaction handler (103).

Some of the transaction profiles (127) are specific to the user (101), or to an account of the user (101), or to a group of users of which the user (101) is a member, such as a household, family, company, neighborhood, city, or group identified by certain characteristics related to online activities, offline purchase activities, merchant propensity, etc.

In one embodiment, the profile generator (121) generates and updates the transaction profiles (127) in batch mode periodically. In other embodiments, the profile generator (121) generates the transaction profiles (127) in real time, or just in time, in response to a request received in the portal (143) for such profiles.

In one embodiment, the transaction profiles (127) include the values for a set of parameters. Computing the values of the parameters may involve counting transactions that meet one or more criteria, and/or building a statistically-based model in which one or more calculated values or transformed values are put into a statistical algorithm that weights each value to optimize its collective predictiveness for various predetermined purposes.

Further details and examples about the transaction profiles (127) in one embodiment are provided in the section entitled "AGGREGATED SPENDING PROFILE."

Non-Transactional Data

In one embodiment, the transaction data (109) is analyzed in connection with non-transactional data to generate transaction profiles (127) and/or to make predictive models.

In one embodiment, transactions are correlated with non-transactional events, such as news, conferences, shows, announcements, market changes, natural disasters, etc. to establish cause and effect relations to predict future transactions or spending patterns. For example, non-transactional data may include the geographic location of a news event, the date of an event from an events calendar, the name of a performer for an upcoming concert, etc. The non-transactional data can be obtained from various sources, such as newspapers, websites, blogs, social networking sites, etc.

In one embodiment, when the cause and effect relationships between the transactions and non-transactional events are known (e.g., based on prior research results, domain knowledge, expertise), the relationships can be used in predictive models to predict future transactions or spending patterns, based on events that occurred recently or are happening in real time.

In one embodiment, the non-transactional data relates to events that happened in a geographical area local to the user (101) that performed the respective transactions. In one embodiment, a geographical area is local to the user (101) when the distance from the user (101) to locations in the geographical area is within a convenient range for daily or regular travel, such as 20, 50 or 100 miles from an address of the user (101), or within the same city or zip code area of an address of the user (101). Examples of analyses of local non-transactional data in connection with transaction data (109) in one embodiment are provided in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the non-transactional data is not limited to local non-transactional data. For example, national non-transactional data can also be used.

In one embodiment, the transaction records (301) are analyzed in frequency domain to identify periodic features in spending events. The periodic features in the past transaction records (301) can be used to predict the probability of a time window in which a similar transaction would occur. For example, the analysis of the transaction data (109) can be used to predict when a next transaction having the periodic feature would occur, with which merchant, the probability of a repeated transaction with a certain amount, the probability of exception, the opportunity to provide an advertisement or offer such as a coupon, etc. In one embodiment, the periodic features are detected through counting the number of occurrences of pairs of transactions that occurred within a set of predetermined time intervals and separating the transaction pairs based on the time intervals. Some examples and techniques for the prediction of future transactions based on the detection of periodic features in one embodiment are provided in Prov. U.S. Pat. App. No. 61/175,381, filed May 4, 2009 and entitled "Systems and Methods for Determining Authorization, Risk Scores, and Prediction of Transactions," the disclosure of which is hereby incorporated herein by reference.

Techniques and details of predictive modeling in one embodiment are provided in U.S. Pat. Nos. 6,119,103, 6,018,723, 6,658,393, 6,598,030, and 7,227,950, the disclosures of which are hereby incorporated herein by reference.

In one embodiment, offers are based on the point-of-service to offeree distance to allow the user (101) to obtain in-person services. In one embodiment, the offers are selected based on transaction history and shopping patterns in the transaction data (109) and/or the distance between the user (101) and the merchant. In one embodiment, offers are provided in response to a request from the user (101), or in response to a detection of the location of the user (101). Examples and details of at least one embodiment are provided in U.S. patent application Ser. No. 11/767,218, filed Jun. 22, 2007, assigned Pub. No. 2008/0319843, and entitled "Supply of Requested Offer Based on Point-of Service to Offeree Distance," U.S. patent application Ser. No. 11/755,575, filed May 30, 2007, assigned Pub. No. 2008/0300973, and entitled "Supply of Requested Offer Based on Offeree Transaction History," U.S. patent application Ser. No. 11/855,042, filed Sep. 13, 2007, assigned Pub. No. 2009/0076896, and entitled "Merchant Supplied Offer to a Consumer within a Predetermined Distance," U.S. patent application Ser. No. 11/855, 069, filed Sep. 13, 2007, assigned Pub. No. 2009/0076925, and entitled "Offeree Requested Offer Based on Point-of Service to Offeree Distance," and U.S. patent application Ser. No. 12/428,302, filed Apr. 22, 2009 and entitled "Receiving an Announcement Triggered by Location Data," the disclosures of which applications are hereby incorporated herein by reference.

Targeting Advertisement

In FIG. 1, an advertisement selector (133) prioritizes, generates, selects, adjusts, and/or customizes the available advertisement data (135) to provide user specific advertisement data (119) based at least in part on the user specific profile (131). The advertisement selector (133) uses the user specific profile (131) as a filter and/or a set of criteria to generate, identify, select and/or prioritize advertisement data for the user (101). A media controller (115) delivers the user specific advertisement data (119) to the point of interaction (107) for presentation to the user (101) as the targeted and/or personalized advertisement.

In one embodiment, the user data (125) includes the characterization of the context at the point of interaction (107). Thus, the use of the user specific profile (131), selected using the user data (125), includes the consideration of the context at the point of interaction (107) in selecting the user specific advertisement data (119).

In one embodiment, in selecting the user specific advertisement data (119), the advertisement selector (133) uses not only the user specific profile (131), but also information regarding the context at the point of interaction (107). For example, in one embodiment, the user data (125) includes information regarding the context at the point of interaction (107); and the advertisement selector (133) explicitly uses the context information in the generation or selection of the user specific advertisement data (119).

In one embodiment, the advertisement selector (133) may query for specific information regarding the user (101) before providing the user specific advertisement data (119). The queries may be communicated to the operator of the transaction handler (103) and, in particular, to the transaction handler (103) or the profile generator (121). For example, the queries from the advertisement selector (133) may be transmitted and received in accordance with an application programming interface or other query interface of the transaction handler (103), the profile generator (121) or the portal (143) of the transaction handler (103).

In one embodiment, the queries communicated from the advertisement selector (133) may request intelligence information regarding the user (101) at any level of specificity (e.g., segment level, individual level). For example, the queries may include a request for a certain field or type of information in a cardholder's aggregate spending profile (341). As another example, the queries may include a request for the spending level of the user (101) in a certain merchant category over a prior time period (e.g., six months).

In one embodiment, the advertisement selector (133) is operated by an entity that is separate from the entity that operates the transaction handler (103). For example, the advertisement selector (133) may be operated by a search engine, a publisher, an advertiser, an ad network, or an online merchant. The user specific profile (131) is provided to the advertisement selector (133) to assist the customization of the user specific advertisement data (119).

In one embodiment, advertising is targeted based on shopping patterns in a merchant category (e.g., as represented by a Merchant Category Code (MCC)) that has high correlation of spending propensity with other merchant categories (e.g., other MCCs). For example, in the context of a first MCC for a targeted audience, a profile identifying second MCCs that have high correlation of spending propensity with the first MCC can be used to select advertisements for the targeted audience.

In one embodiment, the aggregated spending profile (341) is used to provide intelligence information about the spending patterns, preferences, and/or trends of the user (101). For example, a predictive model can be established based on the aggregated spending profile (341) to estimate the needs of the user (101). For example, the factor values (344) and/or the cluster ID (343) in the aggregated spending profile (341) can be used to determine the spending preferences of the user (101). For example, the channel distribution (345) in the aggregated spending profile (341) can be used to provide a customized offer targeted for a particular channel, based on the spending patterns of the user (101).

In one embodiment, mobile advertisements, such as offers and coupons, are generated and disseminated based on aspects of prior purchases, such as timing, location, and nature of the purchases, etc. In one embodiment, the size of the benefit of the offer or coupon is based on purchase volume or spending amount of the prior purchase and/or the subsequent purchase that may qualify for the redemption of the offer. Further details and examples of one embodiment are provided in Prov. U.S. patent application Ser. No. 11/960, 162, filed Dec. 19, 2007, assigned Pub. No. 2008/0201226, and entitled "Mobile Coupon Method and Portable Consumer Device for Utilizing Same," the disclosure of which is hereby incorporated herein by reference.

In one embodiment, conditional rewards are provided to the user (101); and the transaction handler (103) monitors the transactions of the user (101) to identify redeemable rewards that have satisfied the respective conditions. In one embodiment, the conditional rewards are selected based on transaction data (109). Further details and examples of one embodiment are provided in Prov. U.S. patent application Ser. No. 11/862,487, filed Sep. 27, 2007 and entitled "Consumer Specific Conditional Rewards," the disclosure of which is hereby incorporated herein by reference. The techniques to detect the satisfied conditions of conditional rewards can also be used to detect the transactions that satisfy the conditions specified to locate the transactions that result from online activities, such as online advertisements, searches, etc., to correlate the transactions with the respective online activities.

Further details about targeted offer delivery in one embodiment are provided in U.S. patent application Ser. No. 12/185, 332, filed Aug. 4, 2008, assigned Pub. No. 2010/0030644, and entitled "Targeted Advertising by Payment Processor History of Cashless Acquired Merchant Transaction on Issued Consumer Account," and in Prov. U.S. Pat. App. Ser. No. 61/250, 484, filed Oct. 9, 2009 and entitled "Systems and Methods for Targeted Advertisement Delivery," the disclosures of which are hereby incorporated herein by reference.

Profile Matching

In FIG. 1, the user tracker (113) obtains and generates context information about the user (101) at the point of interaction (107), including user data (125) that characterizes and/or identifies the user (101). The profile selector (129) selects a user specific profile (131) from the set of transaction profiles (127) generated by the profile generator (121), based on matching the characteristics of the transaction profiles (127) and the characteristics of the user data (125). For example, the user data (125) indicates a set of characteristics of the user (101); and the profile selector (129) selects the user specific profile (131) that is for a particular user or a group of users and that best matches the set of characteristics specified by the user data (125).

In one embodiment, the profile selector (129) receives the transaction profiles (127) in a batch mode. The profile selector (129) selects the user specific profile (131) from the batch of transaction profiles (127) based on the user data (125). Alternatively, the profile generator (121) generates the transaction profiles (127) in real time; and the profile selector (129) uses the user data (125) to query the profile generator (121) to generate the user specific profile (131) in real time, or just in time. The profile generator (121) generates the user specific profile (131) that best matches the user data (125).

In one embodiment, the user tracker (113) identifies the user (101) based on the user activity on the transaction terminal (105) (e.g., having visited a set of websites, currently visiting a type of web pages, search behavior, etc.).

In one embodiment, the user data (125) includes an identifier of the user (101), such as a global unique identifier (GUID), a personal account number (PAN) (e.g., credit card number, debit card number, or other card account number), or other identifiers that uniquely and persistently identify the user (101) within a set of identifiers of the same type. Alternatively, the user data (125) may include other identifiers, such as an Internet Protocol (IP) address of the user (101), a name or user name of the user (101), or a browser cookie ID, which identify the user (101) in a local, temporary, transient and/or anonymous manner. Some of these identifiers of the user (101) may be provided by publishers, advertisers, ad networks, search engines, merchants, or the user tracker (113). In one embodiment, such identifiers are correlated to the user (101) based on the overlapping or proximity of the time period of their usage to establish an identification reference table.

In one embodiment, the identification reference table is used to identify the account information (142) (e.g., account number (302)) based on characteristics of the user (101) captured in the user data (125), such as browser cookie ID, IP addresses, and/or timestamps on the usage of the IP addresses. In one embodiment, the identification reference table is maintained by the operator of the transaction handler (103). Alternatively, the identification reference table is maintained by an entity other than the operator of the transaction handler (103).

In one embodiment, the user tracker (113) determines certain characteristics of the user (101) to describe a type or group of users of which the user (101) is a member. The transaction profile of the group is used as the user specific profile (131). Examples of such characteristics include geographical location or neighborhood, types of online activities, specific online activities, or merchant propensity. In one embodiment, the groups are defined based on aggregate information (e.g., by time of day, or household), or segment (e.g., by cluster, propensity, demographics, cluster IDs, and/or factor values). In one embodiment, the groups are defined in part via one or more social networks. For example, a group may be defined based on social distances to one or more users on a social network website, interactions between users on a social network website, and/or common data in social network profiles of the users in the social network website.

In one embodiment, the user data (125) may match different profiles at a different granularity or resolution (e.g., account, user, family, company, neighborhood, etc.), with different degrees of certainty. The profile selector (129) and/or the profile generator (121) may determine or select the user specific profile (131) with the finest granularity or resolution with acceptable certainty. Thus, the user specific profile (131) is most specific or closely related to the user (101).

In one embodiment, the advertisement selector (133) uses further data in prioritizing, selecting, generating, customizing and adjusting the user specific advertisement data (119). For example, the advertisement selector (133) may use search data in combination with the user specific profile (131) to provide benefits or offers to a user (101) at the point of interaction (107). For example, the user specific profile (131) can be used to personalize the advertisement, such as adjusting the placement of the advertisement relative to other advertisements, adjusting the appearance of the advertisement, etc.

Browser Cookie

In one embodiment, the user data (125) uses browser cookie information to identify the user (101). The browser cookie information is matched to account information (142) or the account number (302) to identify the user specific profile (131), such as aggregated spending profile (341) to present effective, timely, and relevant marketing information to the user (101), via the preferred communication channel (e.g., mobile communications, web, mail, email, POS, etc.) within a window of time that could influence the spending behavior of the user (101). Based on the transaction data (109), the user specific profile (131) can improve audience targeting for online advertising. Thus, customers will get better advertisements and offers presented to them; and the advertisers will achieve better return-on-investment for their advertisement campaigns.

In one embodiment, the browser cookie that identifies the user (101) in online activities, such as web browsing, online searching, and using social networking applications, can be matched to an identifier of the user (101) in account data (111), such as the account number (302) of a financial payment card of the user (101) or the account information (142) of the account identification device (141) of the user (101). In one embodiment, the identifier of the user (101) can be uniquely identified via matching IP address, timestamp, cookie ID and/or other user data (125) observed by the user tracker (113).

In one embodiment, a look up table is used to map browser cookie information (e.g., IP address, timestamp, cookie ID) to the account data (111) that identifies the user (101) in the transaction handler (103). The look up table may be established via correlating overlapping or common portions of the user data (125) observed by different entities or different user trackers (113).

For example, in one embodiment, a first user tracker (113) observes the card number of the user (101) at a particular IP address for a time period identified by a timestamp (e.g., via an online payment process); a second user tracker (113) observes the user (101) having a cookie ID at the same IP address for a time period near or overlapping with the time period observed by the first user tracker (113). Thus, the cookie ID as observed by the second user tracker (113) can be linked to the card number of the user (101) as observed by the first user tracker (113). The first user tracker (113) may be operated by the same entity operating the transaction handler (103) or by a different entity. Once the correlation between the cookie ID and the card number is established via a database or a look up table, the cookie ID can be subsequently used to identify the card number of the user (101) and the account data (111).

In one embodiment, the portal (143) is configured to observe a card number of a user (101) while the user (101) uses an IP address to make an online transaction. Thus, the portal (143) can identify a consumer account (146) based on correlating an IP address used to identify the user (101) and IP addresses recorded in association with the consumer account (146).

For example, in one embodiment, when the user (101) makes a payment online by submitting the account information (142) to the transaction terminal (105) (e.g., an online store), the transaction handler (103) obtains the IP address from the transaction terminal (105) via the acquirer processor (147). The transaction handler (103) stores data to indicate the use of the account information (142) at the IP address at the time of the transaction request. When an IP address in the query received in the portal (143) matches the IP address previously recorded by the transaction handler (103), the portal (143) determines that the user (101) identified by the IP address in the request is the same user (101) associated with the account of the transaction initiated at the IP address. In one embodiment, a match is found when the time of the query request is within a predetermined time period from the transaction request, such as a few minutes, one hour, a day, etc. In one embodiment, the query may also include a cookie ID representing the user (101). Thus, through matching the IP address, the cookie ID is associated with the account information (142) in a persistent way.

In one embodiment, the portal (143) obtains the IP address of the online transaction directly. For example, in one embodiment, a user (101) chooses to use a password in the account data (111) to protect the account information (142) for online transactions. When the account information (142) is entered into the transaction terminal (105) (e.g., an online store or an online shopping cart system), the user (101) is connected to the portal (143) for the verification of the password (e.g., via a pop up window, or via redirecting the web browser of the user (101)). The transaction handler (103) accepts the transaction request after the password is verified via the portal (143). Through this verification process, the portal (143) and/or the transaction handler (103) obtain the IP address of the user (101) at the time the account information (142) is used.

In one embodiment, the web browser of the user (101) communicates the user provided password to the portal (143) directly without going through the transaction terminal (105) (e.g., the server of the merchant). Alternatively, the transaction terminal (105) and/or the acquirer processor (147) may relay the password communication to the portal (143) or the transaction handler (103).

In one embodiment, the portal (143) is configured to identify the consumer account (146) based on the IP address identified in the user data (125) through mapping the IP address to a street address. For example, in one embodiment, the user data (125) includes an IP address to identify the user (101); and the portal (143) can use a service to map the IP address to a street address. For example, an Internet service provider knows the street address of the currently assigned IP address. Once the street address is identified, the portal (143) can use the account data (111) to identify the consumer account (146) that has a current address at the identified street address. Once the consumer account (146) is identified, the portal (143) can provide a transaction profile (131) specific to the consumer account (146) of the user (101).

In one embodiment, the portal (143) uses a plurality of methods to identify consumer accounts (146) based on the user data (125). The portal (143) combines the results from the different methods to determine the most likely consumer account (146) for the user data (125).

Details about the identification of consumer account (146) based on user data (125) in one embodiment are provided in Prov. U.S. Pat. App. Ser. No. 61/252,119, filed Oct. 15, 2009 and entitled "Systems and Methods to Match Identifiers," the disclosure of which is hereby incorporated herein by reference.

Close the Loop

In one embodiment, the correlator (117) is used to "close the loop" for the tracking of consumer behavior across an on-line activity and an "off-line" activity that results at least in part from the on-line activity. In one embodiment, online activities, such as searching, web browsing, social networking, and/or consuming online advertisements, are correlated with respective transactions to generate the correlation result (123) in FIG. 1. The respective transactions may occur offline, in "brick and mortar" retail stores, or online but in a context outside the online activities, such as a credit card purchase that is performed in a way not visible to a search company that facilitates the search activities.

In one embodiment, the correlator (117) is to identify transactions resulting from searches or online advertisements. For example, in response to a query about the user (101) from the user tracker (113), the correlator (117) identifies an offline transaction performed by the user (101) and sends the correlation result (123) about the offline transaction to the user tracker (113), which allows the user tracker (113) to combine the information about the offline transaction and the online activities to provide significant marketing advantages.

For example, a marketing department could correlate an advertising budget to actual sales. For example, a marketer can use the correlation result (123) to study the effect of certain prioritization strategies, customization schemes, etc. on the impact on the actual sales. For example, the correlation result (123) can be used to adjust or prioritize advertisement placement on a web site, a search engine, a social networking site, an online marketplace, or the like.

In one embodiment, the profile generator (121) uses the correlation result (123) to augment the transaction profiles (127) with data indicating the rate of conversion from searches or advertisements to purchase transactions. In one embodiment, the correlation result (123) is used to generate predictive models to determine what a user (101) is likely to purchase when the user (101) is searching using certain keywords or when the user (101) is presented with an advertisement or offer. In one embodiment, the portal (143) is configured to report the correlation result (123) to a partner, such as a search engine, a publisher, or a merchant, to allow the partner to use the correlation result (123) to measure the effectiveness of advertisements and/or search result customization, to arrange rewards, etc.

Illustratively, a search engine entity may display a search page with particular advertisements for flat panel televisions produced by companies A, B, and C. The search engine entity may then compare the particular advertisements presented to a particular consumer with transaction data of that consumer and may determine that the consumer purchased a flat panel television produced by Company B. The search engine entity may then use this information and other information derived from the behavior of other consumers to determine the effectiveness of the advertisements provided by companies A, B, and C. The search engine entity can determine if the placement, the appearance, or other characteristic of the advertisement results in actual increased sales. Adjustments to advertisements (e.g., placement, appearance, etc.) may be made to facilitate maximum sales.

In one embodiment, the correlator (117) matches the online activities and the transactions based on matching the user data (125) provided by the user tracker (113) and the records of the transactions, such as transaction data (109) or transaction records (301). In another embodiment, the correlator (117)

matches the online activities and the transactions based on the redemption of offers/benefits provided in the user specific advertisement data (119).

In one embodiment, the portal (143) is configured to receive a set of conditions and an identification of the user (101), determine whether there is any transaction of the user (101) that satisfies the set of conditions, and if so, provide indications of the transactions that satisfy the conditions and/or certain details about the transactions, which allows the requester to correlate the transactions with certain user activities, such as searching, web browsing, consuming advertisements, etc.

In one embodiment, the requester may not know the account number (302) of the user (101); and the portal (143) is to map the identifier provided in the request to the account number (302) of the user (101) to provide the requested information. Examples of the identifier being provided in the request to identify the user (101) include an identification of an iFrame of a web page visited by the user (101), a browser cookie ID, an IP address and the day and time corresponding to the use of the IP address, etc.

The information provided by the portal (143) can be used in pre-purchase marketing activities, such as customizing content or offers, prioritizing content or offers, selecting content or offers, etc., based on the spending pattern of the user (101). The content that is customized, prioritized, selected, or recommended may be the search results, blog entries, items for sale, etc.

The information provided by the portal (143) can be used in post-purchase activities. For example, the information can be used to correlate an offline purchase with online activities. For example, the information can be used to determine purchases made in response to media events, such as television programs, advertisements, news announcements, etc.

Details about profile delivery, online activity to offline purchase tracking, techniques to identify the user specific profile (131) based on user data (125) (such as IP addresses), and targeted delivery of advertisement/offer/benefit in some embodiments are provided in Prov. U.S. Pat. App. Ser. No. 61/250,482, filed Oct. 9, 2009 and entitled "Systems and Methods to Deliver Targeted Advertisements to Audience," Prov. U.S. Pat. App. Ser. No. 61/231,244, filed Aug. 4, 2009 and entitled "Systems and Methods for Profile-Based Advertisement Delivery," Prov. U.S. Pat. App. Ser. No. 61/231,251, filed Aug. 4, 2009 and entitled "Systems and Methods for Online Search to Offline Purchase Tracking," Prov. U.S. Pat. App. Ser. No. 61/232,114, filed Aug. 7, 2009 and entitled "Closed Loop Processing Including Abstracted Data," Prov. U.S. Pat. App. Ser. No. 61/232,354, filed Aug. 7, 2009 and entitled "Closed Loop Process Providing Benefit," Prov. U.S. Pat. App. Ser. No. 61/232,375, filed Aug. 7, 2009 and entitled "Social Network Validation," and Prov. U.S. Pat. App. Ser. No. 61/232,742, filed Aug. 10, 2009 and entitled "Cell Marketplace," the disclosures of which applications are incorporated herein by reference.

Matching Advertisement & Transaction

In one embodiment, the correlator (117) is configured to receive information about the user specific advertisement data (119), monitor the transaction data (109), identify transactions that can be considered results of the advertisement corresponding to the user specific advertisement data (119), and generate the correlation result (123), as illustrated in FIG. 1.

When the advertisement and the corresponding transaction both occur in an online checkout process, a website used for the online checkout process can be used to correlate the transaction and the advertisement. However, the advertisement and the transaction may occur in separate processes and/or under control of different entities (e.g., when the purchase is made offline at a retail store, while the advertisement is presented outside the retail store). In one embodiment, the correlator (117) uses a set of correlation criteria to identify the transactions that can be considered as the results of the advertisements.

In one embodiment, the correlator (117) identifies the transactions linked or correlated to the user specific advertisement data (119) based on various criteria. For example, the user specific advertisement data (119) may include a coupon offering a benefit contingent upon a purchase made according to the user specific advertisement data (119). The use of the coupon identifies the user specific advertisement data (119), and thus allows the correlator (117) to correlate the transaction with the user specific advertisement data (119).

In one embodiment, the user specific advertisement data (119) is associated with the identity or characteristics of the user (101), such as global unique identifier (GUID), personal account number (PAN), alias, IP address, name or user name, geographical location or neighborhood, household, user group, and/or user data (125). The correlator (117) can link or match the transactions with the advertisements based on the identity or characteristics of the user (101) associated with the user specific advertisement data (119). For example, the portal (143) may receive a query identifying the user data (125) that tracks the user (101) and/or characteristics of the user specific advertisement data (119); and the correlator (117) identifies one or more transactions matching the user data (125) and/or the characteristics of the user specific advertisement data (119) to generate the correlation result (123).

In one embodiment, the correlator (117) identifies the characteristics of the transactions and uses the characteristics to search for advertisements that match the transactions. Such characteristics may include GUID, PAN, IP address, card number, browser cookie information, coupon, alias, etc.

In FIG. 1, the profile generator (121) uses the correlation result (123) to enhance the transaction profiles (127) generated from the profile generator (121). The correlation result (123) provides details on the purchases and/or indicates the effectiveness of the user specific advertisement data (119).

In one embodiment, the correlation result (123) is used to demonstrate to the advertisers the effectiveness of the advertisements, to process incentive or rewards associated with the advertisements, to obtain at least a portion of advertisement revenue based on the effectiveness of the advertisements, to improve the selection of advertisements, etc.

Coupon Matching

In one embodiment, the correlator (117) identifies a transaction that is a result of an advertisement (e.g., 119) when an offer or benefit provided in the advertisement is redeemed via the transaction handler (103) in connection with a purchase identified in the advertisement.

For example, in one embodiment, when the offer is extended to the user (101), information about the offer can be stored in association with the account of the user (101) (e.g., as part of the account data (111)). The user (101) may visit the portal (143) of the transaction handler (103) to view the stored offer.

The offer stored in the account of the user (101) may be redeemed via the transaction handler (103) in various ways. For example, in one embodiment, the correlator (117) may download the offer to the transaction terminal (105) via the transaction handler (103) when the characteristics of the transaction at the transaction terminal (105) match the characteristics of the offer.

After the offer is downloaded to the transaction terminal (105), the transaction terminal (105) automatically applies the offer when the condition of the offer is satisfied in one embodiment. Alternatively, the transaction terminal (105) allows the user (101) to selectively apply the offers downloaded by the correlator (117) or the transaction handler (103). In one embodiment, the correlator (117) sends reminders to the user (101) at a separate point of interaction (107) (e.g., a mobile phone) to remind the user (101) to redeem the offer. In one embodiment, the transaction handler (103) applies the offer (e.g., via statement credit), without having to download the offer (e.g., coupon) to the transaction terminal (105). Examples and details of redeeming offers via statement credit are provided in U.S. patent application Ser. No. 12/566,350, filed Sep. 24, 2009 and entitled "Real-Time Statement Credits and Notifications," the disclosure of which is hereby incorporated herein by reference.

In one embodiment, the offer is captured as an image and stored in association with the account of the user (101). Alternatively, the offer is captured in a text format (e.g., a code and a set of criteria), without replicating the original image of the coupon.

In one embodiment, when the coupon is redeemed, the advertisement presenting the coupon is correlated with a transaction in which the coupon is redeemed, and/or is determined to have resulted in a transaction. In one embodiment, the correlator (117) identifies advertisements that have resulted in purchases, without having to identify the specific transactions that correspond to the advertisements.

Details about offer redemption via the transaction handler (103) in one embodiment are provided in Prov. U.S. Pat. App. Ser. No. 61/264,236, filed Nov. 24, 2009 and entitled "Systems and Methods for Multi-Channel Offer Redemption," the disclosure of which is hereby incorporated herein by reference.

On ATM & POS Terminal

In one example, the transaction terminal (105) is an automatic teller machine (ATM), which is also the point of interaction (107). When the user (101) approaches the ATM to make a transaction (e.g., to withdraw cash via a credit card or debit card), the ATM transmits account information (142) to the transaction handler (103). The account information (142) can also be considered as the user data (125) to select the user specific profile (131). The user specific profile (131) can be sent to an advertisement network to query for a targeted advertisement. After the advertisement network matches the user specific profile (131) with user specific advertisement data (119) (e.g., a targeted advertisement), the transaction handler (103) may send the advertisement to the ATM, together with the authorization for cash withdrawal.

In one embodiment, the advertisement shown on the ATM includes a coupon that offers a benefit that is contingent upon the user (101) making a purchase according to the advertisement. The user (101) may view the offer presented on a white space on the ATM screen and select to load or store the coupon in a storage device of the transaction handler (103) under the account of the user (101). The transaction handler (103) communicates with the bank to process the cash withdrawal. After the cash withdrawal, the ATM prints the receipt which includes a confirmation of the coupon, or a copy of the coupon. The user (101) may then use the coupon printed on the receipt. Alternatively, when the user (101) uses the same account to make a relevant purchase, the transaction handler (103) may automatically apply the coupon stored under the account of the user (101), or automatically download the coupon to the relevant transaction terminal (105), or transmit the coupon to the mobile phone of the user (101) to allow the user (101) to use the coupon via a display of the coupon on the mobile phone. The user (101) may visit a web portal (143) of the transaction handler (103) to view the status of the coupons collected in the account of the user (101).

In one embodiment, the advertisement is forwarded to the ATM via the data stream for authorization. In another embodiment, the ATM makes a separate request to a server of the transaction handler (103) (e.g., a web portal) to obtain the advertisement. Alternatively, or in combination, the advertisement (including the coupon) is provided to the user (101) at separate, different points of interactions, such as via a text message to a mobile phone of the user (101), via an email, via a bank statement, etc.

Details of presenting targeted advertisements on ATMs based on purchasing preferences and location data in one embodiment are provided in U.S. patent application Ser. No. 12/266,352, filed Nov. 6, 2008 and entitled "System Including Automated Teller Machine with Data Bearing Medium," the disclosure of which is hereby incorporated herein by reference.

In another example, the transaction terminal (105) is a POS terminal at the checkout station in a retail store (e.g., a self-service checkout register). When the user (101) pays for a purchase via a payment card (e.g., a credit card or a debit card), the transaction handler (103) provides a targeted advertisement having a coupon obtained from an advertisement network. The user (101) may load the coupon into the account of the payment card and/or obtain a hardcopy of the coupon from the receipt. When the coupon is used in a transaction, the advertisement is linked to the transaction.

Details of presenting targeted advertisements during the process of authorizing a financial payment card transaction in one embodiment are provided in U.S. patent application Ser. No. 11/799,549, filed May 1, 2007, assigned Pub. No. 2008/0275771, and entitled "Merchant Transaction Based Advertising," the disclosure of which is hereby incorporated herein by reference.

In one embodiment, the user specific advertisement data (119), such as offers or coupons, is provided to the user (101) via the transaction terminal (105) in connection with an authorization message during the authorization of a transaction processed by the transaction handler (103). The authorization message can be used to communicate the rewards qualified for by the user (101) in response to the current transaction, the status and/or balance of rewards in a loyalty program, etc. Examples and details related to the authorization process in one embodiment are provided in U.S. patent application Ser. No. 11/266,766, filed Nov. 2, 2005, assigned Pub. No. 2007/0100691, and entitled "Method and System for Conducting Promotional Programs," the disclosure of which is hereby incorporated herein by reference.

In one embodiment, when the user (101) is conducting a transaction with a first merchant via the transaction handler (103), the transaction handler (103) may determine whether the characteristics of the transaction satisfy the conditions specified for an announcement, such as an advertisement, offer or coupon, from a second merchant. If the conditions are satisfied, the transaction handler (103) provides the announcement to the user (101). In one embodiment, the transaction handler (103) may auction the opportunity to provide the announcements to a set of merchants. Examples and details related to the delivery of such announcements in one embodiment are provided in U.S. patent application Ser. No. 12/428,241, filed Apr. 22, 2009 and entitled "Targeting Merchant Announcements Triggered by Consumer Activity Relative to a Surrogate Merchant," the disclosure of which is hereby incorporated herein by reference.

On Third Party Site

In a further example, the user (101) may visit a third party website, which is the point of interaction (107) in FIG. 1. The third party website may be a web search engine, a news website, a blog, a social network site, etc. The behavior of the user (101) at the third party website may be tracked via a browser cookie, which uses a storage space of the browser to store information about the user (101) at the third party website. Alternatively, or in combination, the third party website uses the server logs to track the activities of the user (101). In one embodiment, the third party website may allow an advertisement network to present advertisements on portions of the web pages. The advertisement network tracks the user behavior using its server logs and/or browser cookies. For example, the advertisement network may use a browser cookie to identify a particular user across multiple websites. Based on the referral uniform resource locators (URL) that cause the advertisement network to load advertisements in various web pages, the advertisement network can determine the online behavior of the user (101) via analyzing the web pages that the user (101) has visited. Based on the tracked online activities of the user (101), the user data (125) that characterizes the user (101) can be formed to query the profiler selector (129) for a user specific profile (131).

In one embodiment, the cookie identity of the user (101) as tracked using the cookie can be correlated to an account of the user (101), the family of the user (101), the company of the user (101), or other groups that include the user (101) as a member. Thus, the cookie identity can be used as the user data (125) to obtain the user specific profile (131). For example, when the user (101) makes an online purchase from a web page that contains an advertisement that is tracked with the cookie identity, the cookie identity can be correlated to the online transaction and thus to the account of the user (101). For example, when the user (101) visits a web page after authentication of the user (101), and the web page includes an advertisement from the advertisement network, the cookie identity can be correlated to the authenticated identity of the user (101). For example, when the user (101) signs in to a web portal of the transaction handler (103) to access the account of the user (101), the cookie identity used by the advertisement network on the web portal can be correlated to the account of the user (101).

Other online tracking techniques can also be used to correlate the cookie identity of the user (101) with an identifier of the user (101) known by the profile selector (129), such as a GUID, PAN, account number, customer number, social security number, etc. Subsequently, the cookie identity can be used to select the user specific profile (131).

Multiple Communications

In one embodiment, the entity operating the transaction handler (103) may provide intelligence for providing multiple communications regarding an advertisement. The multiple communications may be directed to two or more points of interaction with the user (101).

For example, after the user (101) is provided with an advertisement via the transaction terminal (105), reminders or revisions to the advertisements can be sent to the user (101) via a separate point of interaction (107), such as a mobile phone, email, text message, etc. For example, the advertisement may include a coupon to offer the user (101) a benefit contingent upon a purchase. If the correlator (117) determines that the coupon has not been redeemed, the correlator (117) may send a message to the mobile phone of the user (101) to remind the user (101) about the offer, and/or revise the offer.

Examples of multiple communications related to an offer in one embodiment are provided in U.S. patent application Ser. No. 12/510,167, filed Jul. 27, 2009 and entitled "Successive Offer Communications with an Offer Recipient," the disclosure of which is hereby incorporated herein by reference.

Auction Engine

In one embodiment, the transaction handler (103) provides a portal to allow various clients to place bids according to clusters (e.g., to target entities in the clusters for marketing, monitoring, researching, etc.)

For example, the cardholders may register in a program to receive offers, such as promotions, discounts, sweepstakes, reward points, direct mail coupons, email coupons, etc. The cardholders may register with issuers, or with the portal (143) of the transaction handler (103). Based on the transaction data (109) or transaction records (301) and/or the registration data, the profile generator (121) is to identify the clusters of cardholders and the values representing the affinity of the cardholders to the clusters. Various entities may place bids according to the clusters and/or the values to gain access to the cardholders, such as the user (101). For example, an issuer may bid on access to offers; an acquirer and/or a merchant may bid on customer segments. An auction engine receives the bids and awards segments and offers based on the received bids. Thus, the customers can get great deals; and merchants can get customer traffic and thus sales.

Some techniques to identify a segment of users (101) for marketing are provided in U.S. patent application Ser. No. 12/288,490, filed Oct. 20, 2008, assigned Pub. No. 2009/0222323, and entitled "Opportunity Segmentation," U.S. patent application Ser. No. 12/108,342, filed Apr. 23, 2008, assigned Pub. No. 2009/0271305, and entitled "Payment Portfolio Optimization," and U.S. patent application Ser. No. 12/108,354, filed Apr. 23, 2008, assigned Pub. No. 2009/0271327, and entitled "Payment Portfolio Optimization," the disclosures of which applications are hereby incorporated herein by reference.

Social Network Validation

In one embodiment, the transaction data (109) is combined with social network data and/or search engine data to provide benefits (e.g., coupons) to a consumer. For example, a data exchange apparatus may identify cluster data based upon consumer search engine data, social network data, and payment transaction data to identify like groups of individuals who would respond favorably to particular types of benefits such as coupons and statement credits. Advertisement campaigns may be formulated to target the cluster of cardholders.

In one embodiment, search engine data is combined with social network data and/or the transaction data (109) to evaluate the effectiveness of the advertisements and/or conversion pattern of the advertisements. For example, after a search engine displays advertisements about flat panel televisions to a consumer, a social network that is used by a consumer may provide information about a related purchase made by the consumer. For example, the blog of the consumer, and/or the transaction data (109), may indicate that the flat panel television purchased by the consumer is from company B. Thus, the search engine data and the social network data and/or the transaction data (109) can be combined to correlate advertisements to purchases resulting from the advertisements and to determine the conversion pattern of the advertisement to the consumer. Adjustments to advertisements (e.g., placement, appearance, etc.) can be made to improve the effectiveness of the advertisements and thus increase sales.

Loyalty Program

In one embodiment, the transaction handler (103) uses the account data (111) to store information for third party loyalty programs. The transaction handler (103) processes payment transactions made via financial transaction cards, such as credit cards, debit cards, banking cards, etc.; and the financial transaction cards can be used as loyalty cards for the respective third party loyalty programs. Since the third party loyalty programs are hosted on the transaction handler (103), the consumers do not have to carry multiple, separate loyalty cards (e.g., one for each merchant that offers a loyalty program); and the merchants do not have to spend a large setup and investment fee to establish the loyalty program. The loyalty programs hosted on the transaction handler (103) can provide flexible awards for consumers, retailers, manufacturers, issuers, and other types of business entities involved in the loyalty programs. The integration of the loyalty programs into the accounts of the customers on the transaction handler (103) allows new offerings, such as merchant cross-offerings or bundling of loyalty offerings.

In one embodiment, an entity operating the transaction handler (103) hosts loyalty programs for third parties using the account data (111) of the users (e.g., 101). A third party, such as a merchant, a retailer, a manufacturer, an issuer or other entity that is interested in promoting certain activities and/or behaviors, may offer loyalty rewards on existing accounts of consumers. The incentives delivered by the loyalty programs can drive behavior changes without the hassle of loyalty card creation. In one embodiment, the loyalty programs hosted via the accounts of the users (e.g., 101) of the transaction handler (103) allow the consumers to carry fewer cards and may provide more data to the merchants than traditional loyalty programs.

The loyalty programs integrated with the accounts of the users (e.g., 101) of the transaction handler (103) can provide tools to enable nimble programs that are better aligned for driving changes in consumer behaviors across transaction channels (e.g., online, offline, via mobile devices). The loyalty programs can be ongoing programs that accumulate benefits for the customers (e.g., points, miles, cash back), and/or programs that provide one time benefits or limited time benefits (e.g., rewards, discounts, incentives).

Figure 8:
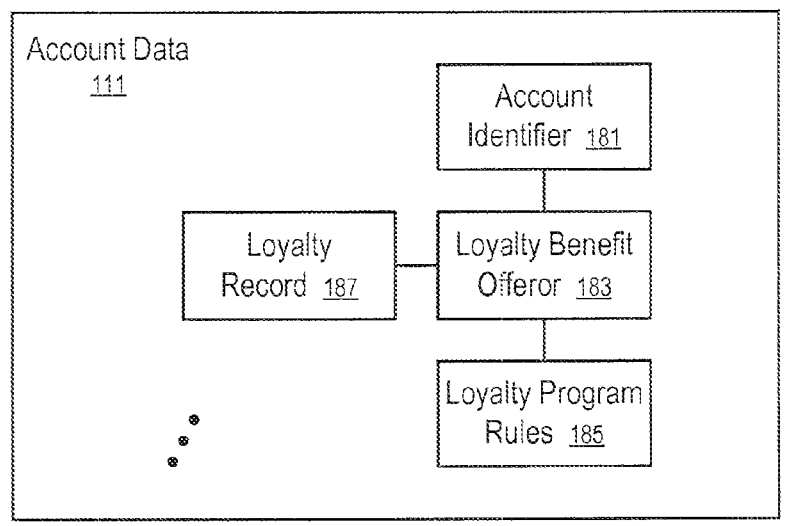
FIG. 8 shows the structure of account data for providing loyalty programs according to one embodiment.

FIG. 8 shows the structure of account data (111) for providing loyalty programs according to one embodiment. In FIG. 8, data related to a third party loyalty program may include an identifier of the loyalty benefit offeror (183) that is linked to a set of loyalty program rules (185) and loyalty record (187) for the loyalty program activities of the account identifier (181). In one embodiment, at least part of the data related to the third party loyalty program is stored under the account identifier (181) of the user (101), such as the loyalty record (187).

FIG. 8 illustrates the data related to one third party loyalty program of a loyalty benefit offeroro (183). In one embodiment, the account identifier (181) may be linked to multiple loyalty benefit offerors (e.g., 183), corresponding to different third party loyalty programs.

In one embodiment, a third party loyalty program of the loyalty benefit offeror (183) provides the user (101), identified by the account identifier (181), with benefits, such as discounts, rewards, incentives, cash back, gifts, coupons, and/or privileges.

In one embodiment, the association between the account identifier (181) and the loyalty benefit offeror (183) in the account data (111) indicates that the user (101) having the account identifier (181) is a member of the loyalty program. Thus, the user (101) may use the account identifier (181) to access privileges afforded to the members of the loyalty programs, such as rights to access a member only area, facility, store, product or service, discounts extended only to members, or opportunities to participate in certain events, buy certain items, or receive certain services reserved for members.

In one embodiment, it is not necessary to make a purchase to use the privileges. The user (101) may enjoy the privileges based on the status of being a member of the loyalty program. The user (101) may use the account identifier (181) to show the status of being a member of the loyalty program.

For example, the user (101) may provide the account identifier (181) (e.g., the account number of a credit card) to the transaction terminal (105) to initiate an authorization process for a special transaction which is designed to check the member status of the user (101), as if the account identifier (181) were used to initiate an authorization process for a payment transaction. The special transaction is designed to verify the member status of the user (101) via checking whether the account data (111) is associated with the loyalty benefit offeror (183). If the account identifier (181) is associated with the corresponding loyalty benefit offeror (183), the transaction handler (103) provides an approval indication in the authorization process to indicate that the user (101) is a member of the loyalty program. The approval indication can be used as a form of identification to allow the user (101) to access member privileges, such as access to services, products, opportunities, facilities, discounts, permissions, which are reserved for members.

In one embodiment, when the account identifier (181) is used to identify the user (101) as a member to access member privileges, the transaction handler (103) stores information about the access of the corresponding member privilege in loyalty record (187). The profile generator (121) may use the information accumulated in the loyalty record (187) to enhance transaction profiles (127) and provide the user (101) with personalized/targeted advertisements, with or without further offers of benefit (e.g., discounts, incentives, rebates, cash back, rewards, etc.).

In one embodiment, the association of the account identifier (181) and the loyalty benefit offeror (183) also allows the loyalty benefit offeror (183) to access at least a portion of the account data (111) relevant to the loyalty program, such as the loyalty record (187) and certain information about the user (101), such as name, address, and other demographic data.

In one embodiment, the loyalty program allows the user (101) to accumulate benefits according to loyalty program rules (185), such as reward points, cash back, levels of discounts, etc. For example, the user (101) may accumulate reward points for transactions that satisfy the loyalty program rules (185); and the user (101) may use the reward points to redeem cash, gift, discounts, etc. In one embodiment, the loyalty record (187) stores the accumulated benefits; and the transaction handler (103) updates the loyalty record (187) associated with the loyalty benefit offeror (183) and the account identifier (181), when events that satisfy the loyalty program rules occur.

In one embodiment, the accumulated benefits as indicated in the loyalty record (187) can be redeemed when the account identifier (181) is used to perform a payment transaction, when the payment transaction satisfies the loyalty program rules. For example, the user (101) may redeem a number of points to offset or reduce an amount of the purchase price.

In one embodiment, when the user (101) uses the account identifier (181) to make purchases as a member, the merchant may further provide information about the purchases; and the transaction handler (103) can store the information about the purchases as part of the loyalty record (187). The information about the purchases may identify specific items or services purchased by the member. For example, the merchant may provide the transaction handler (103) with purchase details at stock-keeping unit (SKU) level, which are then stored as part of the loyalty record (187). The loyalty benefit offeror (183) may use the purchase details to study the purchase behavior of the user (101); and the profile generator (121) may use the SKU level purchase details to enhance the transaction profiles (127).

In one embodiment, the SKU level purchase details are requested from the merchants or retailers via authorization responses, when the account (146) of the user (101) is enrolled in a loyalty program that allows the transaction handler (103) (and/or the issuer processor (145)) to collect the purchase details.

In one embodiment, the profile generator (121) may generate transaction profiles (127) based on the loyalty record (187) and provide the transaction profiles (127) to the loyalty benefit offeror (183) (or other entities when permitted).

In one embodiment, the loyalty benefit offeror (183) may use the transaction profiles (e.g., 127 or 131) to select candidates for membership offering. For example, the loyalty program rules (185) may include one or more criteria that can be used to identify which customers are eligible for the loyalty program. The transaction handler (103) may be configured to automatically provide the qualified customers with the offer of membership in the loyalty program when the corresponding customers are performing transactions via the transaction handler (103) and/or via points of interaction (107) accessible to the entity operating the transaction handler (103), such as ATMs, mobile phones, receipts, statements, websites, etc. The user (101) may accept the membership offer via responding to the advertisement. For example, the user (101) may load the membership into the account in the same way as loading a coupon into the account of the user (101).

In one embodiment, the membership offer is provided as a coupon or is associated with another offer of benefits, such as a discount, reward, etc. When the coupon or benefit is redeemed via the transaction handler (103), the account data (111) is updated to enroll the user (101) into the corresponding loyalty program.

In one embodiment, a merchant may enroll a user (101) into a loyalty program when the user (101) is making a purchase at the transaction terminal (105) of the merchant.

For example, when the user (101) is making a transaction at an ATM, performing a self-assisted check out on a POS terminal, or making a purchase transaction on a mobile phone or a computer, the user (101) may be prompted to join a loyalty program, while the transaction is being authorized by the transaction handler (103). If the user (101) accepts the membership offer, the account data (111) is updated to have the account identifier (181) associated with the loyalty benefit offeror (183).

In one embodiment, the user (101) may be automatically enrolled in the loyalty program, when the profile of the user (101) satisfies a set of conditions specified in the loyalty program rules (185). The user (101) may opt out of the loyalty program.

In one embodiment, the loyalty benefit offeror (183) may personalize and/or target loyalty benefits based on the transaction profile (131) specific to or linked to the user (101). For example, the loyalty program rules (185) may use the user specific profile (131) to select gifts, rewards, or incentives for the user (101) (e.g., to redeem benefits, such as reward points, accumulated in the loyalty record (187)). The user specific profile (131) may be enhanced using the loyalty record (187), or generated based on the loyalty record (187). For example, the profile generator (121) may use a subset of transaction data (109) associated with the loyalty record (187) to generate the user specific profile (131), or provide more weight to the subset of the transaction data (109) associated with the loyalty record (187) while also using other portions of the transaction data (109) in deriving the user specific profile (131).

In one embodiment, the loyalty program may involve different entities. For example, a first merchant may offer rewards as discounts, or gifts from a second merchant that has a business relationship with the first merchant. For example, an entity may allow a user (101) to accumulate loyalty benefits (e.g., reward points) via purchase transactions at a group of different merchants. For example, a group of merchants may jointly offer a loyalty program, in which loyalty benefits (e.g., reward points) can be accumulated from purchases at any of the merchants in the group and redeemable in purchases at any of the merchants.

In one embodiment, the information identifying the user (101) as a member of a loyalty program is stored on a server connected to the transaction handler (103). Alternatively or in combination, the information identifying the user (101) as a member of a loyalty program can also be stored in the financial transaction card (e.g., in the chip, or in the magnetic strip).

In one embodiment, loyalty program offerors (e.g., merchants, manufactures, issuers, retailers, clubs, organizations, etc.) can compete with each other in making loyalty program related offers. For example, loyalty program offerors may place bids on loyalty program related offers; and the advertisement selector (133) (e.g., under the control of the entity operating the transaction handler (103), or a different entity) may prioritize the offers based on the bids. When the offers are accepted or redeemed by the user (101), the loyalty program offerors pay fees according to the corresponding bids. In one embodiment, the loyalty program offerors may place an auto bid or maximum bid, which specifies the upper limit of a bid; and the actual bid is determined to be the lowest possible bid that is larger than the bids of the competitors, without exceeding the upper limit.

In one embodiment, the offers are provided to the user (101) in response to the user (101) being identified by the user data (125). If the user specific profile (131) satisfies the conditions specified in the loyalty program rules (185), the offer from the loyalty benefit offeror (183) can be presented to the user (101). When there are multiple offers from different offerors, the offers can be prioritized according to the bids.

In one embodiment, the offerors can place bids based on the characteristics that can be used as the user data (125) to select the user specific profile (131). In another embodiment, the bids can be placed on a set of transaction profiles (127).

In one embodiment, the loyalty program based offers are provided to the user (101) just in time when the user (101) can accept and redeem the offers. For example, when the user (101) is making a payment for a purchase from a merchant, an offer to enroll in a loyalty program offered by the merchant or related offerors can be presented to the user (101). If the user (101) accepts the offer, the user (101) is entitled to receive member discounts for the purchase.

For example, when the user (101) is making a payment for a purchase from a merchant, a reward offer can be provided to the user (101) based on loyalty program rules (185) and the loyalty record (187) associated with the account identifier (181) of the user (101) (e.g., the reward points accumulated in a loyalty program). Thus, the user effort for redeeming the reward points can be reduced; and the user experience can be improved.

In one embodiment, a method to provide loyalty programs includes the use of a computing apparatus of a transaction handler (103). The computing apparatus processes (301) a plurality of payment card transactions. After the computing apparatus receives (303) a request to track transactions for a loyalty program, such as the loyalty program rules (185), the computing apparatus stores and updates (305) loyalty program information in response to transactions occurring in the loyalty program. The computing apparatus provides (307) to a customer (e.g., 101) an offer of a benefit when the customer satisfies a condition defined in the loyalty program, such as the loyalty program rules (185).

Examples of loyalty programs through collaboration between collaborative constituents in a payment processing system, including the transaction handler (103) in one embodiment are provided in U.S. patent application Ser. No. 11/767,202, filed Jun. 22, 2007, assigned Pub. No. 2008/0059302, and entitled "Loyalty Program Service," U.S. patent application Ser. No. 11/848,112, filed Aug. 30, 2007, assigned Pub. No. 2008/0059306, and entitled "Loyalty Program Incentive Determination," and U.S. patent application Ser. No. 11/848,179, filed Aug. 30, 2007, assigned Pub. No. 2008/0059307, and entitled "Loyalty Program Parameter Collaboration," the disclosures of which applications are hereby incorporated herein by reference.

Examples of processing the redemption of accumulated loyalty benefits via the transaction handler (103) in one embodiment are provided in U.S. patent application Ser. No. 11/835,100, filed Aug. 7, 2007, assigned Pub. No. 2008/0059303, and entitled "Transaction Evaluation for Providing Rewards," the disclosure of which is hereby incorporated herein by reference.

In one embodiment, the incentive, reward, or benefit provided in the loyalty program is based on the presence of correlated related transactions. For example, in one embodiment, an incentive is provided if a financial payment card is used in a reservation system to make a reservation and the financial payment card is subsequently used to pay for the reserved good or service. Further details and examples of one embodiment are provided in U.S. patent application Ser. No. 11/945,907, filed Nov. 27, 2007, assigned Pub. No. 2008/0071587, and entitled "Incentive Wireless Communication Reservation," the disclosure of which is hereby incorporated herein by reference.

In one embodiment, the transaction handler (103) provides centralized loyalty program management, reporting and membership services. In one embodiment, membership data is downloaded from the transaction handler (103) to acceptance point devices, such as the transaction terminal (105). In one embodiment, loyalty transactions are reported from the acceptance point devices to the transaction handler (103); and the data indicating the loyalty points, rewards, benefits, etc. are stored on the account identification device (141). Further details and examples of one embodiment are provided in U.S. patent application Ser. No. 10/401,504, filed Mar. 27, 2003, assigned Pub. No. 2004/0054581, and entitled "Network Centric Loyalty System," the disclosure of which is hereby incorporated herein by reference.

In one embodiment, the portal (143) of the transaction handler (103) is used to manage reward or loyalty programs for entities such as issuers, merchants, etc. The cardholders, such as the user (101), are rewarded with offers/benefits from merchants. The portal (143) and/or the transaction handler (103) track the transaction records for the merchants for the reward or loyalty programs. Further details and examples of one embodiment are provided in U.S. patent application Ser. No. 11/688,423, filed Mar. 20, 2007, assigned Pub. No. 2008/0195473, and entitled "Reward Program Manager," the disclosure of which is hereby incorporated herein by reference.

In one embodiment, a loyalty program includes multiple entities providing access to detailed transaction data, which allows the flexibility for the customization of the loyalty program. For example, issuers or merchants may sponsor the loyalty program to provide rewards; and the portal (143) and/or the transaction handler (103) stores the loyalty currency in the data warehouse (149). Further details and examples of one embodiment are provided in U.S. patent application Ser. No. 12/177,530, filed Jul. 22, 2008, assigned Pub. No. 2009/0030793, and entitled "Multi-Vender Multi-Loyalty Currency Program," the disclosure of which is hereby incorporated herein by reference.

In one embodiment, an incentive program is created on the portal (143) of the transaction handler (103). The portal (143) collects offers from a plurality of merchants and stores the offers in the data warehouse (149). The offers may have associated criteria for their distributions. The portal (143) and/or the transaction handler (103) may recommend offers based on the transaction data (109). In one embodiment, the transaction handler (103) automatically applies the benefits of the offers during the processing of the transactions when the transactions satisfy the conditions associated with the offers. In one embodiment, the transaction handler (103) communicates with transaction terminals (105) to set up, customize, and/or update offers based on market focus, product categories, service categories, targeted consumer demographics, etc. Further details and examples of one embodiment are provided in U.S. patent application Ser. No. 12/413,097, filed Mar. 27, 2009, assigned Pub. No. 2010-0049620, and entitled "Merchant Device Support of an Integrated Offer Network," the disclosure of which is hereby incorporated herein by reference.

In one embodiment, the transaction handler (103) is configured to provide offers from merchants to the user (101) via the payment system, making accessing and redeeming the offers convenient for the user (101). The offers may be triggered by and/or tailored to a previous transaction, and may be valid only for a limited period of time starting from the date of the previous transaction. If the transaction handler (103) determines that a subsequent transaction processed by the transaction handler (103) meets the conditions for the redemption of an offer, the transaction handler (103) may credit the consumer account (146) for the redemption of the offer and/or provide a notification message to the user (101). Further details and examples of one embodiment are provided in Prov. U.S. Pat. App. Ser. No. 61/222,287, filed Jul. 1, 2009 and entitled "Benefits Engine Providing Benefits Based on Merchant Preferences," the disclosure of which is hereby incorporated herein by reference.

Details on loyalty programs in one embodiment are provided in Prov. U.S. Pat. App. Ser. No. 61/250,440, filed Oct. 9, 2009 and entitled "Systems and Methods to Provide Loyalty Programs," the disclosure of which is hereby incorporated herein by reference.

SKU

In one embodiment, merchants generate stock-keeping unit (SKU) or other specific information that identifies the particular goods and services purchased by the user (101) or customer. The SKU information may be provided to the operator of the transaction handler (103) that processed the purchases. The operator of the transaction handler (103) may store the SKU information as part of transaction data (109), and reflect the SKU information for a particular transaction in a transaction profile (127 or 131) associated with the person involved in the transaction.

When a user (101) shops at a traditional retail store or browses a website of an online merchant, an SKU-level profile associated specifically with the user (101) may be provided to select an advertisement appropriately targeted to the user (101) (e.g., via mobile phones, POS terminals, web browsers, etc.). The SKU-level profile for the user (101) may include an identification of the goods and services historically purchased by the user (101). In addition, the SKU-level profile for the user (101) may identify goods and services that the user (101) may purchase in the future. The identification may be based on historical purchases reflected in SKU-level profiles of other individuals or groups that are determined to be similar to the user (101). Accordingly, the return on investment for advertisers and merchants can be greatly improved.

In one embodiment, the user specific profile (131) is an aggregated spending profile (341) that is generated using the SKU-level information. For example, in one embodiment, the factor values (344) correspond to factor definitions (331) that are generated based on aggregating spending in different categories of products and/or services. A typical merchant offers products and/or services in many different categories.

In one embodiment, the user (101) may enter into transactions with various online and "brick and mortar" merchants. The transactions may involve the purchase of various items of goods and services. The goods and services may be identified by SKU numbers or other information that specifically identifies the goods and services purchased by the user (101).

In one embodiment, the merchant may provide the SKU information regarding the goods and services purchased by the user (101) (e.g., purchase details at SKU level) to the operator of the transaction handler (103). In one embodiment, the SKU information may be provided to the operator of the transaction handler (103) in connection with a loyalty program, as described in more detail below. The SKU information may be stored as part of the transaction data (109) and associated with the user (101). In one embodiment, the SKU information for items purchased in transactions facilitated by the operator of the transaction handler (103) may be stored as transaction data (109) and associated with its associated purchaser. In one embodiment, the SKU level purchase details are requested from the merchants or retailers via authorization responses, when the account (146) of the user (101) is enrolled in a program that allows the transaction handler (103) (and/or the issuer processor (145)) to collect the purchase details.

In one embodiment, based on the SKU information and perhaps other transaction data, the profile generator (121) may create an SKU-level transaction profile for the user (101). In one embodiment, based on the SKU information associated with the transactions for each person entering into transactions with the operator of the transaction handler (103), the profile generator (121) may create an SKU-level transaction profile for each person.

In one embodiment, the SKU information associated with a group of purchasers may be aggregated to create an SKU-level transaction profile that is descriptive of the group. The group may be defined based on one or a variety of considerations. For example, the group may be defined by common demographic features of its members. As another example, the group may be defined by common purchasing patters of its members.

In one embodiment, the user (101) may later consider the purchase of additional goods and services. The user (101) may shop at a traditional retailer or an online retailer. With respect to an online retailer, for example, the user (101) may browse the website of an online retailer, publisher, or merchant. The user (101) may be associated with a browser cookie to, for example, identify the user (101) and track the browsing behavior of the user (101).

In one embodiment, the retailer may provide the browser cookie associated with the user (101) to the operator of the transaction handler (103). Based on the browser cookie, the operator of the transaction handler (103) may associate the browser cookie with a personal account number of the user (101). The association may be performed by the operator of the transaction handler (103) or another entity in a variety of manners such as, for example, using a look up table.

Based on the personal account number, the profile selector (129) may select a user specific profile (131) that constitutes the SKU-level profile associated specifically with the user (101). The SKU-level profile may reflect the individual, prior purchases of the user (101) specifically, and/or the types of goods and services that the user (101) has purchased.

The SKU-level profile for the user (101) may also include identifications of goods and services the user (101) may purchase in the future. In one embodiment, the identifications may be used for the selection of advertisements for goods and services that may be of interest to the user (101). In one embodiment, the identifications for the user (101) may be based on the SKU-level information associated with historical purchases of the user (101). In one embodiment, the identifications for the user (101) may be additionally or alternatively based on transaction profiles associated with others. The recommendations may be determined by predictive association and other analytical techniques.

For example, the identifications for the user (101) may be based on the transaction profile of another person. The profile selector (129) may apply predetermined criteria to identify another person who, to a predetermined degree, is deemed sufficiently similar to the user (101). The identification of the other person may be based on a variety of factors including, for example, demographic similarity and/or purchasing pattern similarity between the user (101) and the other person. As one example, the common purchase of identical items or related items by the user (101) and the other person may result in an association between the user (101) and the other person, and a resulting determination that the user (101) and the other person are similar. Once the other person is identified, the transaction profile constituting the SKU-level profile for the other person may be analyzed. Through predictive association and other modeling and analytical techniques, the historical purchases reflected in the SKU-level profile for the other person may be employed to predict the future purchases of the user (101).

As another example, the identifications of the user (101) may be based on the transaction profiles of a group of persons. The profile selector (129) may apply predetermined criteria to identify a multitude of persons who, to a predetermined degree, are deemed sufficiently similar to the user (101). The identification of the other persons may be based on a variety of factors including, for example, demographic similarity and/or purchasing pattern similarity between the user (101) and the other persons. Once the group constituting the other persons is identified, the transaction profile constituting the SKU-level profile for the group may be analyzed. Through predictive association and other modeling and analytical techniques, the historical purchases reflected in the SKU-level profile for the group may be employed to predict the future purchases of the user (101).

The SKU-level profile of the user (101) may be provided to select an advertisement that is appropriately targeted. Because the SKU-level profile of the user (101) may include identifications of the goods and services that the user (101) may be likely to buy, advertisements corresponding to the identified goods and services may be presented to the user (101). In this way, targeted advertising for the user (101) may be optimized. Further, advertisers and publishers of advertisements may improve their return on investment, and may improve their ability to cross-sell goods and services.

In one embodiment, SKU-level profiles of others who are identified to be similar to the user (101) may be used to identify a user (101) who may exhibit a high propensity to purchase goods and services. For example, if the SKU-level profiles of others reflect a quantity or frequency of purchase that is determined to satisfy a threshold, then the user (101) may also be classified or predicted to exhibit a high propensity to purchase. Accordingly, the type and frequency of advertisements that account for such propensity may be appropriately tailored for the user (101).

In one embodiment, the SKU-level profile of the user (101) may reflect transactions with a particular merchant or merchants. The SKU-level profile of the user (101) may be provided to a business that is considered a peer with or similar to the particular merchant or merchants. For example, a merchant may be considered a peer of the business because the merchant offers goods and services that are similar to or related to those of the business. The SKU-level profile reflecting transactions with peer merchants may be used by the business to better predict the purchasing behavior of the user (101) and to optimize the presentation of targeted advertisements to the user (101).

Details on SKU-level profile in one embodiment are provided in Prov. U.S. Pat. App. Ser. No. 61/253,034, filed Oct. 19, 2009 and entitled "Systems and Methods for Advertising Services Based on an SKU-Level Profile," the disclosure of which is hereby incorporated herein by reference.

Media Optimization

In one embodiment, the transaction handler (103) is configured to use the transaction data (109) to develop intelligence information to improve the accuracy of media profiles.

In one embodiment, a media profile provides information on the preference of the consumers of a media channel. For example, it may be determined that consumers of a first media channel are much more likely to be do-it-yourself types than consumers of a second media channel; and thus, if costs are comparable, the media time on the first media channel is a better media buy for advertisements related to do-it-yourself related products. In one embodiment, the profile information on available media options allows the advertisers to better select the advertisement vehicles to obtain the greatest number of high-propensity prospects for each advertisement dollar spent.

For example, in one embodiment, a media controller (115) is configured to provide advertisers with media time on a media channel, such as video screens at a gas station. For example, a plurality of video screens may be positioned at a plurality of gas pumps respectively, such that when the user (101) is adding gas at the pump, the video screen at the pump shows media content to the user (101). The media controller (115) may not have information about the individual consumer of the media channel at the time the advertisement is presented, or may not want to target the media content to the user (101) individually. In one embodiment, the media controller (115) randomly presents advertisements on a media channel, such as the video screens at the gas station, from different categories based on a predetermined ratio. For example, the advertisements for a first advertiser and a second advertiser may be each provided with 50% of the media time available on the media channel.

In one embodiment, the profile generator (121) uses the transaction data (109) recorded by the transaction handler (103) to generate a spending distribution of the consumers of the media channel to assist the media controller (115) to optimize the ratio for media presentation. The spending distribution is based on the purchase data of the consumers of the media channel. For example, the transaction data (109) of the users who made purchases at a location near the media channel, such as those who made purchases at the gas station, can be aggregated to determine the spending distribution of the users across a plurality of areas related to the types of media content presented by the media controller (115). The spending distribution indicates the purchase interest of the users and thus the opportunities for improving the results of advertising via adjusting the ratio of the advertising areas.

In one embodiment, the profile generator (121) is configured to select a sample of users to represent the population of the consumers of the media channel, such as consumers at a point of interaction (107). In one embodiment, some of the consumers may not make a purchase at the merchant collocated with the media channel, or may not use the transaction handler (103) to make the payment for the purchase at the merchant. For example, a consumer may use cash to purchase gas at the gas station. In one embodiment, the profile generator (121) is to select a large enough sample to represent the majority of total consumers of the media channel, such as the viewers of the video screens at the gas station.

In one embodiment, the profile generator (121) is configured to select the sample of users according to statistical data about the customers of the merchant, such as a distribution of income level, gender, residence location, etc.

In one embodiment, the profile generator (121) is configured to select the sample of users based on identifying accounts that have transactions with the merchant during a predetermined period of time (e.g., the previous month, quarter, 6 months, or year). In one embodiment, the profile generator (121) is configured to select as the sample of users all or a subset of the users, each of which has at least one account that has at least one transaction with the merchant during the predetermined period of time.

In one embodiment, to optimize the advertising results, the profile generator (121) is configured to select the sample of users who frequently use the media channel, such as those who purchase gas at the gas station frequently (e.g., users who made more than a predetermined number of purchases at the gas station during the predetermined period of time).

In one embodiment, an aggregated spending profile (341), as shown in FIG. 2, is generated for the sample of users by aggregating the spending across the entire set of users. The spending profile (341) is to indicate the spending pattern of the users across purchase areas, such as spending frequency ratios in different purchase categories, spending amount ratios in different purchase categories, etc.

In one embodiment, the spending aggregated for the sample of users is divided by the number of users to generate an averaged aggregated spending that represents the spending level of a hypothetical "average" user; and the aggregated spending profile (341) is generated for the "average" user, which indicates the cluster ID (343) of the "average" user, the factor values (344) for the "average" user, the category distribution (346) for the "average" user. In one embodiment, the aggregated spending profile (341) of the "average" user is provided and used as the spending profile (341) associated with the media channel at the location of the merchant (e.g., the viewers of the video monitors at a gas station).

In one embodiment, the ratio for media presentation is optimized based on the spending pattern. For example, when the spending pattern indicates that the users who made purchases with the merchant (and thus the consumers of the media channel collocated with the merchant) spent more in an area related to a first advertiser, the proportion of the media time for the first advertiser can be increased. For example, when the spending pattern indicates that the users who made purchases with the merchant (and thus the consumers of the media channel collocated with the merchant) spent less in an area related to a second advertiser, the proportion of the media time allocated to the second advertiser can be decreased. In one embodiment, the proportions of the media time for different advertisements (or advertisements of different categories) are allocated/scheduled based on the spending ratio of the corresponding areas.

In one embodiment, the media controller (115) provides the media content to points of interactions (107) at different locations (e.g., video screens at different gas stations). Thus, the media controller (115) uses the spending distributions of users at the different locations to schedule media presentation. The media controller (115) can balance the media presentation ratios at different locations to satisfy the presentation requirements and to optimize the results. For example, the media controller (115) may increase the number of presentations of a first advertisement at a first gas station where the users are more likely to be interested in the first advertisement; and the media controller (115) may decrease the number of presentations of the first advertisement at a second gas station where the users are less likely to be interested in the first advertisement.

In one embodiment, to study the effect of the adjusted media presentation ratio, the spending profiles of the media channels are used to select surrogate channels that have similar user purchase patterns when the same media presentation ratio is used. For example, a surrogate gas station is to be selected for a first gas station when the same media presentation ratio used in both gas stations has led to the same or similar aggregate spending profiles for the users purchasing at the gas stations. In one embodiment, when the customer spending profile (341) of a second gas station (e.g., computed as the aggregated spending profile of (341) of an "average" customer of the second gas station) matches the customer spending profile (341) of a first gas station, the second gas station is selected as the surrogate gas station; and the video display installed at the surrogate gas station is considered a surrogate medial channel.

The selection of the surrogate media channel may use additional criteria, such as demographics, the distance between the gas stations, etc.

In one embodiment, to identify the effect of a media presentation ratio at a media channel, the media presentation ratio at the media channel is adjusted while the media presentation ratio in the surrogate media channel remains unchanged. The changes in consumer behavior as determined in the difference between the surrogate gas station and the first gas station can be viewed as the result of the change in the media presentation ratio. For example, the aggregated spending distributions of the consumers of the merchants or merchant retail locations can be compared to determine the changes in consumer behavior. For example, the aggregated spending profile of (341) of the "average" customers of the merchants, or merchant retail stores, can be compared to determine the changes in consumer behavior. For example, the sales of the merchants advertised in the media content can be tracked (e.g., via the tracking of the redemption of coupons as discussed in the section entitled "CLOSE THE LOOP" and the section entitled "COUPON MATCHING") to determined the effect of media presentation ratio. Thus, through the use of a surrogate media channel, the effect of the change in the media ratio can be isolated and identified.

In one embodiment, changes due to other influences, such as socio-economic conditions, advertisements in mass media, etc. are identified. For example, the viewers of the advertisements at different gas stations are directed to different locations of a merchant (e.g., unrelated to the gas stations). The sales volumes of the merchant at the different locations are monitored. The changes in sales volume at a first location of the merchant advertised via the surrogate gas station without media mix adjustment can be viewed as a baseline change caused by other conditions; and the changes in sales volume at a second location of the merchant advertised via a gas station where the media mix is adjusted are compared to the baseline change to identify the change due to the adjustment to the media mix.

In one embodiment, by monitoring the changes caused by the adjustment to the media mix, optimizations can be performed to improve overall advertisement effectiveness.

Through the customization of the media presentation ratios at various media channels under the control of the media controller (115), the users or customers can get more relevant messages, even though the advertisements are not individually customized based on the spending behavior of the individual users or customers. The merchants running the advertisements via the media channels can get improved sales performance from the advertisements. The issuer processors (e.g., 145) and/or the transaction handler (103) can get improvement in transaction volume. The operator of the media controller (115) can command higher prices for its media opportunities due to improved effectiveness of the advertisements, and thus is willing to pay the operator of the profile generator (121) for the transaction profiles (127) and/or the transaction data (109) (or to enter into an incremental revenue sharing arrangement).

Figure 9:
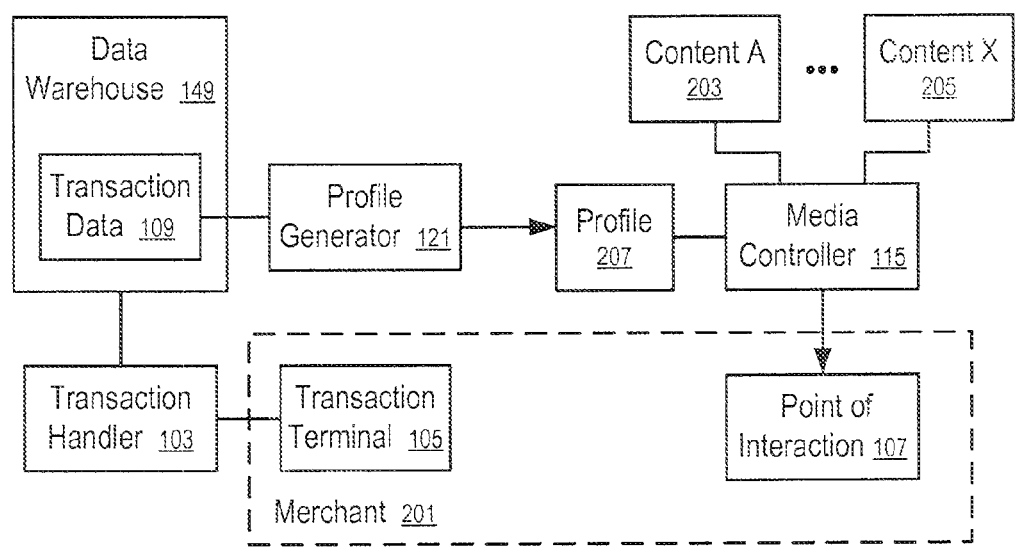
FIG. 9 shows a system to provide a spending profile to optimize media presentations according to one embodiment.

FIG. 9 shows a system to provide a spending profile to optimize media presentations according to one embodiment. In FIG. 9, the media controller (115) is to provide media content (203, . . . , 205) to consumers (e.g., 101) at the point of interaction (107). The profile generator (121) is to generate an aggregated spending profile (207) to allow the media controller (115) to optimize the presentation mix of the media content (203, . . . , 205).

In one embodiment, the profile (207) is based on aggregating the spending of a set of users, instead of a single user (101). The user set is identified based on transaction data (109) for transactions at the transaction terminal (105) of the merchant (201) collocated with, or in the vicinity of, the point of interaction (107). The user set represents the typical users or majority of the users that are exposed to the media content (203, . . . , 205) provided on the point of interaction (107). Details of the point of interaction (107) in one embodiment are provided in the section entitled "POINT OF INTERACTION." In one embodiment, the merchant (201) is a gas station; and the point of interaction (107) is a video display mounted on a gas pump of the gas station.

In one embodiment, the profile (207) is based on aggregating the spending of the user set for purchases from different merchants, which may not include the merchant (201). In one embodiment, the merchants are selected based on relevancy to the media content (203, . . . , 205); and the purchases of the user set from the selected merchants are analyzed to obtain aggregated spending patterns. For example, in one embodiment, the factor analysis (327) and cluster analysis (329) are used generate the profile (207). Details on the generation of an aggregated spending profile in one embodiment are provided in the section entitled "AGGREGATED SPENDING PROFILE."

In one embodiment, the profile (207) is based on high-level purchase trends, rather than merchant-specific purchase behavior. In one embodiment, the profile (207) shows spending distribution across merchant categories (e.g., 346), or factors (344) identified from factor analysis (327). In one embodiment, the profile (207) shows spending patterns based on the identification of clusters (343) to which the user set belongs and/or the distances from the user set to the clusters.

In one embodiment, the profile (207) is used by the media controller (115) to determine the overall mix of the media content (203, . . . , 205), rather than to direct specific advertisements to specific users. The profile (207) is used to target the users of the point of interaction (107) as a whole.

In one embodiment, the user set may be selected according to certain aspects of the purchases made at the transaction terminal (105). For example, in one embodiment, the user set is selected based on a time slot during which the transactions are made at the transaction terminal (105). Different user sets can be selected to develop different profiles (207) for different time slots for the presentation of contents (203, . . . , 205) on the point of interaction (107).

In one embodiment, the media content (203, . . . , 205) include advertisements for different merchants, or for merchants of different categories. Through the use of the profile (207), the media controller (115) can maximize the effectiveness of the media presentations; and advertisements can be delivered in a way to increase the likelihood of reaching audiences with the highest propensity to purchase the advertised products or services.

Figure 10:
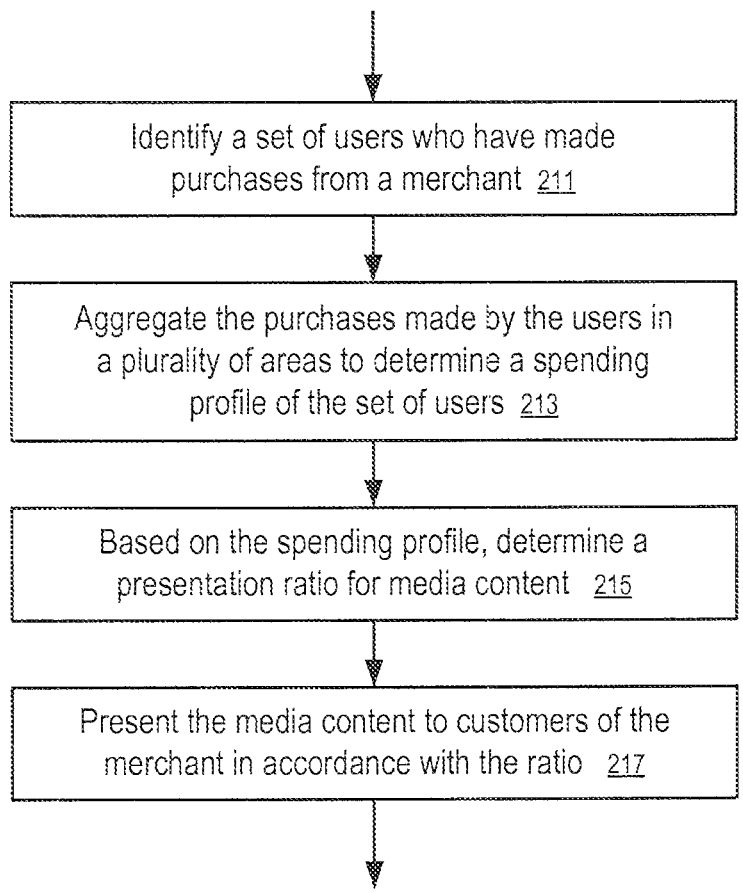
FIG. 10 shows a method to customize media presentations according to one embodiment.

FIG. 10 shows a method to customize media presentations according to one embodiment. In FIG. 10, a computing apparatus is configured to identify (211) a set of users (e.g., 101) who have made purchases from a merchant, aggregate (213) the purchases recorded in the transaction data (109) and made by the users in a plurality of spending areas to determine a spending profile (207) of the set of users (e.g., 101) as a whole, determine (215) a presentation ratio for media content (203, . . . , 205) based on the spending profile (207), and present (217) the media content (203, . . . , 205) to customers of the merchant in accordance with the ratio.

In one embodiment, the computing apparatus includes at least one of: a profile generator (121), a media controller (115), a point of interaction (107), and a data warehouse (149).

In one embodiment, the set of users (e.g., 101) are identified based on transactions made with a plurality of merchants near the point of interaction (107), such as retail stores near an electronic billboard or kiosk.

In one embodiment, the set of users (e.g., 101) are identified based on detecting consumer accounts (e.g., 146) that have transactions with the merchant.

In one embodiment, the transaction data (109) from which the spending profile (207) is determined is retrieved from consumer accounts (e.g., 146) of the set of users (e.g., 101), including the consumer accounts (e.g., 146) that are held by the set of users (e.g., 101) but may not have transactions with the merchant.

In one embodiment, the spending profile (207) includes a spending distribution configured to schedule the presentation of media content (203, . . . , 205) of a plurality of categories. In one embodiment, the spending distribution is represented by a set of factor values (344) for a set of factors defined by factor definitions (331) generated from a factor analysis (327). In one embodiment, the spending distribution is represented by one or more cluster IDs (343) that identify one or more clusters based on the cluster definitions (333) generated from a cluster analysis (329). In one embodiment, the spending distribution is represented by the category distribution (346).

In one embodiment, the media content (203, . . . , 205) include advertisements to customers of the merchant; and each respective presentation of the advertisements is performed without pre-identifying an identity of a customer (e.g., user (101)) who is to receive the respective presentation.

In one embodiment, the computing apparatus is configured to determine the presentation ratio of media content (203, . . . , 205) in the plurality of categories based on the spending distribution and schedule a presentation mix of the media content (203, . . . , 205) according to the spending distribution across the plurality of categories.

In one embodiment, the spending distribution provides a spending ratio of the users (e.g., 101) across a plurality of merchant categories; the media content (203, . . . , 205) are advertisements from merchants in the plurality of merchant categories; and the presentation ratio or mix for the media content (203, . . . , 205) is determined based on the spending ratio across the merchant categories.

In one embodiment, the account identifiers are issued by a plurality of issuers; and the computing apparatus includes the transaction handler (103) configured to process the transactions and store the transaction data (109) to record the transactions.

In one embodiment, the computing apparatus is configured select the plurality of users (e.g., 101) according to a distribution of customers of the merchant, such as a distribution of customer income level, a distribution of demographics, etc. In one embodiment, spending amounts of the transactions of the selected users (e.g., 101) are aggregated according to the plurality of categories of the media content (203, . . . , 205).

In one embodiment, the computing apparatus is further configured to identify a surrogate merchant based on matching the spending distribution of users (e.g., 101) who have used account identifiers to make purchases from the second merchant, adjust the presentations of the media content (203, . . . , 205) at a media channel at a location of the first merchant, and compare changes in the spending distribution to identify an effect of the adjustment in the presentations of the media content (203, . . . , 205).

In one embodiment, based on the effect identified from the adjustment, the computing apparatus is configured to determine a presentation ratio of the media content (203, . . . , 205) of the plurality of categories to optimize overall effectiveness of the media content (203, . . . , 205) (e.g., as defined by the net benefit to the advertisers, and/or the net benefit to the operator of the media controller (115)).

In one embodiment, based on the spending distribution, the computing apparatus is configured to determine a presentation ratio of media content (203, . . . , 205) of the plurality of categories, after identifying or receiving the spending distribution that is determined by the profile generator (121) based on the transaction data (109) associated with account identifiers of a plurality of users who have used the account identifiers to make purchases from the merchant.

In one embodiment, the computing apparatus further includes the media controller (115) to present the media content (203, . . . , 205) according to the presentation ratio via the media channel, such as a point of interaction (107) at a facility of the merchant (201). For example, in one embodiment, the facility of the merchant includes a gas pump; and the media channel comprises a video terminal mounted on the gas pump.

In one embodiment, the presentation ratio may be configured according to the time length of media presentation, or the number of times of media presentation.

In one embodiment, the computing apparatus or system includes a data warehouse (149) configured to store the transaction data (109) recording transactions processed by the transaction handler (103) and at least one processor (e.g., 173) coupled with the data warehouse (149) to identify a subset of the transaction data (109) associated with account identifiers of a plurality of users (e.g., 101) who have used the account identifiers (e.g., account number (302) or account information (142)) to make purchases from a first merchant, and further configured to determine a spending distribution based on the subset of the transaction data (109) to schedule presentations of media content (203, . . . , 205) of a plurality of categories.

In one embodiment, the at least one processor (e.g., 173) is further configured to determine a presentation ratio of the media content (203, . . . , 205) of the plurality of categories based on the spending distribution. In one embodiment, the computing apparatus includes the media controller (115) to present the media content (203, . . . , 205) according to the presentation ratio. In one embodiment, the computing apparatus further includes a point of interaction (107) configured to present the media content (203, . . . , 205) at a location of the first merchant, such as a video display mounted on a gas pump.

In one embodiment, the computing apparatus or system includes the transaction handler (103) configured to process the transactions and the portal (143) configured to provide the spending profile (207) to the media controller (115). Details about the transaction handler (103) and the portal (143) in one embodiment are provided in section entitled "TRANSACTION DATA BASED PORTAL."

Details about the system in one embodiment are provided in the section entitled "SYSTEM," "CENTRALIZED DATA WAREHOUSE" and "HARDWARE."

Variations

Some embodiments use more or fewer components than those illustrated in FIGS. 1 and 4-7. For example, in one embodiment, the user specific profile (131) is used by a search engine to prioritize search results. In one embodiment, the correlator (117) is to correlate transactions with online activities, such as searching, web browsing, and social networking, instead of or in addition to the user specific advertisement data (119). In one embodiment, the correlator (117) is to correlate transactions and/or spending patterns with news announcements, market changes, events, natural disasters, etc. In one embodiment, the data to be correlated by the correlator with the transaction data (109) may not be personalized via the user specific profile (131) and may not be user specific. In one embodiment, multiple different devices are used at the point of interaction (107) for interaction with the user (101); and some of the devices may not be capable of receiving input from the user (101). In one embodiment, there are transaction terminals (105) to initiate transactions for a plurality of users (101) with a plurality of different merchants. In one embodiment, the account information (142) is provided to the transaction terminal (105) directly (e.g., via phone or Internet) without the use of the account identification device (141).

In one embodiment, at least some of the profile generator (121), correlator (117), profile selector (129), and advertisement selector (133) are controlled by the entity that operates the transaction handler (103). In another embodiment, at least some of the profile generator (121), correlator (117), profile selector (129), and advertisement selector (133) are not controlled by the entity that operates the transaction handler (103).

For example, in one embodiment, the entity operating the transaction handler (103) provides the intelligence (e.g., transaction profiles (127) or the user specific profile (131)) for the selection of the advertisement; and a third party (e.g., a web search engine, a publisher, or a retailer) may present the advertisement in a context outside a transaction involving the transaction handler (103) before the advertisement results in a purchase.

For example, in one embodiment, the customer may interact with the third party at the point of interaction (107); and the entity controlling the transaction handler (103) may allow the third party to query for intelligence information (e.g., transaction profiles (127), or the user specific profile (131)) about the customer using the user data (125), thus informing the third party of the intelligence information for targeting the advertisements, which can be more useful, effective and compelling to the user (101). For example, the entity operating the transaction handler (103) may provide the intelligence information without generating, identifying or selecting advertisements; and the third party receiving the intelligence information may identify, select and/or present advertisements.

Through the use of the transaction data (109), account data (111), correlation results (123), the context at the point of interaction, and/or other data, relevant and compelling messages or advertisements can be selected for the customer at the points of interaction (e.g., 107) for targeted advertising. The messages or advertisements are thus delivered at the optimal time for influencing or reinforcing brand perceptions and revenue-generating behavior. The customers receive the advertisements in the media channels that they like and/or use most frequently.

In one embodiment, the transaction data (109) includes transaction amounts, the identities of the payees (e.g., merchants), and the date and time of the transactions. The identities of the payees can be correlated to the businesses, services, products and/or locations of the payees. For example, the transaction handler (103) maintains a database of merchant data, including the merchant locations, businesses, services, products, etc. Thus, the transaction data (109) can be used to determine the purchase behavior, pattern, preference, tendency, frequency, trend, budget and/or propensity of the customers in relation to various types of businesses, services and/or products and in relation to time.

In one embodiment, the products and/or services purchased by the user (101) are also identified by the information transmitted from the merchants or service providers. Thus, the transaction data (109) may include identification of the individual products and/or services, which allows the profile generator (121) to generate transaction profiles (127) with fine granularity or resolution. In one embodiment, the granularity or resolution may be at a level of distinct products and services that can be purchased (e.g., stock-keeping unit (SKU) level), or category or type of products or services, or vendor of products or services, etc.

The profile generator (121) may consolidate transaction data for a person having multiple accounts to derive intelligence information about the person to generate a profile for the person (e.g., transaction profiles (127), or the user specific profile (131)).

The profile generator (121) may consolidate transaction data for a family having multiple accounts held by family members to derive intelligence information about the family to generate a profile for the family (e.g., transaction profiles (127), or the user specific profile (131)).

Similarly, the profile generator (121) may consolidate transaction data for a group of persons, after the group is identified by certain characteristics, such as gender, income level, geographical location or region, preference, characteristics of past purchases (e.g., merchant categories, purchase types), cluster, propensity, demographics, social networking characteristics (e.g., relationships, preferences, activities on social networking websites), etc. The consolidated transaction data can be used to derive intelligence information about the group to generate a profile for the group (e.g., transaction profiles (127), or the user specific profile (131)).

In one embodiment, the profile generator (121) may consolidate transaction data according to the user data (125) to generate a profile specific to the user data (125).

Since the transaction data (109) are records and history of past purchases, the profile generator (121) can derive intelligence information about a customer using an account, a customer using multiple accounts, a family, a company, or other groups of customers, about what the targeted audience is likely to purchase in the future, how frequently, and their likely budgets for such future purchases. Intelligence information is useful in selecting the advertisements that are most useful, effective and compelling to the customer, thus increasing the efficiency and effectiveness of the advertising process.

In one embodiment, the transaction data (109) are enhanced with correlation results (123) correlating past advertisements and purchases resulting at least in part from the advertisements. Thus, the intelligence information can be more accurate in assisting with the selection of the advertisements. The intelligence information may not only indicate what the audience is likely to purchase, but also how likely the audience is to be influenced by advertisements for certain purchases, and the relative effectiveness of different forms of advertisements for the audience. Thus, the advertisement selector (133) can select the advertisements to best use the opportunity to communicate with the audience. Further, the transaction data (109) can be enhanced via other data elements, such as program enrollment, affinity programs, redemption of reward points (or other types of offers), online activities, such as web searches and web browsing, social networking information, etc., based on the account data (111) and/or other data, such as non-transactional data discussed in U.S. patent application Ser. No. 12/614,603, filed Nov. 9, 2009 and entitled "Analyzing Local Non-Transactional Data with Transactional Data in Predictive Models," the disclosure of which is hereby incorporated herein by reference.

In one embodiment, the entity operating the transaction handler (103) provides the intelligence information in real time as the request for the intelligence information occurs. In other embodiments, the entity operating the transaction handler (103) may provide the intelligence information in batch mode. The intelligence information can be delivered via online communications (e.g., via an application programming interface (API) on a website, or other information server), or via physical transportation of a computer readable media that stores the data representing the intelligence information.

In one embodiment, the intelligence information is communicated to various entities in the system in a way similar to, and/or in parallel with the information flow in the transaction system to move money. The transaction handler (103) routes the information in the same way it routes the currency involved in the transactions.

In one embodiment, the portal (143) provides a user interface to allow the user (101) to select items offered on different merchant websites and store the selected items in a wish list for comparison, reviewing, purchasing, tracking, etc. The information collected via the wish list can be used to improve the transaction profiles (127) and derive intelligence on the needs of the user (101); and targeted advertisements can be delivered to the user (101) via the wish list user interface provided by the portal (143). Examples of user interface systems to manage wish lists are provided in U.S. patent application Ser. No. 12/683,802, filed Jan. 7, 2010 and entitled "System and Method for Managing Items of Interest Selected from Online Merchants," the disclosure of which is hereby incorporated herein by reference.

Aggregated Spending Profile

In one embodiment, the characteristics of transaction patterns of customers are profiled via clusters, factors, and/or categories of purchases. The transaction data (109) may include transaction records (301); and in one embodiment, an aggregated spending profile (341) is generated from the transaction records (301), in a way illustrated in FIG. 2, to summarize the spending behavior reflected in the transaction records (301).

In one embodiment, each of the transaction records (301) is for a particular transaction processed by the transaction handler (103). Each of the transaction records (301) provides information about the particular transaction, such as the account number (302) of the consumer account (146) used to pay for the purchase, the date (303) (and/or time) of the transaction, the amount (304) of the transaction, the ID (305) of the merchant who receives the payment, the category (306) of the merchant, the channel (307) through which the purchase was made, etc. Examples of channels include online, offline in-store, via phone, etc. In one embodiment, the transaction records (301) may further include a field to identify a type of transaction, such as card-present, card-not-present, etc.

In one embodiment, a "card-present" transaction involves physically presenting the account identification device (141), such as a financial transaction card, to the merchant (e.g., via swiping a credit card at a POS terminal of a merchant); and a "card-not-present" transaction involves presenting the account information (142) of the consumer account (146) to the merchant to identify the consumer account (146) without physically presenting the account identification device (141) to the merchant or the transaction terminal (105).

In one embodiment, certain information about the transaction can be looked up in a separate database based on other information recorded for the transaction. For example, a database may be used to store information about merchants, such as the geographical locations of the merchants, categories of the merchants, etc. Thus, the corresponding merchant information related to a transaction can be determined using the merchant ID (305) recorded for the transaction.

In one embodiment, the transaction records (301) may further include details about the products and/or services involved in the purchase. For example, a list of items purchased in the transaction may be recorded together with the respective purchase prices of the items and/or the respective quantities of the purchased items. The products and/or services can be identified via stock-keeping unit (SKU) numbers, or product category IDs. The purchase details may be stored in a separate database and be looked up based on an identifier of the transaction.

When there is voluminous data representing the transaction records (301), the spending patterns reflected in the transaction records (301) can be difficult to recognize by an ordinary person.

In one embodiment, the voluminous transaction records (301) are summarized (335) into aggregated spending profiles (e.g., 341) to concisely present the statistical spending characteristics reflected in the transaction records (301). The aggregated spending profile (341) uses values derived from statistical analysis to present the statistical characteristics of transaction records (301) of an entity in a way easy to understand by an ordinary person.

In FIG. 2, the transaction records (301) are summarized (335) via factor analysis (327) to condense the variables (e.g., 313, 315) and via cluster analysis (329) to segregate entities by spending patterns.

In FIG. 2, a set of variables (e.g., 311, 313, 315) are defined based on the parameters recorded in the transaction records (301). The variables (e.g., 311, 313, and 315) are defined in a way to have meanings easily understood by an ordinary person. For example, variables (311) measure the aggregated spending in super categories; variables (313) measure the spending frequencies in various areas; and variables (315) measure the spending amounts in various areas. In one embodiment, each of the areas is identified by a merchant category (306) (e.g., as represented by a merchant category code (MCC), a North American Industry Classification System (NAILS) code, or a similarly standardized category code). In other embodiments, an area may be identified by a product category, a SKU number, etc.

In one embodiment, a variable of a same category (e.g., frequency (313) or amount (315)) is defined to be aggregated over a set of mutually exclusive areas. A transaction is classified in only one of the mutually exclusive areas. For example, in one embodiment, the spending frequency variables (313) are defined for a set of mutually exclusive merchants or merchant categories. Transactions falling with the same category are aggregated.

Examples of the spending frequency variables (313) and spending amount variables (315) defined for various merchant categories (e.g., 306) in one embodiment are provided in U.S. patent application Ser. No. 12/537,566, filed Aug. 7, 2009 and entitled "Cardholder Clusters," and in Prov. U.S. Pat. App. Ser. No. 61/182,806, filed Jun. 1, 2009 and entitled "Cardholder Clusters," the disclosures of which applications are hereby incorporated herein by reference.

In one embodiment, super categories (311) are defined to group the categories (e.g., 306) used in transaction records (301). The super categories (311) can be mutually exclusive. For example, each merchant category (306) is classified under only one super merchant category but not any other super merchant categories. Since the generation of the list of super categories typically requires deep domain knowledge about the businesses of the merchants in various categories, super categories (311) are not used in one embodiment.

In one embodiment, the aggregation (317) includes the application of the definitions (309) for these variables (e.g., 311, 313, and 315) to the transaction records (301) to generate the variable values (321). The transaction records (301) are aggregated to generate aggregated measurements (e.g., variable values (321)) that are not specific to a particular transaction, such as frequencies of purchases made with different merchants or different groups of merchants, the amounts spent with different merchants or different groups of merchants, and the number of unique purchases across different merchants or different groups of merchants, etc. The aggregation (317) can be performed for a particular time period and for entities at various levels.

In one embodiment, the transaction records (301) are aggregated according to a buying entity. The aggregation (317) can be performed at account level, person level, family level, company level, neighborhood level, city level, region level, etc. to analyze the spending patterns across various areas (e.g., sellers, products or services) for the respective aggregated buying entity. For example, the transaction records (301) for a particular account (e.g., presented by the account number (302)) can be aggregated for an account level analysis. To aggregate the transaction records (301) in account level, the transactions with a specific merchant or merchants in a specific category are counted according to the variable definitions (309) for a particular account to generate a frequency measure (e.g., 313) for the account relative to the specific merchant or merchant category; and the transaction amounts (e.g., 304) with the specific merchant or the specific category of merchants are summed for the particular account to generate an average spending amount for the account relative to the specific merchant or merchant category. For example, the transaction records (301) for a particular person having multiple accounts can be aggregated for a person level analysis, the transaction records (301) aggregated for a particular family for a family level analysis, and the transaction records (301) for a particular business aggregated for a business level analysis.

The aggregation (317) can be performed for a predetermined time period, such as for the transactions occurring in the past month, in the past three months, in the past twelve months, etc.

In another embodiment, the transaction records (301) are aggregated according to a selling entity. The spending patterns at the selling entity across various buyers, products or services can be analyzed. For example, the transaction records (301) for a particular merchant having transactions with multiple accounts can be aggregated for a merchant level analysis. For example, the transaction records (301) for a particular merchant group can be aggregated for a merchant group level analysis.

In one embodiment, the aggregation (317) is formed separately for different types of transactions, such as transactions made online, offline, via phone, and/or "card-present" transactions vs. "card-not-present" transactions, which can be used to identify the spending pattern differences among different types of transactions.

In one embodiment, the variable values (e.g., 323, 324, . . . , 325) associated with an entity ID (322) are considered the random samples of the respective variables (e.g., 311, 313, 315), sampled for the instance of an entity represented by the entity ID (322). Statistical analyses (e.g., factor analysis (327) and cluster analysis (329)) are performed to identify the patterns and correlations in the random samples.

For example, a cluster analysis (329) can identify a set of clusters and thus cluster definitions (333) (e.g., the locations of the centroids of the clusters). In one embodiment, each entity ID (322) is represented as a point in a mathematical space defined by the set of variables; and the variable values (323, 324, . . . , 325) of the entity ID (322) determine the coordinates of the point in the space and thus the location of the point in the space. Various points may be concentrated in various regions; and the cluster analysis (329) is configured to formulate the positioning of the points to drive the clustering of the points. In other embodiments, the cluster analysis (329) can also be performed using the techniques of Self Organizing Maps (SOM), which can identify and show clusters of multi-dimensional data using a representation on a two-dimensional map.

Once the cluster definitions (333) are obtained from the cluster analysis (329), the identity of the cluster (e.g., cluster ID (343)) that contains the entity ID (322) can be used to characterize spending behavior of the entity represented by the entity ID (322). The entities in the same cluster are considered to have similar spending behaviors.

Similarities and differences among the entities, such as accounts, individuals, families, etc., as represented by the entity ID (e.g., 322) and characterized by the variable values (e.g., 323, 324, . . . , 325) can be identified via the cluster analysis (329). In one embodiment, after a number of clusters of entity IDs are identified based on the patterns of the aggregated measurements, a set of profiles can be generated for the clusters to represent the characteristics of the clusters. Once the clusters are identified, each of the entity IDs (e.g., corresponding to an account, individual, family) can be assigned to one cluster; and the profile for the corresponding cluster may be used to represent, at least in part, the entity (e.g., account, individual, family). Alternatively, the relationship between an entity (e.g., an account, individual, family) and one or more clusters can be determined (e.g., based on a measurement of closeness to each cluster). Thus, the cluster related data can be used in a transaction profile (127 or 341) to provide information about the behavior of the entity (e.g., an account, an individual, a family).

In one embodiment, more than one set of cluster definitions (333) is generated from cluster analyses (329). For example, cluster analyses (329) may generate different sets of cluster solutions corresponding to different numbers of identified clusters. A set of cluster IDs (e.g., 343) can be used to summarize (335) the spending behavior of the entity represented by the entity ID (322), based on the typical spending behavior of the respective clusters. In one example, two cluster solutions are obtained; one of the cluster solutions has 17 clusters, which classify the entities in a relatively coarse manner; and the other cluster solution has 55 clusters, which classify the entities in a relative fine manner. A cardholder can be identified by the spending behavior of one of the 17 clusters and one of the 55 clusters in which the cardholder is located. Thus, the set of cluster IDs corresponding to the set of cluster solutions provides a hierarchical identification of an entity among clusters of different levels of resolution. The spending behavior of the clusters is represented by the cluster definitions (333), such as the parameters (e.g., variable values) that define the centroids of the clusters.

In one embodiment, the random variables (e.g., 313 and 315) as defined by the definitions (309) have certain degrees of correlation and are not independent from each other. For example, merchants of different merchant categories (e.g., 306) may have overlapping business, or have certain business relationships. For example, certain products and/or services of certain merchants have cause and effect relationships. For example, certain products and/or services of certain merchants are mutually exclusive to a certain degree (e.g., a purchase from one merchant may have a level of probability to exclude the user (101) from making a purchase from another merchant). Such relationships may be complex and difficult to quantify by merely inspecting the categories. Further, such relationships may shift over time as the economy changes.

In one embodiment, a factor analysis (327) is performed to reduce the redundancy and/or correlation among the variables (e.g., 313, 315). The factor analysis (327) identifies the definitions (331) for factors, each of which represents a combination of the variables (e.g., 313, 315).

In one embodiment, a factor is a linear combination of a plurality of the aggregated measurements (e.g., variables (313, 315)) determined for various areas (e.g., merchants or merchant categories, products or product categories). Once the relationship between the factors and the aggregated measurements is determined via factor analysis, the values for the factors can be determined from the linear combinations of the aggregated measurements and be used in a transaction profile (127 or 341) to provide information on the behavior of the entity represented by the entity ID (e.g., an account, an individual, a family).

Once the factor definitions (331) are obtained from the factor analysis (327), the factor definitions (331) can be applied to the variable values (321) to determine factor values (344) for the aggregated spending profile (341). Since redundancy and correlation are reduced in the factors, the number of factors is typically much smaller than the number of the original variables (e.g., 313, 315). Thus, the factor values (344) represent the concise summary of the original variables (e.g., 313, 315).

For example, there may be thousands of variables on spending frequency and amount for different merchant categories; and the factor analysis (327) can reduce the factor number to less than one hundred (and even less than twenty). In one example, a twelve-factor solution is obtained, which allows the use of twelve factors to combine the thousands of the original variables (313, 315); and thus, the spending behavior in thousands of merchant categories can be summarized via twelve factor values (344). In one embodiment, each factor is combination of at least four variables; and a typical variable has contributions to more than one factor.

In one example, hundreds or thousands of transaction records (301) of a cardholder are converted into hundreds or thousands of variable values (321) for various merchant categories, which are summarized (335) via the factor definitions (331) and cluster definitions (333) into twelve factor values (344) and one or two cluster IDs (e.g., 343). The summarized data can be readily interpreted by a human to ascertain the spending behavior of the cardholder. A user (101) may easily specify a spending behavior requirement formulated based on the factor values (344) and the cluster IDs (e.g., to query for a segment of customers, or to request the targeting of a segment of customers). The reduced size of the summarized data reduces the need for data communication bandwidth for communicating the spending behavior of the cardholder over a network connection and allows simplified processing and utilization of the data representing the spending behavior of the cardholder.

In one embodiment, the behavior and characteristics of the clusters are studied to identify a description of a type of representative entities that are found in each of the clusters. The clusters can be named based on the type of representative entities to allow an ordinary person to easily understand the typical behavior of the clusters.

In one embodiment, the behavior and characteristics of the factors are also studied to identify dominant aspects of each factor. The clusters can be named based on the dominant aspects to allow an ordinary person to easily understand the meaning of a factor value.

In FIG. 2, an aggregated spending profile (341) for an entity represented by an entity ID (e.g., 322) includes the cluster ID (343) and factor values (344) determined based on the cluster definitions (333) and the factor definitions (331). The aggregated spending profile (341) may further include other statistical parameters, such as diversity index (342), channel distribution (345), category distribution (346), zip code (347), etc., as further discussed below.

In one embodiment, the diversity index (342) may include an entropy value and/or a Gini coefficient, to represent the diversity of the spending by the entity represented by the entity ID (322) across different areas (e.g., different merchant categories (e.g., 306)). When the diversity index (342) indicates that the diversity of the spending data is under a predetermined threshold level, the variable values (e.g., 323, 324, . . . , 325) for the corresponding entity ID (322) may be excluded from the cluster analysis (329) and/or the factor analysis (327) due to the lack of diversity. When the diversity index (342) of the aggregated spending profile (341) is lower than a predetermined threshold, the factor values (344) and the cluster ID (343) may not accurately represent the spending behavior of the corresponding entity.

In one embodiment, the channel distribution (345) includes a set of percentage values that indicate the percentages of amounts spent in different purchase channels, such as online, via phone, in a retail store, etc.

In one embodiment, the category distribution (346) includes a set of percentage values that indicate the percentages of spending amounts in different super categories (311). In one embodiment, thousands of different merchant categories (e.g., 306) are represented by Merchant Category Codes (MCC), or North American Industry Classification System (NAICS) codes in transaction records (301). These merchant categories (e.g., 306) are classified or combined into less than one hundred super categories (or less than twenty). In one example, fourteen super categories are defined based on domain knowledge.

In one embodiment, the aggregated spending profile (341) includes the aggregated measurements (e.g., frequency, average spending amount) determined for a set of predefined, mutually exclusive merchant categories (e.g., super categories (311)). Each of the super merchant categories represents a type of products or services a customer may purchase. A transaction profile (127 or 341) may include the aggregated measurements for each of the set of mutually exclusive merchant categories. The aggregated measurements determined for the predefined, mutually exclusive merchant categories can be used in transaction profiles (127 or 341) to provide information on the behavior of a respective entity (e.g., an account, an individual, or a family).

In one embodiment, the zip code (347) in the aggregated spending profile (341) represents the dominant geographic area in which the spending associated with the entity ID (322) occurred. Alternatively or in combination, the aggregated spending profile (341) may include a distribution of transaction amounts over a set of zip codes that account for a majority of the transactions or transaction amounts (e.g., 90%).

In one embodiment, the factor analysis (327) and cluster analysis (329) are used to summarize the spending behavior across various areas, such as different merchants characterized by merchant category (306), different products and/or services, different consumers, etc. The aggregated spending profile (341) may include more or fewer fields than those illustrated in FIG. 2. For example, in one embodiment, the aggregated spending profile (341) further includes an aggregated spending amount for a period of time (e.g., the past twelve months); in another embodiment, the aggregated spending profile (341) does not include the category distribution (346); and in a further embodiment, the aggregated spending profile (341) may include a set of distance measures to the centroids of the clusters. The distance measures may be defined based on the variable values (323, 324, ..., 325), or based on the factor values (344). The factor values of the centroids of the clusters may be estimated based on the entity ID (e.g., 322) that is closest to the centroid in the respective cluster.

Other variables can be used in place of, or in additional to, the variables (311, 313, 315) illustrated in FIG. 2. For example, the aggregated spending profile (341) can be generated using variables measuring shopping radius/distance from the primary address of the account holder to the merchant site for offline purchases. When such variables are used, the transaction patterns can be identified based at least in part on clustering according to shopping radius/distance and geographic regions. Similarly, the factor definition (331) may include the consideration of the shopping radius/distance. For example, the transaction records (301) may be aggregated based on the ranges of shopping radius/distance and/or geographic regions. For example, the factor analysis can be used to determine factors that naturally combine geographical areas based on the correlations in the spending patterns in various geographical areas.

In one embodiment, the aggregation (317) may involve the determination of a deviation from a trend or pattern. For example, an account makes a certain number of purchases a week at a merchant over the past 6 months. However, in the past 2 weeks the number of purchases is less than the average number per week. A measurement of the deviation from the trend or pattern can be used (e.g., in a transaction profile (127 or 341) as a parameter, or in variable definitions (309) for the factor analysis (327) and/or the cluster analysis) to define the behavior of an account, an individual, a family, etc.

FIG. 3 shows a method to generate an aggregated spending profile according to one embodiment. In FIG. 3, computation models are established (351) for variables (e.g., 311, 313, and 315). In one embodiment, the variables are defined in a way to capture certain aspects of the spending statistics, such as frequency, amount, etc.

In FIG. 3, data from related accounts are combined (353). For example, when an account number change has occurred for a cardholder in the time period under analysis, the transaction records (301) under the different account numbers of the same cardholder are combined under one account number that represents the cardholder. For example, when the analysis is performed at a person level (or family level, business level, social group level, city level, or region level), the transaction records (301) in different accounts of the person (or family, business, social group, city or region) can be combined under one entity ID (322) that represents the person (or family, business, social group, city or region).

In one embodiment, recurrent/installment transactions are combined (355). For example, multiple monthly payments may be combined and considered as one single purchase.

In FIG. 3, account data are selected (357) according to a set of criteria related to activity, consistency, diversity, etc.

For example, when a cardholder uses a credit card solely to purchase gas, the diversity of the transactions by the cardholder is low. In such a case, the transactions in the account of the cardholder may not be statistically meaningful to represent the spending pattern of the cardholder in various merchant categories. Thus, in one embodiment, if the diversity of the transactions associated with an entity ID (322) is below a threshold, the variable values (e.g., 323, 324, ..., 325) corresponding to the entity ID (322) are not used in the cluster analysis (329) and/or the factor analysis (327). The diversity can be examined based on the diversity index (342) (e.g., entropy or Gini coefficient), or based on counting the different merchant categories in the transactions associated with the entity ID (322); and when the count of different merchant categories is fewer than a threshold (e.g., 5), the transactions associated with the entity ID (322) are not used in the cluster analysis (329) and/or the factor analysis (327) due to the lack of diversity.

For example, when a cardholder uses a credit card only sporadically (e.g., when running out of cash), the limited transactions by the cardholder may not be statistically meaningful in representing the spending behavior of the cardholder. Thus, in one embodiment, when the numbers of transactions associated with an entity ID (322) is below a threshold, the variable values (e.g., 323, 324, ..., 325) corresponding to the entity ID (322) are not used in the cluster analysis (329) and/or the factor analysis (327).

For example, when a cardholder has only used a credit card during a portion of the time period under analysis, the transaction records (301) during the time period may not reflect the consistent behavior of the cardholder for the entire time period. Consistency can be checked in various ways. In one example, if the total number of transactions during the first and last months of the time period under analysis is zero, the transactions associated with the entity ID (322) are inconsistent in the time period and thus are not used in the cluster analysis (329) and/or the factor analysis (327). Other criteria can be formulated to detect inconsistency in the transactions.

In FIG. 3, the computation models (e.g., as represented by the variable definitions (309)) are applied (359) to the remaining account data (e.g., transaction records (301)) to obtain data samples for the variables. The data points associated with the entities, other than those whose transactions fail to meet the minimum requirements for activity, consistency, diversity, etc., are used in factor analysis (327) and cluster analysis (329).

In FIG. 3, the data samples (e.g., variable values (321)) are used to perform (361) factor analysis (327) to identify factor solutions (e.g., factor definitions (331)). The factor solutions can be adjusted (363) to improve similarity in factor values of different sets of transaction data (109). For example, factor definitions (331) can be applied to the transactions in the time period under analysis (e.g., the past twelve months) and be applied separately to the transactions in a prior time period (e.g., the twelve months before the past twelve months) to obtain two sets of factor values. The factor definitions (331) can be adjusted to improve the correlation between the two set of factor values.

The data samples can also be used to perform (365) cluster analysis (329) to identify cluster solutions (e.g., cluster definitions (333)). The cluster solutions can be adjusted (367) to improve similarity in cluster identifications based on different sets of transaction data (109). For example, cluster definitions (333) can be applied to the transactions in the time period under analysis (e.g., the past twelve months) and be applied separately to the transactions in a prior time period (e.g., the twelve months before the past twelve months) to obtain two sets of cluster identifications for various entities. The cluster definitions (333) can be adjusted to improve the correlation between the two set of cluster identifications.

In one embodiment, the number of clusters is determined from clustering analysis. For example, a set of cluster seeds can be initially identified and used to run a known clustering algorithm. The sizes of data points in the clusters are then examined. When a cluster contains less than a predetermined number of data points, the cluster may be eliminated to rerun the clustering analysis.

In one embodiment, standardizing entropy is added to the cluster solution to obtain improved results.

In one embodiment, human understandable characteristics of the factors and clusters are identified (369) to name the factors and clusters. For example, when the spending behavior of a cluster appears to be the behavior of an internet loyalist, the cluster can be named "internet loyalist" such that if a cardholder is found to be in the "internet loyalist" cluster, the spending preferences and patterns of the cardholder can be easily perceived.

In one embodiment, the factor analysis (327) and the cluster analysis (329) are performed periodically (e.g., once a year, or six months) to update the factor definitions (331) and the cluster definitions (333), which may change as the economy and the society change over time.

In FIG. 3, transaction data (109) are summarized (371) using the factor solutions and cluster solutions to generate the aggregated spending profile (341). The aggregated spending profile (341) can be updated more frequently than the factor solutions and cluster solutions, when the new transaction data (109) becomes available. For example, the aggregated spending profile (341) may be updated quarterly or monthly.

Various tweaks and adjustments can be made for the variables (e.g., 313, 315) used for the factor analysis (327) and the cluster analysis (329). For example, the transaction records (301) may be filtered, weighted or constrained, according to different rules to improve the capabilities of the aggregated measurements in indicating certain aspects of the spending behavior of the customers.

For example, in one embodiment, the variables (e.g., 313, 315) are normalized and/or standardized (e.g., using statistical average, mean, and/or variance).

For example, the variables (e.g., 313, 315) for the aggregated measurements can be tuned, via filtering and weighting, to predict the future trend of spending behavior (e.g., for advertisement selection), to identify abnormal behavior (e.g., for fraud prevention), or to identify a change in spending pattern (e.g., for advertisement audience measurement), etc. The aggregated measurements, the factor values (344), and/or the cluster ID (343) generated from the aggregated measurements can be used in a transaction profile (127 or 341) to define the behavior of an account, an individual, a family, etc.

In one embodiment, the transaction data (109) are aged to provide more weight to recent data than older data. In other embodiments, the transaction data (109) are reverse aged. In further embodiments, the transaction data (109) are seasonally adjusted.

In one embodiment, the variables (e.g., 313, 315) are constrained to eliminate extreme outliers. For example, the minimum values and the maximum values of the spending amounts (315) may be constrained based on values at certain percentiles (e.g., the value at one percentile as the minimum and the value at 99 percentile as the maximum) and/or certain predetermined values. In one embodiment, the spending frequency variables (313) are constrained based on values at certain percentiles and median values. For example, the minimum value for a spending frequency variable (313) may be constrained at $P_1 - k \times (M - P_1)$, where $P_1$ is the one percentile value, M the median value, and k a predetermined constant (e.g., 0.1). For example, the maximum value for a spending frequency variable (313) may be constrained at $P_{99} - ax (P_{99} - M)$, where $P_{99}$ is the 99 percentile value, M the median value, and k a predetermined constant (e.g., 0.1).

In one embodiment, variable pruning is performed to reduce the number of variables (e.g., 313, 315) that have less impact on cluster solutions and/or factor solutions. For example, variables with standard variation less than a predetermined threshold (e.g., 0.1) may be discarded for the purpose of cluster analysis (329). For example, analysis of variance (ANOVA) can be performed to identify and remove variables that are no more significant than a predetermined threshold.

The aggregated spending profile (341) can provide information on spending behavior for various application areas, such as marketing, fraud detection and prevention, creditworthiness assessment, loyalty analytics, targeting of offers, etc.

For example, clusters can be used to optimize offers for various groups within an advertisement campaign. The use of factors and clusters to target advertisement can improve the speed of producing targeting models. For example, using variables based on factors and clusters (and thus eliminating the need to use a large number of convention variables) can improve predictive models and increase efficiency of targeting by reducing the number of variables examined. The variables formulated based on factors and/or clusters can be used with other variables to build predictive models based on spending behaviors.

In one embodiment, the aggregated spending profile (341) can be used to monitor risks in transactions. Factor values are typically consistent over time for each entity. An abrupt change in some of the factor values may indicate a change in financial conditions, or a fraudulent use of the account. Models formulated using factors and clusters can be used to identify a series of transactions that do not follow a normal pattern specified by the factor values (344) and/or the cluster ID (343). Potential bankruptcies can be predicted by analyzing the change of factor values over time; and significant changes in spending behavior may be detected to stop and/or prevent fraudulent activities.

For example, the factor values (344) can be used in regression models and/or neural network models for the detection of certain behaviors or patterns. Since factors are relatively non-collinear, the factors can work well as independent variables. For example, factors and clusters can be used as independent variables in tree models.

For example, surrogate accounts can be selected for the construction of a quasi-control group. For example, for a given account A that is in one cluster, the account B that is closest to the account A in the same cluster can be selected as a surrogate account of the account B. The closeness can be determined by certain values in the aggregated spending profile (341), such as factor values (344), category distribution (346), etc. For example, a Euclidian distance defined based on the set of values from the aggregated spending profile (341) can be used to compare the distances between the accounts. Once identified, the surrogate account can be used to reduce or eliminate bias in measurements. For example, to determine the effect of an advertisement, the spending pattern response of the account A that is exposed to the advertisement can be compared to the spending pattern response of the account B that is not exposed to the advertisement.

For example, the aggregated spending profile (341) can be used in segmentation and/or filtering analysis, such as selecting cardholders having similar spending behaviors identified via factors and/or clusters for targeted advertisement campaigns, and selecting and determining a group of merchants that could be potentially marketed towards cardholders originating in a given cluster (e.g., for bundled offers). For example, a query interface can be provided to allow the query to identify a targeted population based on a set of criteria formulated using the values of clusters and factors.

For example, the aggregated spending profile (341) can be used in a spending comparison report, such as comparing a sub-population of interest against the overall population, determining how cluster distributions and mean factor values differ, and building reports for merchants and/or issuers for benchmarking purposes. For example, reports can be generated according to clusters in an automated way for the merchants. For example, the aggregated spending profile (341) can be used in geographic reports by identifying geographic areas where cardholders shop most frequently and comparing predominant spending locations with cardholder residence locations.

In one embodiment, the profile generator (121) provides affinity relationship data in the transaction profiles (127) so that the transaction profiles (127) can be shared with business partners without compromising the privacy of the users (101) and the transaction details.

For example, in one embodiment, the profile generator (121) is to identify clusters of entities (e.g., accounts, cardholders, families, businesses, cities, regions, etc.) based on the spending patterns of the entities. The clusters represent entity segments identified based on the spending patterns of the entities reflected in the transaction data (109) or the transaction records (301).

In one embodiment, the clusters correspond to cells or regions in the mathematical space that contain the respective groups of entities. For example, the mathematical space representing the characteristics of users (101) may be divided into clusters (cells or regions). For example, the cluster analysis (329) may identify one cluster in the cell or region that contains a cluster of entity IDs (e.g., 322) in the space having a plurality of dimensions corresponding to the variables (e.g., 313 and 315). For example, a cluster can also be identified as a cell or region in a space defined by the factors using the factor definitions (331) generated from the factor analysis (327).

In one embodiment, the parameters used in the aggregated spending profile (341) can be used to define a segment or a cluster of entities. For example, a value for the cluster ID (343) and a set of ranges for the factor values (344) and/or other values can be used to define a segment.

In one embodiment, a set of clusters are standardized to represent the predilection of entities in various groups for certain products or services. For example, a set of standardized clusters can be formulated for people who have shopped, for example, at home improvement stores. The cardholders in the same cluster have similar spending behavior.

In one embodiment, the tendency or likelihood of a user (101) being in a particular cluster (i.e. the user's affinity to the cell) can be characterized using a value, based on past purchases. The same user (101) may have different affinity values for different clusters.

For example, a set of affinity values can be computed for an entity, based on the transaction records (301), to indicate the closeness or predilection of the entity to the set of standardized clusters. For example, a cardholder who has a first value representing affinity of the cardholder to a first cluster may have a second value representing affinity of the cardholder to a second cluster. For example, if a consumer buys a lot of electronics, the affinity value of the consumer to the electronics cluster is high.

In one embodiment, other indicators are formulated across the merchant community and cardholder behavior and provided in the profile (e.g., 127 or 341) to indicate the risk of a transaction.

In one embodiment, the relationship of a pair of values from two different clusters provides an indication of the likelihood that the user (101) is in one of the two cells, if the user (101) is shown to be in the other cell. For example, if the likelihood of the user (101) to purchase each of two types of products is known, the scores can be used to determine the likelihood of the user (101) buying one of the two types of products if the user (101) is known to be interested in the other type of products. In one embodiment, a map of the values for the clusters is used in a profile (e.g., 127 or 341) to characterize the spending behavior of the user (101) (or other types of entities, such as a family, company, neighborhood, city, or other types of groups defined by other aggregate parameters, such as time of day, etc.).

In one embodiment, the clusters and affinity information are standardized to allow sharing between business partners, such as transaction processing organizations, search providers, and marketers. Purchase statistics and search statistics are generally described in different ways. For example, purchase statistics are based on merchants, merchant categories, SKU numbers, product descriptions, etc.; and search statistics are based on search terms. Once the clusters are standardized, the clusters can be used to link purchase information based merchant categories (and/or SKU numbers, product descriptions) with search information based on search terms. Thus, search predilection and purchase predilection can be mapped to each other.

In one embodiment, the purchase data and the search data (or other third party data) are correlated based on mapping to the standardized clusters (cells or segments). The purchase data and the search data (or other third party data) can be used together to provide benefits or offers (e.g., coupons) to consumers. For example, standardized clusters can be used as a marketing tool to provide relevant benefits, including coupons, statement credits, or the like to consumers who are within or are associated with common clusters. For example, a data exchange apparatus may obtain cluster data based on consumer search engine data and actual payment transaction data to identify like groups of individuals who may respond favorably to particular types of benefits, such as coupons and statement credits.

Details about aggregated spending profile (341) in one embodiment are provided in U.S. patent application Ser. No. 12/777,173, filed May 10, 2010 and entitled "Systems and Methods to Summarize Transaction Data," the disclosure of which is hereby incorporated herein by reference.

Transaction Data Based Portal

In FIG. 1, the transaction terminal (105) initiates the transaction for a user (101) (e.g., a customer) for processing by a transaction handler (103). The transaction handler (103) processes the transaction and stores transaction data (109) about the transaction, in connection with account data (111), such as the account profile of an account of the user (101). The account data (111) may further include data about the user (101), collected from issuers or merchants, and/or other sources, such as social networks, credit bureaus, merchant provided information, address information, etc. In one embodiment, a transaction may be initiated by a server (e.g., based on a stored schedule for recurrent payments).

Over a period of time, the transaction handler (103) accumulates the transaction data (109) from transactions initiated at different transaction terminals (e.g., 105) for different users (e.g., 101). The transaction data (109) thus includes information on purchases made by various users (e.g., 101) at various times via different purchases options (e.g., online purchase, offline purchase from a retail store, mail order, order via phone, etc.)

In one embodiment, the accumulated transaction data (109) and the corresponding account data (111) are used to generate intelligence information about the purchase behavior, pattern, preference, tendency, frequency, trend, amount and/or propensity of the users (e.g., 101), as individuals or as a member of a group. The intelligence information can then be used to generate, identify and/or select targeted advertisements for presentation to the user (101) on the point of interaction (107), during a transaction, after a transaction, or when other opportunities arise.

FIG. 4 shows a system to provide information based on transaction data (109) according to one embodiment. In FIG. 4, the transaction handler (103) is coupled between an issuer processor (145) and an acquirer processor (147) to facilitate authorization and settlement of transactions between a consumer account (146) and a merchant account (148). The transaction handler (103) records the transactions in the data warehouse (149). The portal (143) is coupled to the data warehouse (149) to provide information based on the transaction records (301), such as the transaction profiles (127) or aggregated spending profile (341). The portal (143) may be implemented as a web portal, a telephone gateway, a file/data server, etc.

In one embodiment, the portal (143) is configured to provide information, such as transaction profiles (127) to third parties. Further, the portal (143) may register certain users (101) for various programs, such as a loyalty program to provide rewards and/or offers to the users (101).

In one embodiment, the portal (143) is to register the interest of users (101), or to obtain permissions from the users (101) to gather further information about the users (101), such as data capturing purchase details, online activities, etc.

In one embodiment, the user (101) may register via the issuer; and the registration data in the consumer account (146) may propagate to the data warehouse (149) upon approval from the user (101).

In one embodiment, the portal (143) is to register merchants and provide services and/or information to merchants.

In one embodiment, the portal (143) is to receive information from third parties, such as search engines, merchants, web sites, etc. The third party data can be correlated with the transaction data (109) to identify the relationships between purchases and other events, such as searches, news announcements, conferences, meetings, etc., and improve the prediction capability and accuracy.

In FIG. 4, the consumer account (146) is under the control of the issuer processor (145). The consumer account (146) may be owned by an individual, or an organization such as a business, a school, etc. The consumer account (146) may be a credit account, a debit account, or a stored value account. The issuer may provide the consumer (e.g., user (101)) an account identification device (141) to identify the consumer account (146) using the account information (142). The respective consumer of the account (146) can be called an account holder or a cardholder, even when the consumer is not physically issued a card, or the account identification device (141), in one embodiment. The issuer processor (145) is to charge the consumer account (146) to pay for purchases.

In one embodiment, the account identification device (141) is a plastic card having a magnetic strip storing account information (142) identifying the consumer account (146) and/or the issuer processor (145). Alternatively, the account identification device (141) is a smartcard having an integrated circuit chip storing at least the account information (142). In one embodiment, the account identification device (141) includes a mobile phone having an integrated smartcard.

In one embodiment, the account information (142) is printed or embossed on the account identification device (141). The account information (142) may be printed as a bar code to allow the transaction terminal (105) to read the information via an optical scanner. The account information (142) may be stored in a memory of the account identification device (141) and configured to be read via wireless, contactless communications, such as near field communications via magnetic field coupling, infrared communications, or radio frequency communications. Alternatively, the transaction terminal (105) may require contact with the account identification device (141) to read the account information (142) (e.g., by reading the magnetic strip of a card with a magnetic strip reader).

In one embodiment, the transaction terminal (105) is configured to transmit an authorization request message to the acquirer processor (147). The authorization request includes the account information (142), an amount of payment, and information about the merchant (e.g., an indication of the merchant account (148)). The acquirer processor (147) requests the transaction handler (103) to process the authorization request, based on the account information (142) received in the transaction terminal (105). The transaction handler (103) routes the authorization request to the issuer processor (145) and may process and respond to the authorization request when the issuer processor (145) is not available. The issuer processor (145) determines whether to authorize the transaction based at least in part on a balance of the consumer account (146).

In one embodiment, the transaction handler (103), the issuer processor (145), and the acquirer processor (147) may each include a subsystem to identify the risk in the transaction and may reject the transaction based on the risk assessment.

In one embodiment, the account identification device (141) includes security features to prevent unauthorized uses of the consumer account (146), such as a logo to show the authenticity of the account identification device (141), encryption to protect the account information (142), etc.

In one embodiment, the transaction terminal (105) is configured to interact with the account identification device (141) to obtain the account information (142) that identifies the consumer account (146) and/or the issuer processor (145). The transaction terminal (105) communicates with the acquirer processor (147) that controls the merchant account (148) of a merchant. The transaction terminal (105) may communicate with the acquirer processor (147) via a data communication connection, such as a telephone connection, an Internet connection, etc. The acquirer processor (147) is to collect payments into the merchant account (148) on behalf of the merchant.

In one embodiment, the transaction terminal (105) is a POS terminal at a traditional, offline, "brick and mortar" retail store. In another embodiment, the transaction terminal (105) is an online server that receives account information (142) of the consumer account (146) from the user (101) through a web connection. In one embodiment, the user (101) may provide account information (142) through a telephone call, via verbal communications with a representative of the merchant; and the representative enters the account information (142) into the transaction terminal (105) to initiate the transaction.

In one embodiment, the account information (142) can be entered directly into the transaction terminal (105) to make payment from the consumer account (146), without having to physically present the account identification device (141). When a transaction is initiated without physically presenting an account identification device (141), the transaction is classified as a "card-not-present" (CNP) transaction.

In one embodiment, the issuer processor (145) may control more than one consumer account (146); the acquirer processor (147) may control more than one merchant account (148); and the transaction handler (103) is connected between a plurality of issuer processors (e.g., 145) and a plurality of acquirer processors (e.g., 147). An entity (e.g., bank) may operate both an issuer processor (145) and an acquirer processor (147).

In one embodiment, the transaction handler (103), the issuer processor (145), the acquirer processor (147), the transaction terminal (105), the portal (143), and other devices and/or services accessing the portal (143) are connected via communications networks, such as local area networks, cellular telecommunications networks, wireless wide area networks, wireless local area networks, an intranet, and Internet. In one embodiment, dedicated communication channels are used between the transaction handler (103) and the issuer processor (145), between the transaction handler (103) and the acquirer processor (147), and/or between the portal (143) and the transaction handler (103).

In one embodiment, the transaction handler (103) uses the data warehouse (149) to store the records about the transactions, such as the transaction records (301) or transaction data (109). In one embodiment, the transaction handler (103) includes a powerful computer, or cluster of computers functioning as a unit, controlled by instructions stored on a computer readable medium.

In one embodiment, the transaction handler (103) is configured to support and deliver authorization services, exception file services, and clearing and settlement services. In one embodiment, the transaction handler (103) has a subsystem to process authorization requests and another subsystem to perform clearing and settlement services.

In one embodiment, the transaction handler (103) is configured to process different types of transactions, such credit card transactions, debit card transactions, prepaid card transactions, and other types of commercial transactions.

In one embodiment, the transaction handler (103) facilitates the communications between the issuer processor (145) and the acquirer processor (147).

In one embodiment, the transaction terminal (105) is configured to submit the authorized transactions to the acquirer processor (147) for settlement. The amount for the settlement may be different from the amount specified in the authorization request. The transaction handler (103) is coupled between the issuer processor (145) and the acquirer processor (147) to facilitate the clearing and settling of the transaction. Clearing includes the exchange of financial information between the issuer processor (145) and the acquirer processor (147); and settlement includes the exchange of funds.

In one embodiment, the issuer processor (145) is to provide funds to make payments on behalf of the consumer account (146). The acquirer processor (147) is to receive the funds on behalf of the merchant account (148). The issuer processor (145) and the acquirer processor (147) communicate with the transaction handler (103) to coordinate the transfer of funds for the transaction. In one embodiment, the funds are transferred electronically.

In one embodiment, the transaction terminal (105) may submit a transaction directly for settlement, without having to separately submit an authorization request.

In one embodiment, the portal (143) provides a user interface to allow the user (101) to organize the transactions in one or more consumer accounts (145) of the user with one or more issuers. The user (101) may organize the transactions using information and/or categories identified in the transaction records (301), such as merchant category (306), transaction date (303), amount (304), etc. Examples and techniques in one embodiment are provided in U.S. patent application Ser. No. 11/378,215, filed Mar. 16, 2006, assigned Pub. No. 2007/0055597, and entitled "Method and System for Manipulating Purchase Information," the disclosure of which is hereby incorporated herein by reference.

In one embodiment, the portal (143) provides transaction based statistics, such as indicators for retail spending monitoring, indicators for merchant benchmarking, industry/market segmentation, indicators of spending patterns, etc. Further examples can be found in U.S. patent application Ser. No. 12/191,796, filed Aug. 14, 2008, assigned Pub. No. 2009/0048884, and entitled "Merchant Benchmarking Tool," and Provisional U.S. Pat. App. Ser. No. 61/258,403, filed Nov. 5, 2009 and entitled "Systems and Methods for Analysis of Transaction Data," the disclosures of which applications are hereby incorporated herein by reference.

Transaction Terminal

FIG. 5 illustrates a transaction terminal according to one embodiment. In FIG. 5, the transaction terminal (105) is configured to interact with an account identification device (141) to obtain account information (142) about the consumer account (146).

In one embodiment, the transaction terminal (105) includes a memory (167) coupled to the processor (151), which controls the operations of a reader (163), an input device (153), an output device (165) and a network interface (161). The memory (167) may store instructions for the processor (151) and/or data, such as an identification that is associated with the merchant account (148).

In one embodiment, the reader (163) includes a magnetic strip reader. In another embodiment, the reader (163) includes a contactless reader, such as a radio frequency identification (RFID) reader, a near field communications (NFC) device configured to read data via magnetic field coupling (in accordance with ISO standard 14443/NFC), a Bluetooth transceiver, a WiFi transceiver, an infrared transceiver, a laser scanner, etc.

In one embodiment, the input device (153) includes key buttons that can be used to enter the account information (142) directly into the transaction terminal (105) without the physical presence of the account identification device (141). The input device (153) can be configured to provide further information to initiate a transaction, such as a personal identification number (PIN), password, zip code, etc. that may be used to access the account identification device (141), or in combination with the account information (142) obtained from the account identification device (141).

In one embodiment, the output device (165) may include a display, a speaker, and/or a printer to present information, such as the result of an authorization request, a receipt for the transaction, an advertisement, etc.

In one embodiment, the network interface (161) is configured to communicate with the acquirer processor (147) via a telephone connection, an Internet connection, or a dedicated data communication channel.

In one embodiment, the instructions stored in the memory (167) are configured at least to cause the transaction terminal (105) to send an authorization request message to the acquirer processor (147) to initiate a transaction. The transaction terminal (105) may or may not send a separate request for the clearing and settling of the transaction. The instructions stored in the memory (167) are also configured to cause the transaction terminal (105) to perform other types of functions discussed in this description.

In one embodiment, a transaction terminal (105) may have fewer components than those illustrated in FIG. 5. For example, in one embodiment, the transaction terminal (105) is configured for "card-not-present" transactions; and the transaction terminal (105) does not have a reader (163).

In one embodiment, a transaction terminal (105) may have more components than those illustrated in FIG. 5. For example, in one embodiment, the transaction terminal (105) is an ATM machine, which includes components to dispense cash under certain conditions.

Account Identification Device

FIG. 6 illustrates an account identifying device according to one embodiment. In FIG. 6, the account identification device (141) is configured to carry account information (142) that identifies the consumer account (146).

In one embodiment, the account identification device (141) includes a memory (167) coupled to the processor (151), which controls the operations of a communication device (159), an input device (153), an audio device (157) and a display device (155). The memory (167) may store instructions for the processor (151) and/or data, such as the account information (142) associated with the consumer account (146).

In one embodiment, the account information (142) includes an identifier identifying the issuer (and thus the issuer processor (145)) among a plurality of issuers, and an identifier identifying the consumer account among a plurality of consumer accounts controlled by the issuer processor (145). The account information (142) may include an expiration date of the account identification device (141), the name of the consumer holding the consumer account (146), and/or an identifier identifying the account identification device (141) among a plurality of account identification devices associated with the consumer account (146).

In one embodiment, the account information (142) may further include a loyalty program account number, accumulated rewards of the consumer in the loyalty program, an address of the consumer, a balance of the consumer account (146), transit information (e.g., a subway or train pass), access information (e.g., access badges), and/or consumer information (e.g., name, date of birth), etc.

In one embodiment, the memory includes a nonvolatile memory, such as magnetic strip, a memory chip, a flash memory, a Read Only Memory (ROM), etc. to store the account information (142).

In one embodiment, the information stored in the memory (167) of the account identification device (141) may also be in the form of data tracks that are traditionally associated with credits cards. Such tracks include Track 1 and Track 2. Track 1 ("International Air Transport Association") stores more information than Track 2, and contains the cardholder's name as well as the account number and other discretionary data. Track 1 is sometimes used by airlines when securing reservations with a credit card. Track 2 ("American Banking Association") is currently most commonly used and is read by ATMs and credit card checkers. The ABA (American Banking Association) designed the specifications of Track 1 and banks abide by it. It contains the cardholder's account number, encrypted PIN, and other discretionary data.

In one embodiment, the communication device (159) includes a semiconductor chip to implement a transceiver for communication with the reader (163) and an antenna to provide and/or receive wireless signals.

In one embodiment, the communication device (159) is configured to communicate with the reader (163). The communication device (159) may include a transmitter to transmit the account information (142) via wireless transmissions, such as radio frequency signals, magnetic coupling, or infrared, Bluetooth or WiFi signals, etc.

In one embodiment, the account identification device (141) is in the form of a mobile phone, personal digital assistant (PDA), etc. The input device (153) can be used to provide input to the processor (151) to control the operation of the account identification device (141); and the audio device (157) and the display device (155) may present status information and/or other information, such as advertisements or offers. The account identification device (141) may include further components that are not shown in FIG. 6, such as a cellular communications subsystem.

In one embodiment, the communication device (159) may access the account information (142) stored on the memory (167) without going through the processor (151).

In one embodiment, the account identification device (141) has fewer components than those illustrated in FIG. 6. For example, an account identification device (141) does not have the input device (153), the audio device (157) and the display device (155) in one embodiment; and in another embodiment, an account identification device (141) does not have components (151-159).

For example, in one embodiment, an account identification device (141) is in the form of a debit card, a credit card, a smartcard, or a consumer device that has optional features such as magnetic strips, or smartcards.

An example of an account identification device (141) is a magnetic strip attached to a plastic substrate in the form of a card. The magnetic strip is used as the memory (167) of the account identification device (141) to provide the account information (142). Consumer information, such as account number, expiration date, and consumer name may be printed or embossed on the card. A semiconductor chip implementing the memory (167) and the communication device (159) may also be embedded in the plastic card to provide account information (142) in one embodiment. In one embodiment, the account identification device (141) has the semiconductor chip but not the magnetic strip.

In one embodiment, the account identification device (141) is integrated with a security device, such as an access card, a radio frequency identification (RFID) tag, a security card, a transponder, etc.

In one embodiment, the account identification device (141) is a handheld and compact device. In one embodiment, the account identification device (141) has a size suitable to be placed in a wallet or pocket of the consumer.

Some examples of an account identification device (141) include a credit card, a debit card, a stored value device, a payment card, a gift card, a smartcard, a smart media card, a payroll card, a health care card, a wrist band, a keychain device, a supermarket discount card, a transponder, and a machine readable medium containing account information (142).

Point of Interaction

In one embodiment, the point of interaction (107) is to provide an advertisement to the user (101), or to provide information derived from the transaction data (109) to the user (101).

In one embodiment, an advertisement is a marketing interaction which may include an announcement and/or an offer of a benefit, such as a discount, incentive, reward, coupon, gift, cash back, or opportunity (e.g., special ticket/admission). An advertisement may include an offer of a product or service, an announcement of a product or service, or a presentation of a brand of products or services, or a notice of events, facts, opinions, etc. The advertisements can be presented in text, graphics, audio, video, or animation, and as printed matter, web content, interactive media, etc. An advertisement may be presented in response to the presence of a financial transaction card, or in response to a financial transaction card being used to make a financial transaction, or in response to other user activities, such as browsing a web page, submitting a search request, communicating online, entering a wireless communication zone, etc. In one embodiment, the presentation of advertisements may be not a result of a user action.

In one embodiment, the point of interaction (107) can be one of various endpoints of the transaction network, such as point of sale (POS) terminals, automated teller machines (ATMs), electronic kiosks (or computer kiosks or interactive kiosks), self-assist checkout terminals, vending machines, gas pumps, websites of banks (e.g., issuer banks or acquirer banks of credit cards), bank statements (e.g., credit card statements), websites of the transaction handler (103), websites of merchants, checkout websites or web pages for online purchases, etc.

In one embodiment, the point of interaction (107) may be the same as the transaction terminal (105), such as a point of sale (POS) terminal, an automated teller machine (ATM), a mobile phone, a computer of the user for an online transaction, etc. In one embodiment, the point of interaction (107) may be co-located with the transaction terminal (105), or produced by the transaction terminal (e.g., a receipt produced by the transaction terminal (105)). In one embodiment, the point of interaction (107) may be separate from and not co-located with the transaction terminal (105), such as a mobile phone, a personal digital assistant, a personal computer of the user, a voice mail box of the user, an email inbox of the user, a digital signage, etc.

For example, the advertisements can be presented on a portion of media for a transaction with the customer, which portion might otherwise be unused and thus referred to as a "white space" herein. A white space can be on a printed matter (e.g., a receipt printed for the transaction, or a printed credit card statement), on a video display (e.g., a display monitor of a POS terminal for a retail transaction, an ATM for cash withdrawal or money transfer, a personal computer of the customer for online purchases), or on an audio channel (e.g., an interactive voice response (IVR) system for a transaction over a telephonic device).

In one embodiment, the white space is part of a media channel available to present a message from the transaction handler (103) in connection with the processing of a transaction of the user (101). In one embodiment, the white space is in a media channel that is used to report information about a transaction of the user (101), such as an authorization status, a confirmation message, a verification message, a user interface to verify a password for the online use of the account information (142), a monthly statement, an alert or a report, or a web page provided by the portal (143) to access a loyalty program associated with the consumer account (146) or a registration program.

In other embodiments, the advertisements can also be presented via other media channels which may not involve a transaction processed by the transaction handler (103). For example, the advertisements can be presented on publications or announcements (e.g., newspapers, magazines, books, directories, radio broadcasts, television, digital signage, etc., which may be in an electronic form, or in a printed or painted form). The advertisements may be presented on paper, on websites, on billboards, or on audio portals.

In one embodiment, the transaction handler (103) purchases the rights to use the media channels from the owner or operators of the media channels and uses the media channels as advertisement spaces. For example, white spaces at a point of interaction (e.g., 107) with customers for transactions processed by the transaction handler (103) can be used to deliver advertisements relevant to the customers conducting the transactions; and the advertisement can be selected based at least in part on the intelligence information derived from the accumulated transaction data (109) and/or the context at the point of interaction (107) and/or the transaction terminal (105).

In general, a point of interaction (e.g., 107) may or may not be capable of receiving inputs from the customers, and may or may not co-located with a transaction terminal (e.g., 105) that initiates the transactions. The white spaces for presenting the advertisement on the point of interaction (107) may be on a portion of a geographical display space (e.g., on a screen), or on a temporal space (e.g., in an audio stream).

In one embodiment, the point of interaction (107) may be used to primarily to access services not provided by the transaction handler (103), such as services provided by a search engine, a social networking website, an online marketplace, a blog, a news site, a television program provider, a radio station, a satellite, a publisher, etc.

In one embodiment, a consumer device is used as the point of interaction (107), which may be a non-portable consumer device or a portable computing device. The consumer device is to provide media content to the user (101) and may receive input from the user (101).

Examples of non-portable consumer devices include a computer terminal, a television set, a personal computer, a set-top box, or the like. Examples of portable consumer devices include a portable computer, a cellular phone, a personal digital assistant (PDA), a pager, a security card, a wireless terminal, or the like. The consumer device may be implemented as a data processing system as illustrated in FIG. 7, with more or fewer components.

In one embodiment, the consumer device includes an account identification device (141). For example, a smart card used as an account identification device (141) is integrated with a mobile phone, or a personal digital assistant (PDA).

In one embodiment, the point of interaction (107) is integrated with a transaction terminal (105). For example, a self-service checkout terminal includes a touch pad to interact with the user (101); and an ATM machine includes a user interface subsystem to interact with the user (101).

Hardware

In one embodiment, a computing apparatus is configured to include some of the modules or components illustrated in FIGS. 1 and 4, such as the transaction handler (103), the profile generator (121), the media controller (115), the portal (143), the profile selector (129), the advertisement selector (133), the user tracker (113), the correlator, and their associated storage devices, such as the data warehouse (149).

In one embodiment, at least some of the modules or components illustrated in FIGS. 1 and 4, such as the transaction handler (103), the transaction terminal (105), the point of interaction (107), the user tracker (113), the media controller (115), the correlator (117), the profile generator (121), the profile selector (129), the advertisement selector (133), the portal (143), the issuer processor (145), the acquirer processor (147), and the account identification device (141), can be implemented as a computer system, such as a data processing system illustrated in FIG. 7, with more or fewer components. Some of the modules may share hardware or be combined on a computer system. In one embodiment, a network of computers can be used to implement one or more of the modules.

Further, the data illustrated in FIG. 1, such as transaction data (109), account data (111), transaction profiles (127), and advertisement data (135), can be stored in storage devices of one or more computers accessible to the corresponding modules illustrated in FIG. 1. For example, the transaction data (109) can be stored in the data warehouse (149) that can be implemented as a data processing system illustrated in FIG. 7, with more or fewer components.

In one embodiment, the transaction handler (103) is a payment processing system, or a payment card processor, such as a card processor for credit cards, debit cards, etc.

FIG. 7 illustrates a data processing system according to one embodiment. While FIG. 7 illustrates various components of a computer system, it is not intended to represent any particular architecture or manner of interconnecting the components. One embodiment may use other systems that have fewer or more components than those shown in FIG. 7.

In FIG. 7, the data processing system (170) includes an inter-connect (171) (e.g., bus and system core logic), which interconnects a microprocessor(s) (173) and memory (167). The microprocessor (173) is coupled to cache memory (179) in the example of FIG. 7.

In one embodiment, the inter-connect (171) interconnects the microprocessor(s) (173) and the memory (167) together and also interconnects them to input/output (I/O) device(s) (175) via I/O controller(s) (177). I/O devices (175) may include a display device and/or peripheral devices, such as mice, keyboards, modems, network interfaces, printers, scanners, video cameras and other devices known in the art. In one embodiment, when the data processing system is a server system, some of the I/O devices (175), such as printers, scanners, mice, and/or keyboards, are optional.

In one embodiment, the inter-connect (171) includes one or more buses connected to one another through various bridges, controllers and/or adapters. In one embodiment the I/O controllers (177) include a USB (Universal Serial Bus) adapter for controlling USB peripherals, and/or an IEEE-1394 bus adapter for controlling IEEE-1394 peripherals.

In one embodiment, the memory (167) includes one or more of: ROM (Read Only Memory), volatile RAM (Random Access Memory), and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. However, such expressions are also used to specify that the functions result from execution of the code/instructions by a processor, such as a microprocessor.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Other Aspects

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

The use of headings herein is merely provided for ease of reference, and shall not be interpreted in any way to limit this disclosure or the following claims.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, and are not necessarily all referring to separate or alternative embodiments mutually exclusive of other embodiments. Moreover, various features are described which may be exhibited by one embodiment and not by others. Similarly, various requirements are described which may be requirements for one embodiment but not other embodiments. Unless excluded by explicit description and/or apparent incompatibility, any combination of various features described in this description is also included here.

The disclosures of the above discussed patent documents are hereby incorporated herein by reference.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

One or more of the elements of the present system/apparatus may be claimed as means for accomplishing a particular function. Where such means-plus-function elements are used to describe certain elements of a claimed system/apparatus, it will be understood by those of ordinary skill in the art having the present specification, figures, and claims before them, that the corresponding structure is a general purpose computer, processor, or microprocessor (as the case may be) programmed or physically configured to perform the particularly recited function using functionality found in any general purpose computer without special programming and/or by implementing one or more algorithms to achieve the recited functionality. As would be understood by those of ordinary skill in the art, that algorithm may be expressed within this disclosure as a mathematical formula, a flow chart, a narrative, and/or in any other manner that provides sufficient structure for those of ordinary skill in the art to implement the recited process and its equivalents.

What is claimed is:

1. An apparatus, comprising:

means for identifying a set of transaction data associated with account identifiers of a plurality of users who have made purchases from a merchant, wherein the merchant is a first merchant, the set of transaction data associated with transactions processed in response to one or more acquirer processors submitting the account identifiers via a transaction handler to one or more issuer processors, the one or more issuer processors to make payments on behalf of the users, the one or more acquirer processors to receive the payments on behalf of respective first merchants;

means for determining a spending distribution, wherein the spending distribution is a first spending distribution based on the transaction data, configured to schedule presentations of media content of a plurality of categories;

means for determining a presentation ratio of the media content of the plurality of categories, the media content to be presented according to the presentation ratio via a media channel located at a facility of the first merchant;

means for scheduling a presentation mix of the media content of the plurality of categories based on the first spending distribution means for presenting the media content of the plurality of categories to a location of the first merchant for display on a media channel;

means for identifying a second merchant associated with a second spending distribution matching the first spending distribution, the second spending distribution computed based on transaction data of users who have used account identifiers to make purchases from the second merchant;

means for adjusting the presentation ratio of the media content at the media channel at a location of the first merchant;

means for comparing, after the adjusting, changes in the first spending distribution and changes in the second spending distribution to identify an effect of the adjusting; and means for determining, based on the effect identified from the adjusting, an adjusted presentation ratio and presentation mix of the media content of the plurality of categories.

2. The apparatus of claim 1, wherein the media content includes advertisements to customers of the first merchant; and each respective presentation of the advertisements is performed without pre-identifying an identity of a customer who is to receive the respective presentation.

3. The apparatus of claim 2, wherein each respective presentation of the advertisements is based on a predetermined presentation ratio of media content of the plurality of categories.

4. The apparatus of claim 1, further comprising:

means for determining presentation ratios of media content in the plurality of categories based on the first spending distribution and the second spending distribution.

5. The apparatus of claim 1, further comprising:

means for scheduling a presentation mix of the media content of the plurality of categories according to the first spending distribution and the second spending distribution across the plurality of categories.

6. The apparatus of claim 5, wherein the first spending distribution and the second spending distribution provides a spending ratio of the users across a plurality of merchant categories; the media content is advertisements from first merchants; and the presentation mix is based on the spending ratio across the merchant categories.

7. The apparatus of claim 1, wherein the account identifiers are issued by a plurality of issuers; and the apparatus further comprises:

means for processing the transactions; and means for storing the transaction data to record the transactions.

8. The apparatus of claim 1, further comprising:

means for selecting the plurality of users according to a distribution of customers of the first merchant and second merchant.

9. The apparatus of claim 1, wherein the account identifiers include first account identifiers of the plurality of users, the first account identifiers having not been used in transactions with the first merchant and second merchant.

10. The apparatus of claim 1, wherein the determining includes aggregating spending amounts of the transactions according to the plurality of categories of the media content.

11. The apparatus of claim 1, wherein the determined spending distribution is further based on purchase location data of the transaction data.

12. The apparatus of claim 1, further comprising:

means for determining, based on the effect identified from the adjusting, a presentation ratio of the media content of the plurality of categories.

13. A method comprising:

identifying, by at least one physically configured processor, a spending distribution wherein the spending distribution is a first spending distribution determined based on a set of transaction data associated with account identifiers of a plurality of users who have used the account identifiers to make purchases from a merchant wherein the merchant is a first merchant, the set of transaction data associated with transactions processed in response to one or more acquirer processors submitting the account identifiers via a transaction handler to one or more issuer processors, the one or more issuer processors to make payments on behalf of the users, the one or more acquirer processors to receive the payments on behalf of respective first merchants;

determining, based on the first spending distribution and by the at least one physically configured processor, a presentation ratio of media content of a plurality of categories, the media content to be presented according to the presentation ratio via a media channel located at a facility of the first merchant;

scheduling a presentation mix of the media content of the plurality of categories based on the first spending distribution;

presenting the media content of the plurality of categories to a location of the first merchant for display on a media channel;

identifying a second merchant associated with a second spending distribution matching the first spending distribution, the second spending distribution computed based on transaction data of users who have used account identifiers to make purchases from the second merchant;

adjusting the presentations of the media content at a media channel at a location of the first merchant;

comparing, after the adjusting, changes in the first spending distribution and changes in the second spending distribution to identify an effect of the adjusting; and determining, based on the effect identified from the adjusting, an adjusted presentation ratio and presentation mix of the media content of the plurality of categories.

14. The computer-storage medium of claim 13, further comprising:

presenting the media content according to the presentation ratio via the media channel.

15. The computer-storage medium of claim 14, wherein the presentation ratio is configured according to one of: time length of media presentation and number of times of media presentation.

16. The computer-storage medium of claim 13, wherein the facility of the first merchant includes a gas pump; and the media channel comprises a video terminal mounted on the gas pump.

17. A computing apparatus, comprising:

a data warehouse configured to store transaction data recording transactions processed by a transaction handler, each of the transactions being processed to settle via the transaction handler a payment from an issuer to an acquirer for a purchase made by a user from a merchant wherein the merchant is a first merchant, the issuer making the payment on behalf of the user, the acquirer receiving the payment on behalf of the merchant; and at least one processor coupled with the data warehouse to:

identify a subset of the transaction data associated with account identifiers of a plurality of users who have used the account identifiers to make purchases from a first merchant;

determine a spending distribution wherein the spending distribution is a first spending distribution based on the subset of the transaction data to schedule presentations of media content of a plurality of categories, and a presentation ratio of media content of a plurality of categories, the media content to be presented according to the presentation ratio via a media channel located at a facility of the first merchant; and schedule a presentation mix of the media content of the plurality of categories based on the first spending distribution;

present the media content of the plurality of categories to a location of the first merchant for display on a media channel;

identify a second merchant associated with a second spending distribution matching the first spending distribution, the second spending distribution computed based on transaction data of users who have used account identifiers to make purchases from the second merchant;

adjust the presentations of the media content at a media channel at a location of the first merchant;

compare, after the adjusting, changes in the first spending distribution and changes in the second spending distribution to identify an effect of the adjusting; and determining, based on the effect identified from the adjusting, an adjusted presentation ratio of the media content of the plurality of categories.

18. The apparatus of claim 17, wherein the at least one processor is further configured to determine a presentation ratio of the media content of the plurality of categories based on the first spending distribution and second spending distribution.

19. The apparatus of claim 18, further comprising:
a media controller to present the media content according to the presentation ratio.

20. The apparatus of claim 19, further comprising:
a point of interaction configured to present the media content at a location of the first merchant.

21. The apparatus of claim 20, wherein the point of interaction includes a video display mounted on a gas pump.

22. A method comprising:
identifying, by a computing apparatus, a set of transaction data associated with account identifiers of a plurality of users who have made purchases from a first merchant, the set of transaction data associated with transactions processed in response to one or more acquirer processors submitting the account identifiers via a transaction handler to one or more issuer processors, the one or more issuer processors to make payments on behalf of the users, the one or more acquirer processors to receive the payments on behalf of respective merchants;

determining, by the computing apparatus using the set of transaction data, a first spending distribution configured to schedule presentations of media content of a plurality of categories, wherein the media content includes advertisements from merchants to customers of the merchant;

determining presentation ratios of media content in the plurality of categories based on the first spending distribution;

scheduling a presentation mix of the media content of the plurality of categories according to the first spending distribution across the plurality of categories;

providing the presentation mix of the media content of the plurality of categories to a location of the first merchant for display on a media channel;

identifying a second merchant associated with a second spending distribution matching the first spending distribution, the second spending distribution computed based on transaction data of users who have used account identifiers to make purchases from the second merchant;

adjusting the presentations of the media content on the media channel at the location of the first merchant;

comparing, after the adjusting, changes in the first spending distribution and changes in the second spending distribution to identify an effect of the adjusting; and determining, based on the effect identified from the adjusting, the adjusted presentation ratio of the media content of the plurality of categories.

23. The method of claim 22, wherein the identified set of transaction data associated with account identifiers of the plurality of users who have made purchases, the purchases meeting or exceeding a frequency threshold based on a predetermined number of purchases from the first merchant within a predetermined period of time.

* * * * *